United States Patent
Shiota

(10) Patent No.: US 9,904,080 B2
(45) Date of Patent: Feb. 27, 2018

(54) OPTICAL ELEMENT, AND DISPLAY DEVICE, ELECTRONIC APPARATUS, LIGHTING DEVICE USING THE SAME

(71) Applicant: NLT TECHNOLOGIES, LTD., Kanagawa (JP)

(72) Inventor: Kunihiro Shiota, Kanagawa (JP)

(73) Assignee: NLT Technologies, Ltd., Kawasaki, Kanagawa (JP)

( * ) Notice: Subject to any disclaimer, the term of this patent is extended or adjusted under 35 U.S.C. 154(b) by 166 days.

(21) Appl. No.: 14/851,825

(22) Filed: Sep. 11, 2015

(65) Prior Publication Data

US 2016/0077363 A1   Mar. 17, 2016

(30) Foreign Application Priority Data

Sep. 12, 2014 (JP) ................................ 2014-186544
Jun. 2, 2015 (JP) ................................ 2015-112069

(51) Int. Cl.
*G02F 1/1335* (2006.01)
*G02F 1/13* (2006.01)
*G02F 1/167* (2006.01)

(52) U.S. Cl.
CPC ............ *G02F 1/1323* (2013.01); *G02F 1/167* (2013.01); *G02F 2001/1672* (2013.01); *G02F 2001/1676* (2013.01)

(58) Field of Classification Search
CPC . G02F 1/1323; G02F 1/167; G02F 2001/1672

USPC .......................................................... 349/62
See application file for complete search history.

(56) References Cited

U.S. PATENT DOCUMENTS

| 7,751,667 B2 | 7/2010 | Daniel et al. | |
| 2003/0210535 A1* | 11/2003 | Gaides | B60K 35/00 362/23.01 |
| 2004/0027642 A1* | 2/2004 | Ahn | G02F 1/167 359/296 |
| 2009/0224246 A1* | 9/2009 | Hwang | H01L 27/12 257/59 |
| 2011/0316835 A1* | 12/2011 | Mizutani | G02F 1/167 345/211 |

* cited by examiner

*Primary Examiner* — Lucy Chien
(74) *Attorney, Agent, or Firm* — Sughrue Mion, PLLC

(57) ABSTRACT

There is such an issue with the well-known optical element that it is difficult to achieve a high transmittance since the transmittance is determined according to the pattern size of the light transmission regions, so that the luminance of the display device to which such optical element is mounted is deteriorated. Provided is an optical element which employs a structure in which the shape of a conductive pattern where electrophoretic particles cohere in a wide viewing field mode is formed in a comb-like shape and plural stages and plural rows of light transmission regions are disposed in the spaces between the comb teeth. This makes it possible to exclude the electrophoretic particles from the regions other than the comb-like electrode for allowing the light to transmit that part.

26 Claims, 35 Drawing Sheets

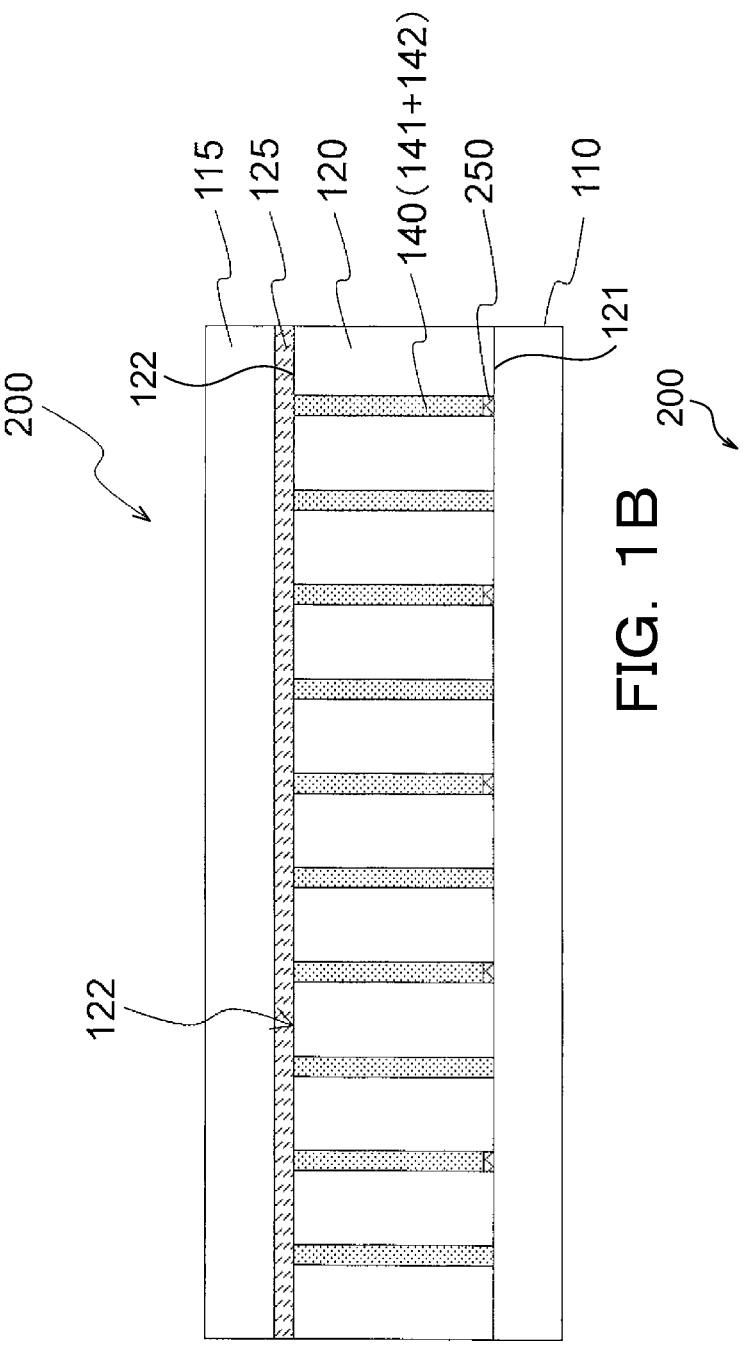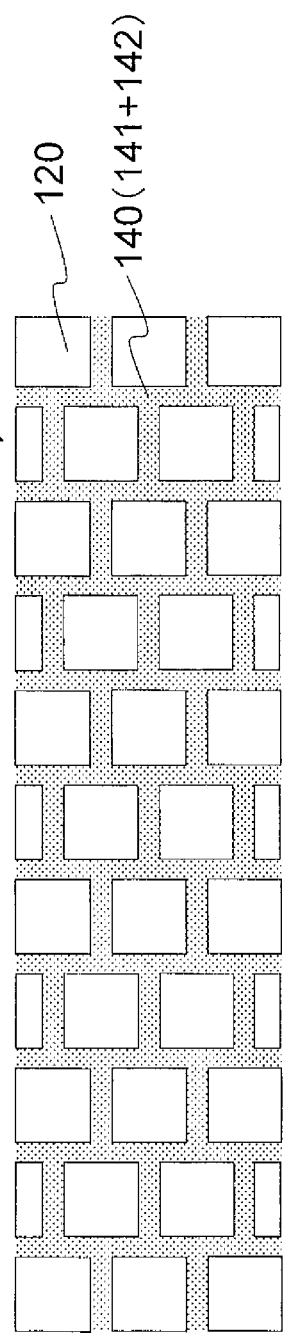

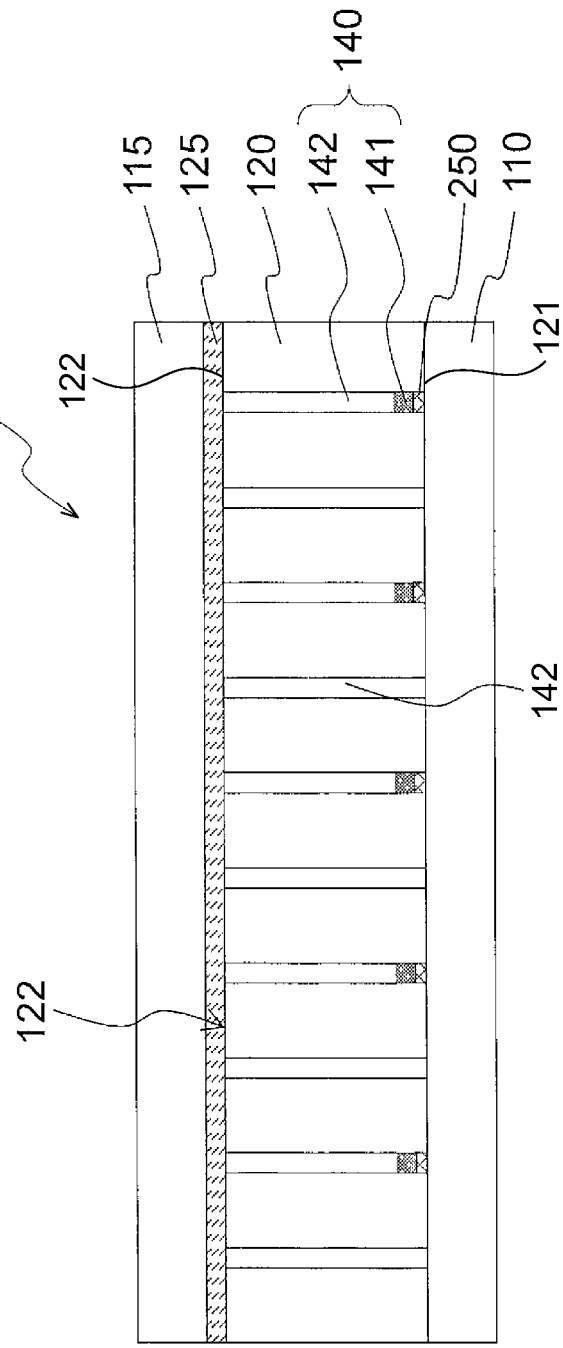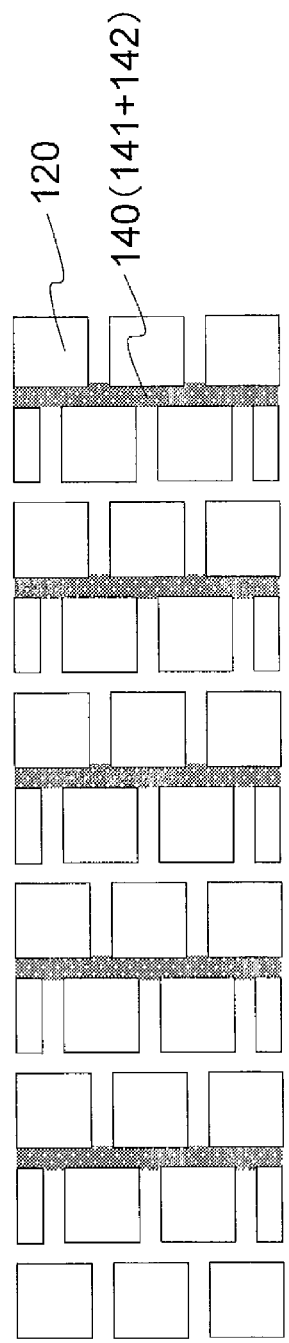
FIG. 2A
FIG. 2B

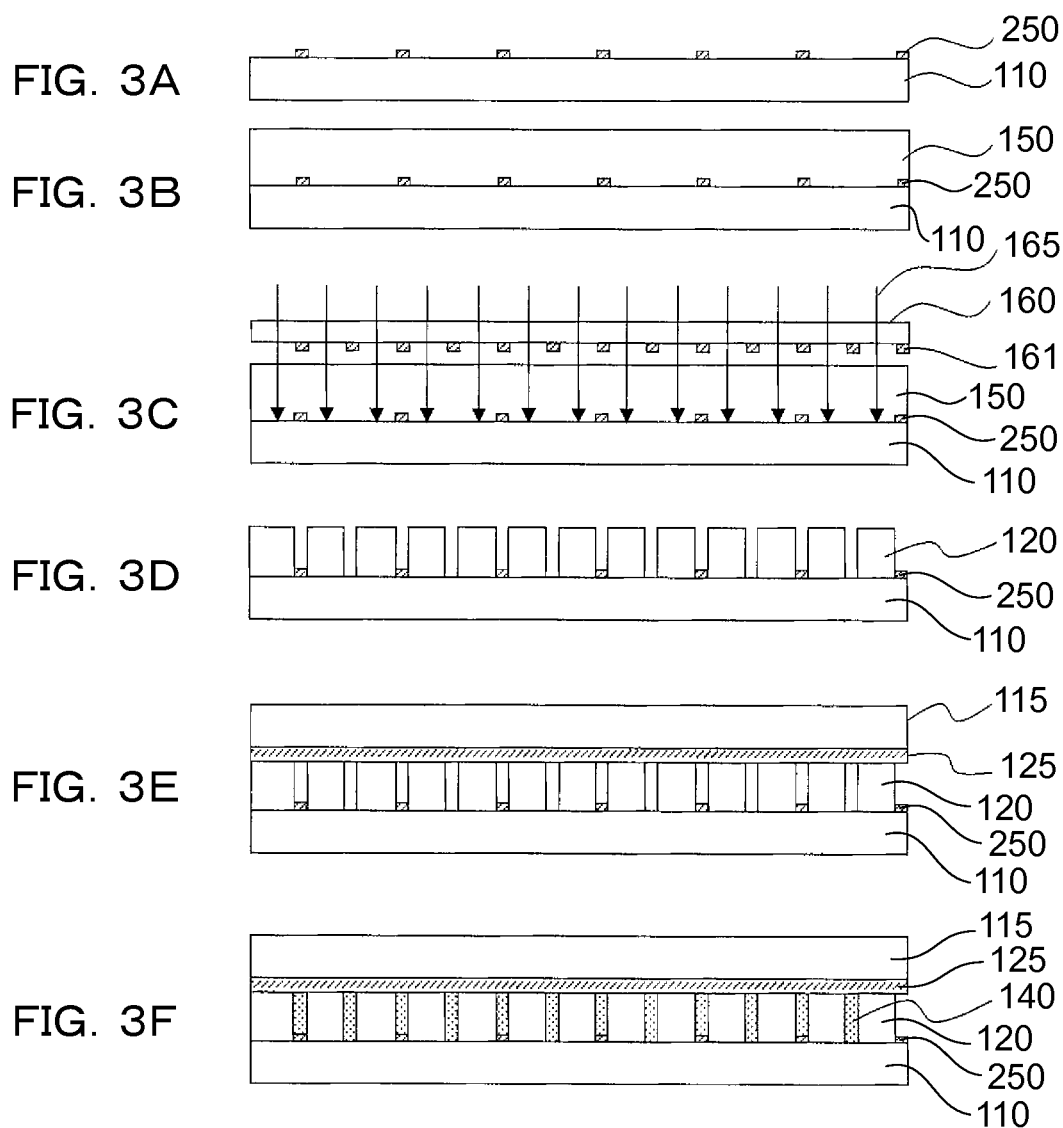

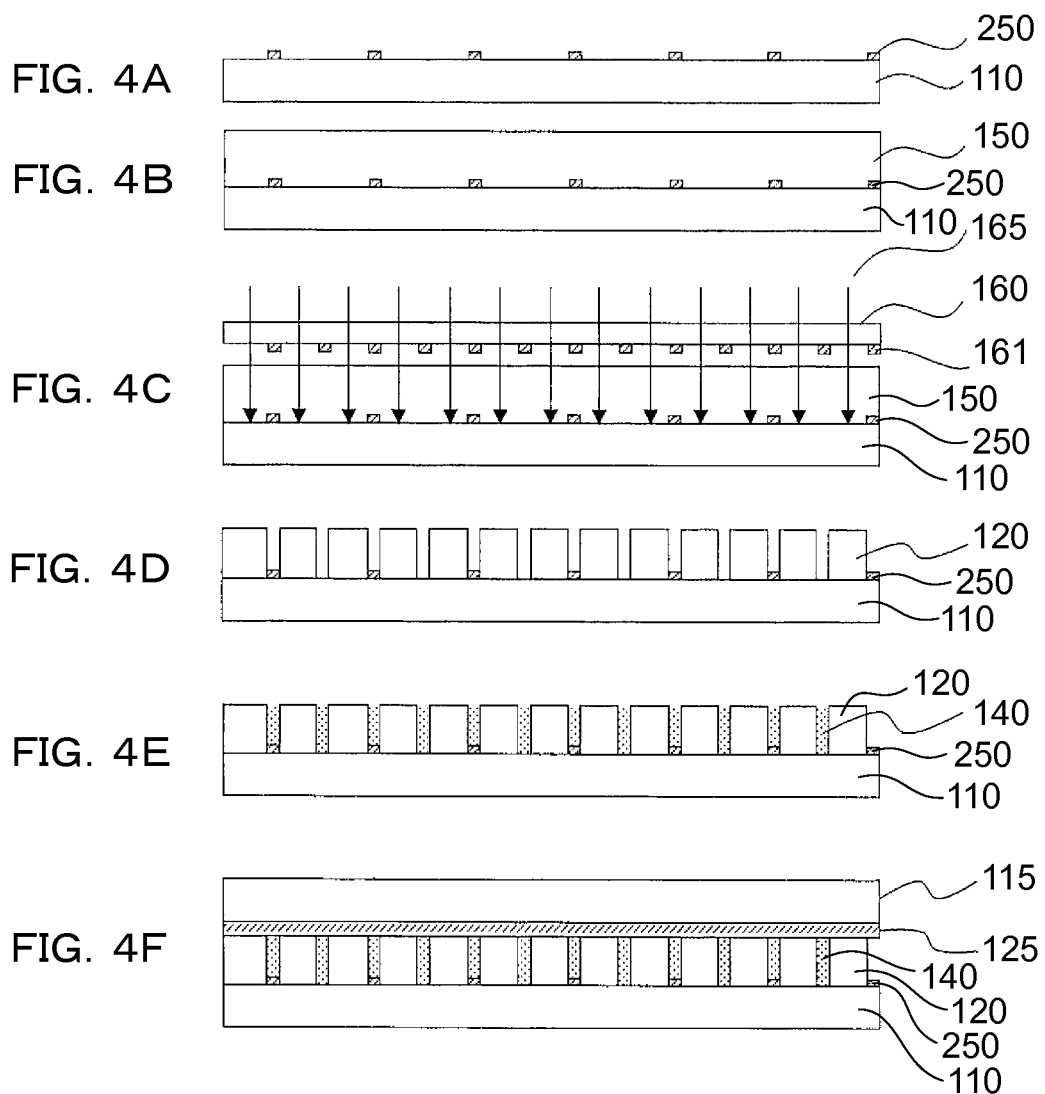

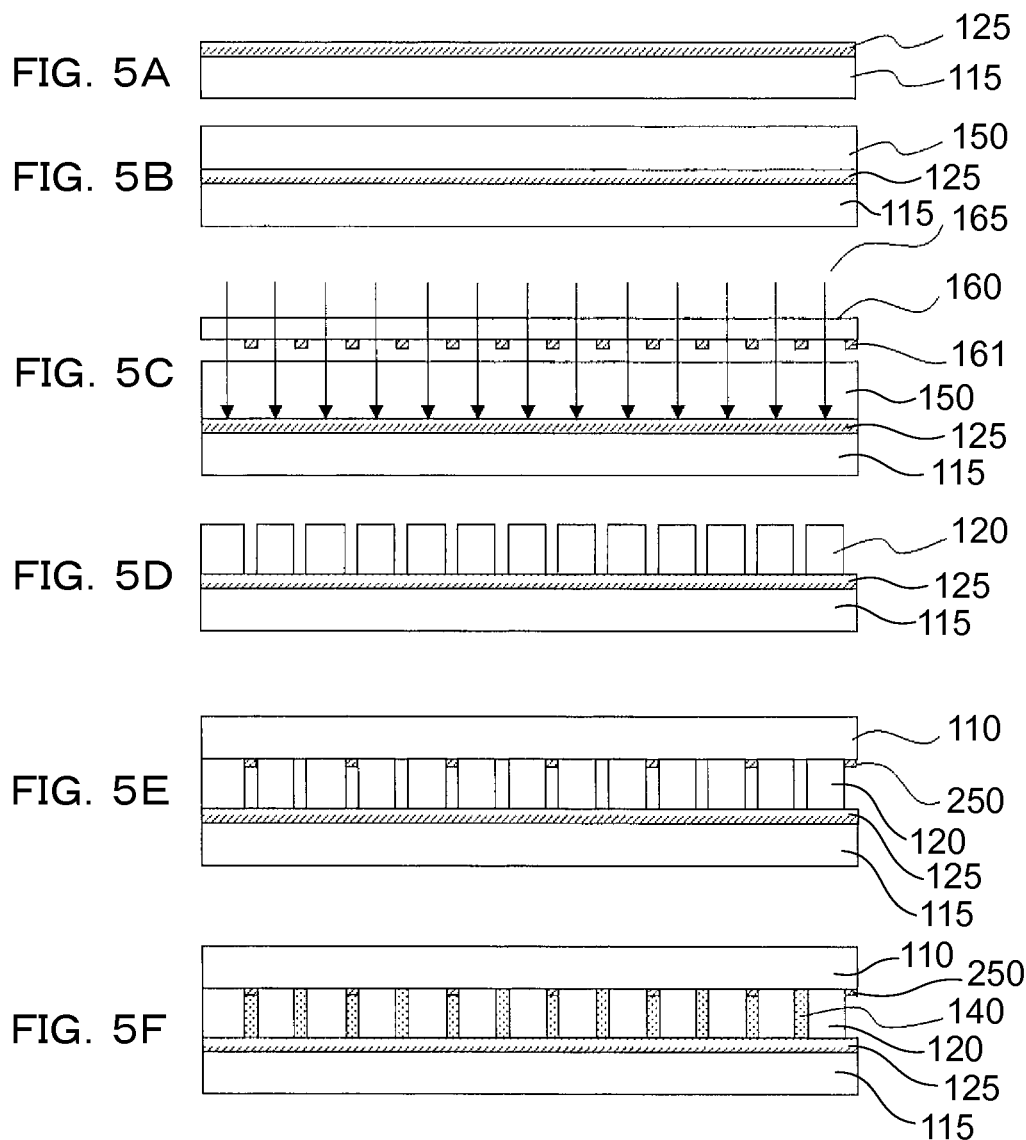

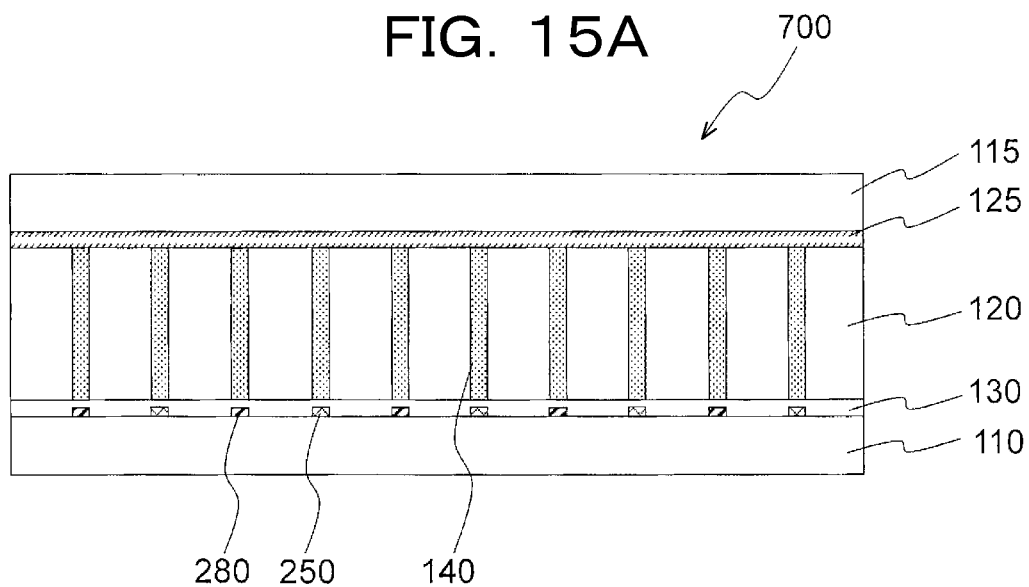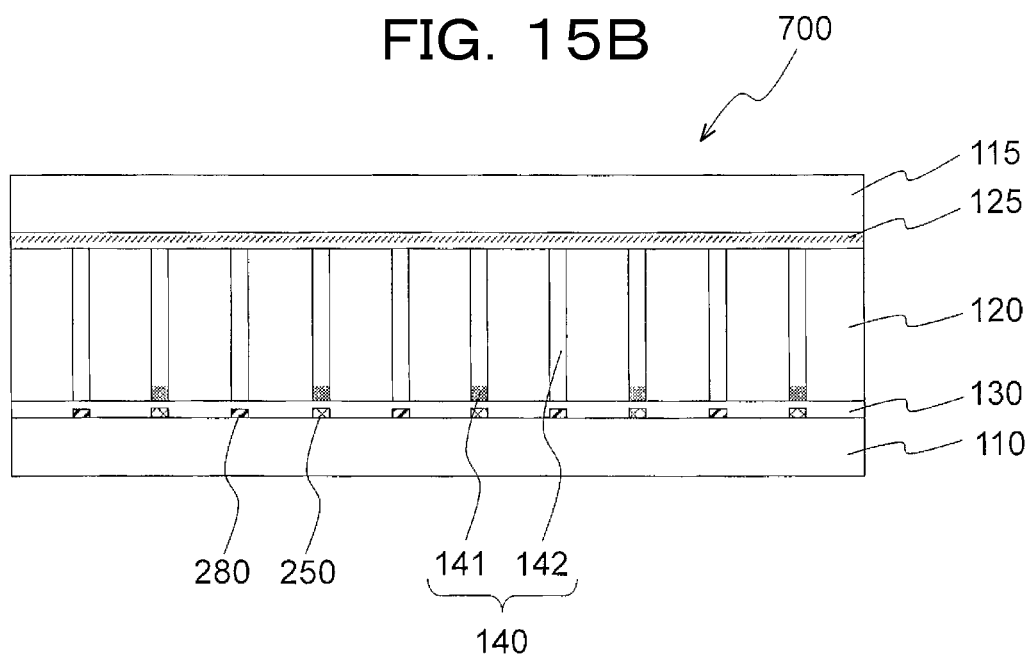

CASE WHERE SURFACE CHARGE OF ELECTROPHORETIC PARTICLE IS (−)

CASE WHERE SURFACE CHARGE OF ELECTROPHORETIC PARTICLE IS (+)

CASE WHERE SURFACE CHARGE OF ELECTROPHORETIC PARTICLE IS (−)

CASE WHERE SURFACE CHARGE OF ELECTROPHORETIC PARTICLE IS (+)

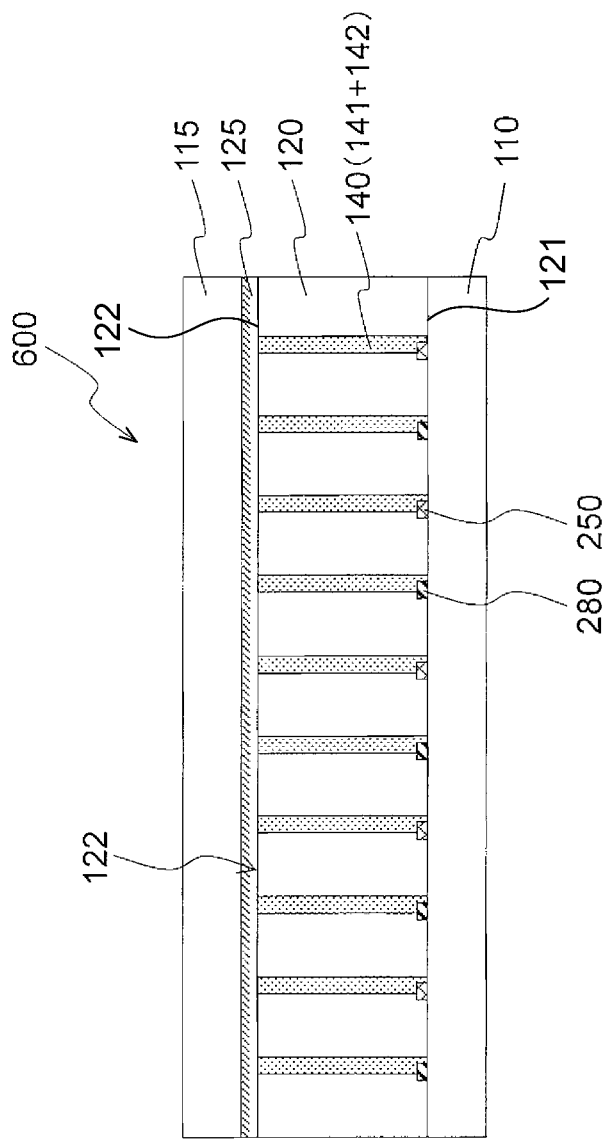

OPTICAL ELEMENT, AND DISPLAY DEVICE, ELECTRONIC APPARATUS, LIGHTING DEVICE USING THE SAME

CROSS-REFERENCE TO RELATED APPLICATION

This application is based upon and claims the benefit of priority from Japanese patent application No. 2014-186544, filed on Sep. 12, 2014 and Japanese patent application No. 2015-112069, filed on Jun. 2, 2015, the disclosure of which is incorporated herein in its entirety by reference.

BACKGROUND OF THE INVENTION

1. Field of the Invention

The present invention relates to an optical element which variably controls the range of exit directions of transmission light, and to a display device, an electronic apparatus, and a lighting device using the same.

2. Description of the Related Art

Display devices such as liquid crystal display devices, for example, are used as information display modules of various kinds of information processing devices such as mobile phones, PDAs (Personal Digital Assistants), ATMs (Automatic Teller Machines), personal computers, and the like.

Further, as the displays are becoming large-scaled and multi-purposed, various luminous intensity distribution characteristics are required for the display devices. Particularly, there are demands for restricting the visible range so that others cannot peep at the display and a demand for not emitting light to undesired directions from the viewpoint of preventing information leakage. For dealing with such demands, an optical film capable of restricting the visible range (or the emission range) of the display device has been proposed and put into practical use. However, in a case where the display device is viewed from a plurality of directions simultaneously, it is necessary to take out the optical element every time. Therefore, there is an increasing demand for acquiring states of a wide visible range and a narrow visible range arbitrarily without going through a trouble of taking out the optical element.

For dealing with such demand, an optical element capable of switching the visible range of the display device between a wide viewing field mode and a narrow viewing field mode has been proposed.

As shown in FIG. 17A and FIG. 17B, this optical element 600 can arbitrarily acquire two states of a wide viewing field mode (see FIG. 17B) that is in an emission state of light 65 and a narrow viewing field mode (see FIG. 17A) by disposing an electrophoretic element 602 between light-transmission regions 601 of high aspect ratio arranged independently on a substrate two-dimensionally and controlling the dispersion state of the electrophoretic element 602 with the electric field generated by the voltage from outside. For example, it is the optical element acquired by: using a transparent substrate; applying, exposing, developing and curing a transparent photosensitive resin layer by applying heat to form the light transmission regions 601; and disposing the electrophoretic element 602 between the light transmission regions 601.

FIG. 18 is a sectional view showing an optical element of a related technique. An optical element 900 includes: a transparent substrate 110; another transparent conductive film 123 formed on the surface of the transparent substrate 110; a plurality of light transmission regions 120 which are formed on the top face of the transparent conductive film 123 by being isolated from each other; electrophoretic elements 140 disposed between those light transmission regions 120; and another transparent substrate 115 which is disposed on the light transmission regions 120 and includes a transparent conductive film 125 on the face that is in contact with the light transmission regions 120. The optical element 900 is disclosed in FIG. 8 of U.S. Pat. No. 7,751,667 B2 (Patent Document 1), for example.

However, there are following issues in the related technique disclosed in FIG. 8 of Patent Document 1.

Since both of the transparent conductive film 123 and the transparent conductive film 125 are disposed in a planar manner in the element regions of the transparent substrate 110 and the transparent substrate 115, transmission of light towards the front face direction is blocked in the region other than the light transmission regions 120 both in the narrow viewing field mode and the wide viewing field mode (see the narrow viewing field mode of FIG. 24A, FIG. 24B and the wide viewing field mode of FIG. 25A, FIG. 25B) and the transmittance in the front face direction is determined according to the pattern size of the light transmission regions. Therefore, it is difficult to improve the transmittance more than that. As a result, the luminance of the liquid crystal display device to which the optical element is mounted is deteriorated.

It is therefore an exemplary object of the present invention to provide an optical element which is capable of increasing the transmittance in the wide viewing field mode than the narrow viewing field mode and capable of suppressing deterioration of the luminance in the wide viewing field mode of the display device to which the optical element is mounted.

SUMMARY OF THE INVENTION

The optical element according to an exemplary aspect of the invention includes: a first transparent substrate and a second transparent substrate provided by opposing to the first transparent substrate; a plurality of light transmission regions disposed by being isolated from each other to reach a surface of the second transparent substrate from a surface of the first transparent substrate; a conductive pattern disposed on the surface of the first transparent substrate in a part of a region sandwiched between the light transmission regions neighboring to each other; a transparent conductive film disposed on a face of the second transparent substrate opposing to the first transparent substrate; and an electrophoretic element disposed between the neighboring light transmission regions, which is constituted with light-shielding electrophoretic particles of a specific electric charge and a transmissive dispersion material.

Further, the display device according to another exemplary aspect of the invention includes: a display which includes a display face for displaying videos; and the optical element that is disposed on the display face of the display.

Furthermore, the electronic apparatus according to still another exemplary aspect of the invention includes the display device loaded as a display module of a main body of the electronic apparatus.

Further, the lighting device according to still another exemplary aspect of the invention includes: the optical element and a light source that is provided on a back face of the first transparent substrate of the optical element.

As an exemplary advantage according to the invention, the present invention gathers the electrophoretic particles in the vicinity of the surface of the conductive patterns disposed only in a part of the region sandwiched between the neighboring light transmission regions in the wide viewing field mode, so that it is possible to exclude the electrophoretic particles from the other regions. Thus, light can be transmitted both from of the region from which the electrophoretic particles are excluded and the light transmission regions. As a result, the transmittance in the wide viewing field mode can be improved.

Further, deterioration in the luminance of the display device to which the optical element is mounted can be suppressed.

BRIEF DESCRIPTION OF THE DRAWINGS

FIGS. 1A and 1B show illustrations showing an optical element of a first exemplary embodiment in a narrow viewing field mode, in which FIG. 1A is a longitudinal sectional view showing the optical element that is cut in a face orthogonal to the display face of the optical element and FIG. 1B is a surface view showing the display face from the normal direction;

FIGS. 2A and 2B show illustrations showing the optical element of the first exemplary embodiment in a wide viewing field mode, in which FIG. 2A is a longitudinal sectional view showing the optical element that is cut in a face orthogonal to the display face of the optical element and FIG. 2B is a surface view showing the display face from the normal direction;

FIGS. 3A-3F show sectional views of a manufacturing method of the optical element in sequential steps, in which FIG. 3A is a longitudinal sectional view showing a step of forming conductive patterns on the surface of a transparent substrate in a simplified manner, FIG. 3B is a longitudinal sectional view showing a step of forming a transparent photosensitive resin layer in a simplified manner, FIG. 3C is a longitudinal sectional view showing a step of exposing the transparent photosensitive resin layer in a simplified manner, FIG. 3D is a longitudinal sectional view showing a step of forming a plurality of light transmission regions isolated from each other in a simplified manner, FIG. 3E is a longitudinal sectional view showing a step of disposing a transparent substrate including a transparent conductive film on the surface of the light transmission regions in a simplified manner, and FIG. 3F is a longitudinal sectional view showing a step of filling electrophoretic elements in a simplified manner;

FIGS. 4A-4F show sectional views of another manufacturing method of the optical element in sequential steps, in which FIG. 4A is a longitudinal sectional view showing a step of forming conductive patterns on the surface of a transparent substrate in a simplified manner, FIG. 4B is a longitudinal sectional view showing a step of forming a transparent photosensitive resin layer in a simplified manner, FIG. 4C is a longitudinal sectional view showing a step of exposing the transparent photosensitive resin layer in a simplified manner, FIG. 4D is a longitudinal sectional view showing a step of forming a plurality of light transmission regions isolated from each other in a simplified manner, FIG. 4E is a longitudinal sectional view showing a step of filling electrophoretic elements in a simplified manner, and FIG. 4F is a longitudinal sectional view showing a step of disposing a transparent substrate including a transparent conductive film on the surface of the light transmission regions in a simplified manner;

FIGS. 5A-5F show sectional views of still another manufacturing method of the optical element in sequential steps, in which FIG. 5A is a longitudinal sectional view showing a step of forming a transparent conductive film on the surface of a transparent substrate in a simplified manner, FIG. 5B is a longitudinal sectional view showing a step of forming a transparent photosensitive resin layer on the transparent conductive film in a simplified manner, FIG. 5C is a longitudinal sectional view showing a step of patterning the transparent photosensitive resin layer by using a mask pattern in a simplified manner, FIG. 5D is a longitudinal sectional view showing a step of forming light transmission regions by performing development in a simplified manner, FIG. 5E is a longitudinal sectional view showing a step of disposing another transparent substrate on the light transmission regions in a simplified manner, and FIG. 5F is a longitudinal sectional view showing a step of filling electrophoretic elements in the space between the transparent substrate and the other transparent substrate in a simplified manner;

FIGS. 6A and 6B show longitudinal sectional views of an optical element according to a second exemplary embodiment, in which FIG. 6A shows a state of the optical element in a narrow viewing field mode and FIG. 6B shows a state of the optical element in a wide viewing field mode;

FIGS. 7A and 7B show longitudinal sectional views of an optical element according to a third exemplary embodiment, in which FIG. 7A shows a state of the optical element in a narrow viewing field mode and FIG. 7B shows a state of the optical element in a wide viewing field mode;

FIGS. 8A and 8B show views of the state of cohesion of the electrophoretic particles in the wide viewing field mode of the optical element according to the first exemplary embodiment, in which FIG. 8A is a plan view thereof and FIG. 8B is a longitudinal sectional view thereof;

FIGS. 9A and 9B show plan views of the positional relations between the light transmission regions and the conductive patterns in the optical element of the first exemplary embodiment, in which FIG. 9A is an example of a case where the light transmission regions with the top and bottom faces being in a square shape are disposed and FIG. 9B is an example of a case where the light transmission regions with the top and bottom faces being in a rectangular shape are disposed;

FIGS. 10A and 10B show perspective views of the positional relations between the light transmission regions and the conductive patterns in the optical element of the first exemplary embodiment, in which FIG. 10A is an example of a case where the light transmission regions with the top and bottom faces being in a square shape are disposed and FIG. 10B is an example of a case where the light transmission regions with the top and bottom faces being in a rectangular shape are disposed;

FIGS. 11A-11C show plan views of the positional relations between the light transmission regions and the conductive patterns in the optical element of the first exemplary embodiment, in which FIG. 11A is an example of a case where the light transmission regions with the top and bottom faces being in a square shape are disposed, FIG. 11B is an example of a case where the light transmission regions with the top and bottom faces being in a rectangular shape are disposed, and FIG. 11C is an example of a case where the light transmission regions with the top and bottom faces being in a lengthy rectangular shape are disposed by being isolated from each other in a width direction;

FIGS. 12A-12C show perspective views of the positional relations between the light transmission regions and the conductive patterns in the optical element of the first exemplary embodiment, in which FIG. 12A is an example of a case where the light transmission regions with the top and bottom faces being in a square shape are disposed, FIG. 12B is an example of a case where the light transmission regions with the top and bottom faces being in a rectangular shape are disposed, and FIG. 12C is an example of a case where the light transmission regions with the top and bottom faces being in a lengthy rectangular shape are disposed by being isolated from each other in a width direction;

FIGS. 13A and 13B show longitudinal sectional views of an optical element according to a fourth exemplary embodiment, in which FIG. 13A shows a state of the optical element in a narrow viewing field mode and FIG. 13B shows a state of the optical element in a wide viewing field mode;

FIGS. 14A and 14B show illustrations of the positional relations between the light transmission regions, the conductive patterns, and the transparent conductive patterns in the optical element of the fourth exemplary embodiment, in which FIG. 14A is a plan view showing the layout of the light transmission regions, the conductive patterns, and the transparent conductive patterns in the optical element of the fourth exemplary embodiment and FIG. 14B is a perspective view thereof;

FIGS. 15A and 15B show sectional views of a structure of the optical element of the fourth exemplary embodiment where a protection cover film is formed on the surface of the conductive patterns and the transparent conductive patterns, in which FIG. 15A shows a state of the optical element in the narrow viewing field mode and FIG. 15B shows a state of the optical element in the wide viewing field mode;

FIGS. 16A and 16B show sectional views of a structure of the optical element of the fourth exemplary embodiment where a protection cover film is formed on both the surfaces of the conductive patterns and the transparent conductive patterns and the surface of a transparent conductive film, in which FIG. 16A shows a state of the optical element in a narrow viewing field mode and FIG. 16B shows a state of the optical element in a wide viewing field mode;

FIGS. 17A and 17B show longitudinal sectional views of the principle of the actions of the optical element of a related technique, in which FIG. 17A shows a state of electrophoretic elements in a narrow viewing field mode and FIG. 17B shows a state of the electrophoretic elements in a wide viewing field mode;

FIGS. 24A and 24B show illustrations of a state of electrophoretic particles in a narrow viewing field mode of an optical element according to a related technique, in which FIG. 24A is a surface view taken from the normal direction of the display face of the optical element regarding the state of the electrophoretic element and FIG. 24B is a longitudinal sectional view of the optical element taken along the face that is orthogonal to the display face of the optical element regarding the state of the electrophoretic element;

FIGS. 25A and 25B show illustrations of a state of electrophoretic particles in a wide viewing field mode of an optical element according to the related technique, in which FIG. 25A is a surface view taken from the normal direction of the display face of the optical element regarding the state of the electrophoretic element and FIG. 25B is a longitudinal sectional view of the optical element taken along the face that is orthogonal to the display face of the optical element regarding the state of the electrophoretic element;

FIGS. 26A-26C show sectional views of the states of the potentials of the conductive patterns and the transparent conductive film in the optical element of the first exemplary embodiment, in which FIG. 26A shows the state of the potentials in the narrow viewing field mode, FIG. 26B shows the state of the potentials in the wide viewing field mode when the surface charges of the electrophoretic particles are (−), and FIG. 26C shows the state of the potentials in a wide viewing field mode when the surface charges of the electrophoretic particles are (+);

FIGS. 27A and 27B are illustrations showing electronic apparatuses according to another exemplary embodiment, in which FIG. 27A is an apparatus in which a touch panel is used for input and FIG. 27B is an apparatus in which a touch panel, a keyboard, and a mouse are used for input;

FIGS. 29A-29C show sectional views of the states of the potentials of the conductive patterns, the transparent conductive patterns, and the transparent conductive film in the optical element of the fourth exemplary embodiment, in which FIG. 29A shows the state of the potentials in the narrow viewing field mode, FIG. 29B shows the state of the potentials in the wide viewing field mode when the surface charges of the electrophoretic particles are (−), and FIG. 29C shows the state of the potential in the wide viewing field mode when the surface charges of the electrophoretic particles are (+);

FIG. 30 is a longitudinal sectional view showing a case where the relative positions of the conductive patterns, the transparent conductive patterns, and the light transmission regions are shifted in the optical element of the fourth exemplary embodiment;

FIGS. 31A and 31B show plan views of the positional relations between the light transmission regions and the conductive patterns in the optical element of the first exemplary embodiment, in which FIG. 31A is an example of a case where the light transmission regions with the top and bottom faces being in a square shape are disposed and FIG. 31B is an example of a case where the light transmission regions with the top and bottom faces being in a rectangular shape are disposed;

FIGS. 32A and 32B show perspective views of the positional relations between the light transmission regions and the conductive patterns in the optical element of the first exemplary embodiment, in which FIG. 32A is an example of a case where the light transmission regions with the top and bottom faces being in a square shape are disposed and FIG. 32B is an example of a case where the light transmission regions with the top and bottom faces being in a rectangular shape are disposed;

FIGS. 33A and 33B show illustrations of the positional relations between the light transmission regions, the conductive patterns, and the transparent conductive patterns in the optical element of the fourth exemplary embodiment, in which FIG. 33A is a plan view showing the layout of the light transmission regions, the conductive patterns, and the transparent conductive patterns in the optical element of the fourth exemplary embodiment and FIG. 33B is a perspective view thereof;

FIGS. 34A and 34B show plan views regarding the state of migration of the electrophoretic particles in the optical element of the first exemplary embodiment, in which FIG. 34A shows an example of a case where the linear conductive patterns are disposed in a direction same as the direction along which the light transmission regions are arranged in a straight-line form and FIG. 34B shows an example of a case where the linear conductive patterns are disposed in a direction rotated by 45 degrees from the direction along which the light transmission regions are arranged in a straight-line form; and FIGS. 35A and 35B show plan views regarding the state of migration of the electrophoretic particles in the optical element of the fourth exemplary embodiment, in which FIG. 35A shows an example of a case where the linear conductive patterns are disposed in a direction same as the direction along which the light transmission regions are arranged in a straight-line form and FIG. 35B shows an example of a case where the linear conductive patterns are disposed in a direction rotated by 45 degrees from the direction along which the light transmission regions are arranged in a straight-line form.

DETAILED DESCRIPTION OF THE PREFERRED EMBODIMENTS

Figure 6A:
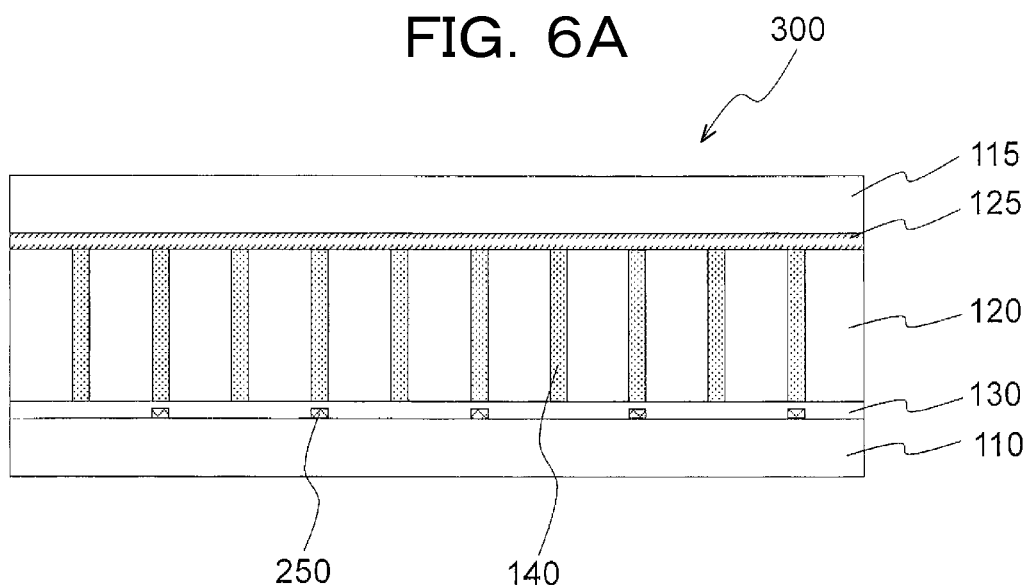

Hereinafter, modes for embodying the present invention (referred to as "exemplary embodiments" hereinafter) will be described by referring to the accompanying drawings. Same reference numerals are used for substantially same structural elements in the current Specification and the Drawings. It is to be noted that the dimensions and ratios of the shapes drawn in the Drawings are not necessarily consistent with the actual ones.

First Exemplary Embodiment

FIGS. 1A and 1B show illustrations of an optical element 200 of a first exemplary embodiment in a narrow viewing field mode, in which FIG. 1A is a longitudinal sectional view showing the optical element 200 that is cut in a face orthogonal to the display face of the optical element 200 and FIG. 1B is a surface view showing the display face from the normal direction. Further, FIGS. 2A and 2B show illustrations of the optical element 200 of the first exemplary embodiment in a wide viewing field mode, in which FIG. 2A is a longitudinal sectional view showing the optical element 200 that is cut in a face orthogonal to the display face of the optical element 200 and FIG. 2B is a surface view showing the display face from the normal direction. The details of the optical element according to the first exemplary embodiment will be described hereinafter.

The optical element 200 of the first exemplary embodiment includes: a first transparent substrate 110; a second transparent substrate 115 provided by opposing to the first transparent substrate 110; a plurality of light transmission regions 120 disposed by being isolated from each other to reach the surface of the second transparent substrate 115 from the surface of the first transparent substrate 110; conductive patterns 250 disposed on the surface of the first transparent substrate 110 in a part of regions sandwiched between the neighboring light transmission regions 120; a transparent conductive film 125 disposed on the face of the second transparent substrate 115 opposing to the first transparent substrate 110; and electrophoretic elements 140 disposed between the neighboring light transmission regions 120.

The light transmission region 120 is a structural body (transparent resin pattern) provided in such a manner that its bottom face 121 and top face 122 reach the transparent substrate 110 and the transparent substrate 115, respectively. This is also the same in the following exemplary embodiments.

The electrophoretic element 140 is a mixture of light-shielding electrophoretic particles 141 of a specific electric charge and a transmissive dispersion material 142.

More specifically, the optical element 200 of the first exemplary embodiment includes: the first transparent substrate 110; the second transparent substrate 115 provided by opposing to the first transparent substrate 110 with a space provided therebetween; the transparent conductive film 125 disposed on the surface of the second transparent substrate 115 on the side opposing to the first transparent substrate 110; a plurality of the light transmission regions 120 which are disposed in a space between the first transparent substrate 110 and the transparent conductive film 125 in parallel to the display face of the optical element 200 by being isolated from each other in two mutually orthogonal directions, i.e., in the longitudinal and lateral directions of FIG. 1B, in such a manner that the bottom face 121 thereof abuts against the first transparent substrate 110 and the top face 122 thereof reaches the second transparent substrate 115; the conductive patterns 250 disposed on the surface of the first transparent substrate 110 in a part of regions sandwiched between the neighboring light transmission regions 120; and the electrophoretic elements 140 which are disposed to fill the spaces between the neighboring light transmission regions 120 disposed by being isolated from each other regardless of existence of the conductive patterns 250.

Figure 26A:
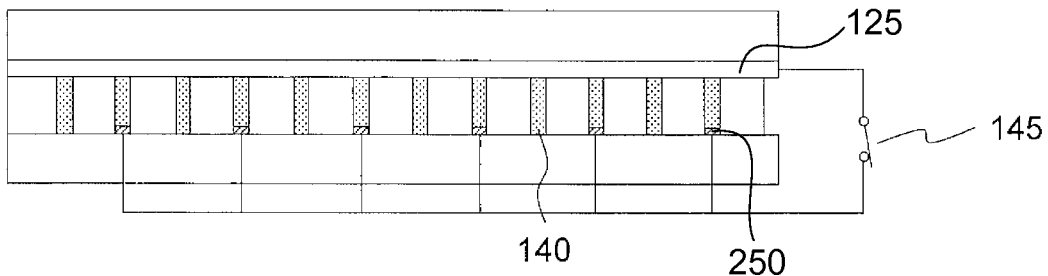

The narrow viewing field mode shown in FIG. 1A and FIG. 1B is achieved by dispersing electrophoretic particles 141 in the electrophoretic elements 140 disposed in the spaces between each of the light transmission regions 120 entirely within the dispersion material 142 by setting the conductive patterns 250 and the transparent conductive film 125 to be in a same potential (see FIG. 26A). In the meantime, the wide viewing field mode shown in FIG. 2A and FIG. 2B is achieved by cohering the electrophoretic particles 141 in the vicinity of the conductive patterns 250. For that, the relative potential of the conductive patterns 250 with respect to the transparent conductive film 125 is set to be in an opposite polarity from that of the surface charge of the electrophoretic particles 141 to generate an electric field between the transparent conductive film 125 and the conductive patterns 250 so as to cohere the electrophoretic particles 141 in the vicinity of the conductive patterns 250. That is, through setting the conductive patterns 250 to be in a positive polarity when the surface charge of the electrophoretic particles 141 is (−) (see FIG. 26B) and setting the conductive patterns 250 to be in a negative polarity when the surface charge of the electrophoretic particles 141 is (+) (see FIG. 26C), i.e., through setting the relative potential of the transparent conductive film 125 with respect to the conductive patterns 250 to be in the same polarity as that of the surface charge of the electrophoretic particles 141 to cohere the electrophoretic particles 141 in the vicinity of the conductive patterns 250, the electrophoretic particles 141 do not exist in the regions where the conductive patterns 250 are not disposed on the surface of the transparent substrate 110.

Figure 25A:
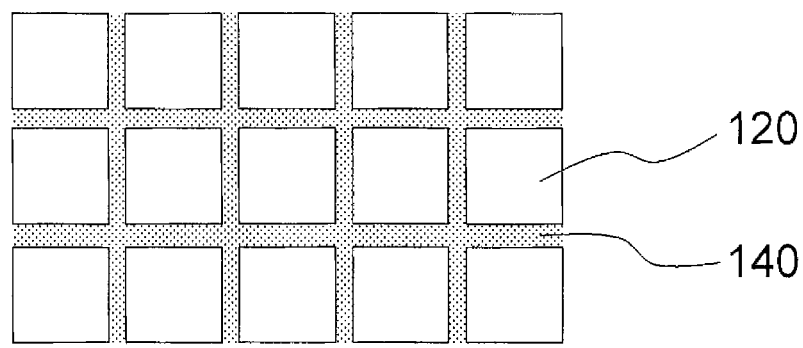
Figure 25B:
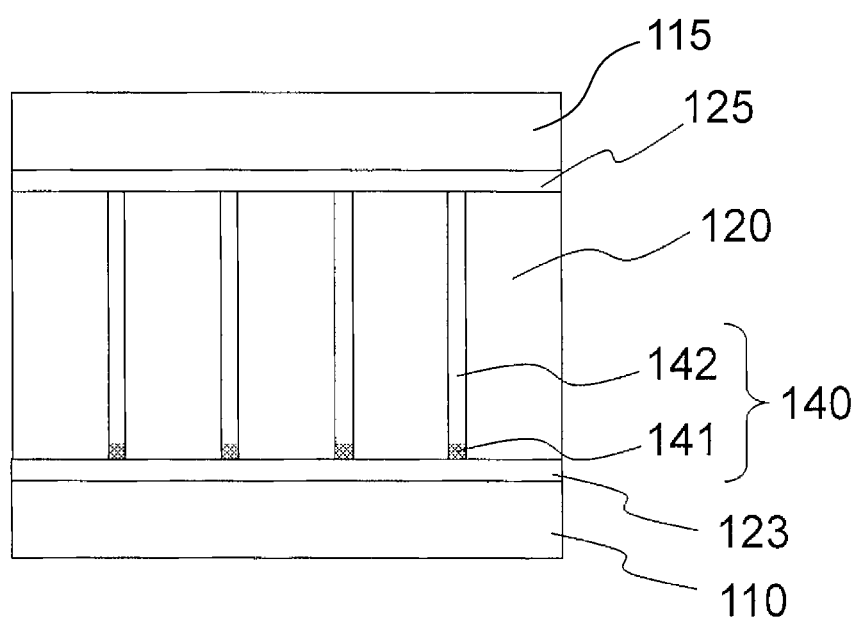

As shown in FIG. 25A and FIG. 25B, in a case where both the transparent conductive film 125 on the transparent substrate 115 side and the transparent conductive film 123 on the transparent substrate 110 side are disposed in a planar manner in the element region, i.e., in a case where the transparent conductive film 123 is disposed on the surface of the transparent substrate 110 to include the entire region sandwiched between the neighboring light transmission regions 120, the electrophoretic particles 141 in the entire regions sandwiched between the neighboring light transmission regions 120 cohere in the vicinity of the surface of the transparent conductive film 123 in the wide viewing field mode. Therefore, the whole surface of the transparent substrate 110 excluding the regions of the light transmission regions 120 is covered by the electrophoretic particles 141, so that the whole regions other than the light transmission regions 120 are shielded from light.

In the meantime, with the structure of the first exemplary embodiment as shown in FIGS. 1A, 1B and FIGS. 2A, 2B in which a plurality of the light transmission regions 120 are disposed on the surface of the transparent substrate 110 by being isolated from each other and the conductive patterns 250 are disposed on the surface of the transparent substrate 110 in a part of the regions sandwiched between the neighboring light transmission regions 120, the light shielding characteristic of the space between the light transmission regions 120 is achieved by dispersing the electrophoretic particles 141 in the electrophoretic elements 140 as shown in FIGS. 1A, 1B in the narrow viewing filed mode. Meanwhile, in the wide viewing field mode, as shown in FIGS. 2A, 2B, due to the electric field generated by the transparent conductive film 125 and the conductive pattern 250, the electrophoretic particles 141 migrate in the dispersion material 142 along the paths between the neighboring light transmission regions 120 that are disposed in the space between the first transparent substrate 110 and the transparent conductive film 125 in parallel to the display face of the optical element 200 and in two directions orthogonal to each other, i.e., isolated in each of the longitudinal directions of FIG. 1B and FIG. 2B, and cohere only in the vicinity of the surface of the conductive patterns 250 in a part of the regions sandwiched between the neighboring light transmission regions 120. As a result, the electrophoretic particles 141 in a part between the neighboring light transmission regions 120 where the conductive pattern 250 is not disposed are excluded as in FIG. 2B, for example, to be in a state where light can be transmitted.

Figure 8A:
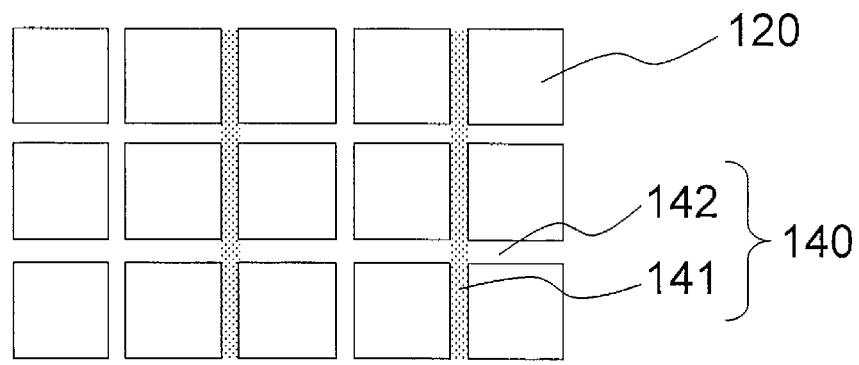
Figure 8B:
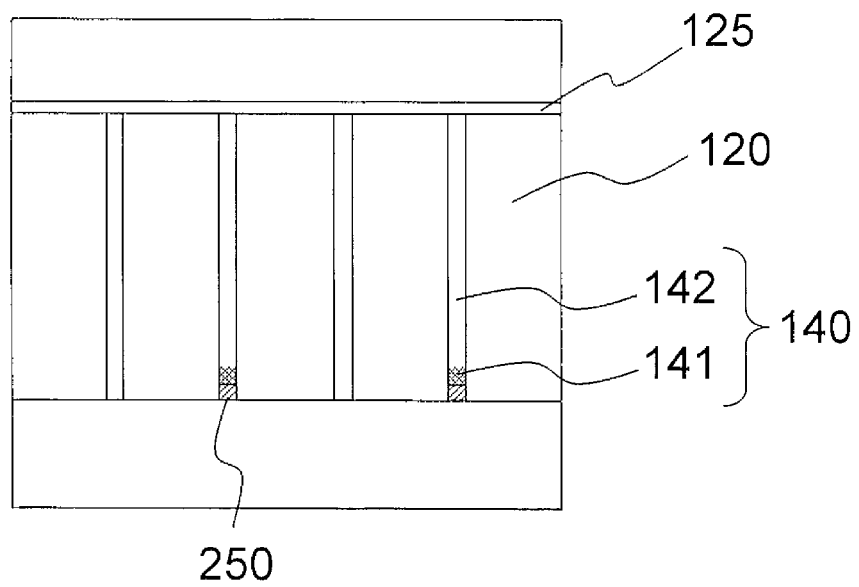

While FIGS. 1A, 1B and FIGS. 2A, 2B show the case where the light transmission regions 120 are disposed in a staggered form as a whole, the light transmission regions 120 may be disposed in a grid-like form as shown in FIGS. 8A, 8B. FIG. 8A and FIG. 8B show the state of the wide viewing field mode where the electrophoretic particles 141 cohere in the vicinity of the conductive patterns 250.

Figure 26B:
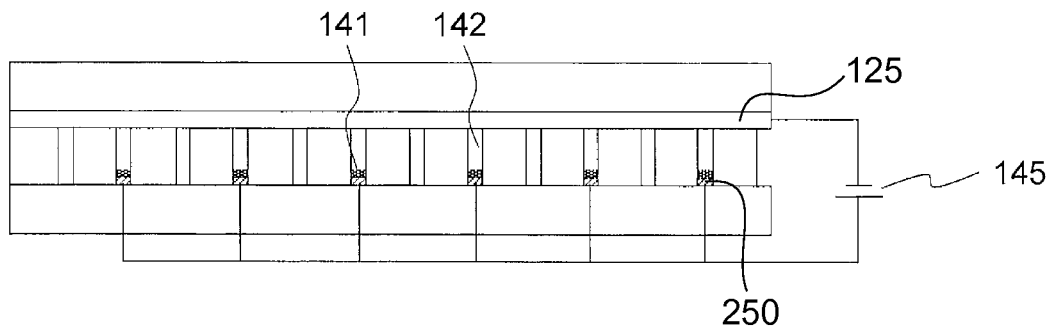
Figure 26C:
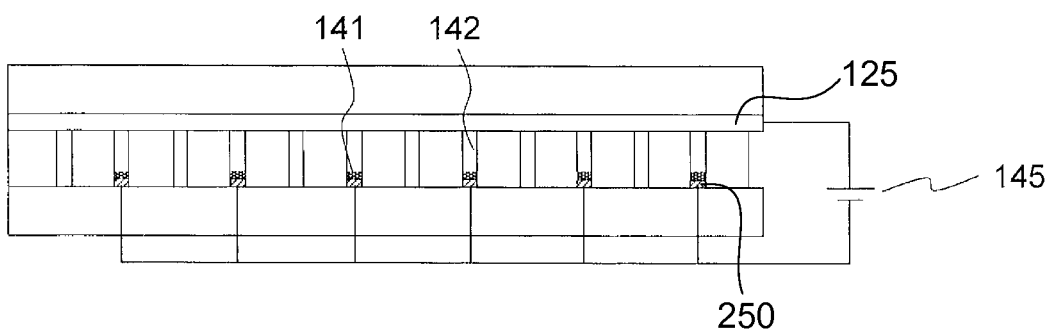

As described, displays of the narrow viewing field mode and the wide viewing field mode can be achieved through controlling the potentials of the conductive patterns 250 and the transparent conductive film 125 by a voltage apply control module 145 as shown in FIGS. 26A, 26B, and 26C. The voltage apply control module 145 is a module for changing each of the polarities of the conductive patterns 250 and the transparent conductive film 125 by adjusting the voltages to be applied to the conductive pattern 250 and the transparent conductive film 125 according to the signals from outside.

While the case where the surface charge of the electrophoretic particles is (−) will be described hereinafter, it is possible to deal with the case where the surface charge is (+) by inverting the polarity of the electrode.

FIG. 3 is a sectional view showing a manufacturing method of the optical element according to the first exemplary embodiment. Hereinafter, the outline of an example of the method for manufacturing the optical element according to the first exemplary embodiment will be described.

The manufacturing method of the optical element according to the first exemplary embodiment includes following steps.

A step of forming the conductive patterns 250 on the surface of the transparent substrate 110 (see FIG. 3A).

A step of forming a transparent photosensitive resin layer 150 as a negative photoresist film to be the light transmission regions 120 (see FIG. 3B).

A step of exposing the transparent photosensitive resin layer 150 through irradiating exposure light 165 to the transparent photosensitive resin layer 150 through a photomask 160 that is provided with a mask pattern 161 (see FIG. 3C). At this time, the positions of the photomask 160 and the transparent substrate 110 are controlled so that the position of the conductive patterns 250 overlap with the mask pattern 161.

A step of forming a plurality of the light transmission regions 120 which are isolated from each other by developing the exposed transparent photosensitive resin layer 150 (see FIG. 3D). The directions of isolation herein are both the left and right directions of FIG. 3D and the perpendicular direction of the drawing paper surface of FIG. 3D, and each of the light transmission regions 120 is formed in an island shape.

A step of disposing the transparent substrate 115 including the transparent conductive film 125 on the surface of the light transmission regions 120 (see FIG. 3E).

Further, a step of filling the electrophoretic elements 140 in the space between the conductive patterns 250, the transparent conductive film 125, and the light transmission regions 120 (see FIG. 3F).

Among those, the orders of the step of disposing the transparent substrate 115 including the transparent conductive film 125 on the surface of the light transmission regions 120 (FIG. 3E) and the step of filling the electrophoretic elements 140 in the space between the conductive patterns 250, the transparent conductive film 125, and the light transmission regions 120 (FIG. 3F) may be inverted.

That is, after performing the steps of FIG. 3A to FIG. 3D, as shown in FIG. 4, a step of filling the electrophoretic elements 140 between the light transmission regions 120 is performed (FIG. 4E). Then, a step of disposing another transparent substrate 115 including the transparent conductive film 125 on the surface of the light transmission regions and the electrophoretic elements 140 is performed (FIG. 4F).

Figure 28:
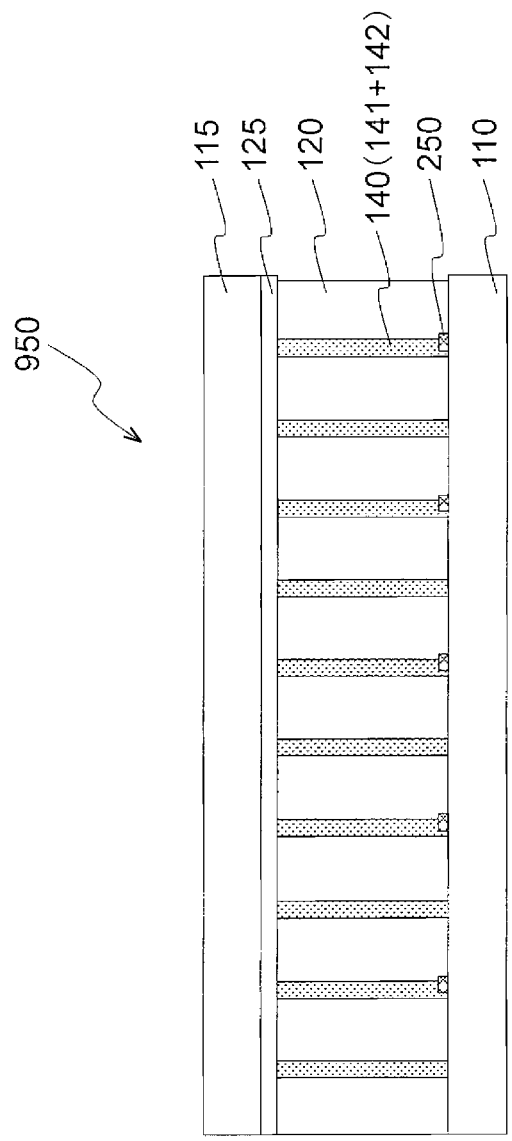
FIG. 28 is a longitudinal sectional view showing a case where the relative positions of the conductive patterns and the light transmission regions are shifted in the optical element of the first exemplary embodiment.

Further, in a case where the position of the mask pattern 161 is shifted from the conductive patterns 250 at the time of exposing the transparent photosensitive resin layer 150 by using the photomask 160 as described above, formed thereby is an optical element 950 in which a part of the conductive pattern 250 is disposed to overlap with a part of the light transmission region 120 on a plan view (see FIG. 28).

In this case, it is also possible to perform actions since a part of the conductive pattern 250 is disposed to be exposed from the light transmission region 120, i.e., a part of the conductive pattern 250 is disposed to overlap with a part of the light transmission region 120 on a plan view when viewed from the normal direction of the display face of the optical element.

Next, the optical element 200 will be described in more details.

As shown in FIG. 1A and FIG. 2A, the optical element 200 includes the transparent substrate 110. The transparent substrate 110 is made of a glass substrate, PET (Poly Ethylen Terephthalate), PC (Poly Carbonate), PEN (Poly Ethylene Naphthalate), or the like.

The conductive patterns 250 are formed on the transparent substrate 110. The conductive patterns 250 are constituted with a conductive material such as aluminum, chrome, copper, chrome oxide, or carbon nanotube or a transparent conductive material such as ITO, ZnO, IGZO, a conductive carbon nanowire.

One light transmission region 120 or more is formed between the conductive patterns 250 on the transparent substrate 110. The electrophoretic element 140 that is a mixture of the electrophoretic particles 141 and the dispersion material 142 is disposed between each of the light transmission regions 120. The height of the light transmission region 120 is appropriate to be fall within a range of 30 μm to 300 μm, and it is 60 μm in the first exemplary embodiment.

The width of the light transmission region 120 is appropriate to be fall within a range of 1 μm to 150 μm, and it is 20 μm in the first exemplary embodiment. Further, the width of the space between each of the light transmission regions 120 is appropriate to be fall within a range of 0.25 μm to 40 μm, and it is 5 μm in the first exemplary embodiment.

Furthermore, the film thickness of the conductive pattern 250 is appropriate to fall within a range of 10 nm to 1000 nm, and it is 300 nm in the first exemplary embodiment.

Layout examples of the light transmission regions 120 and the conductive patterns 250 are shown in FIG. 9 to FIG. 12.

Figure 9A:
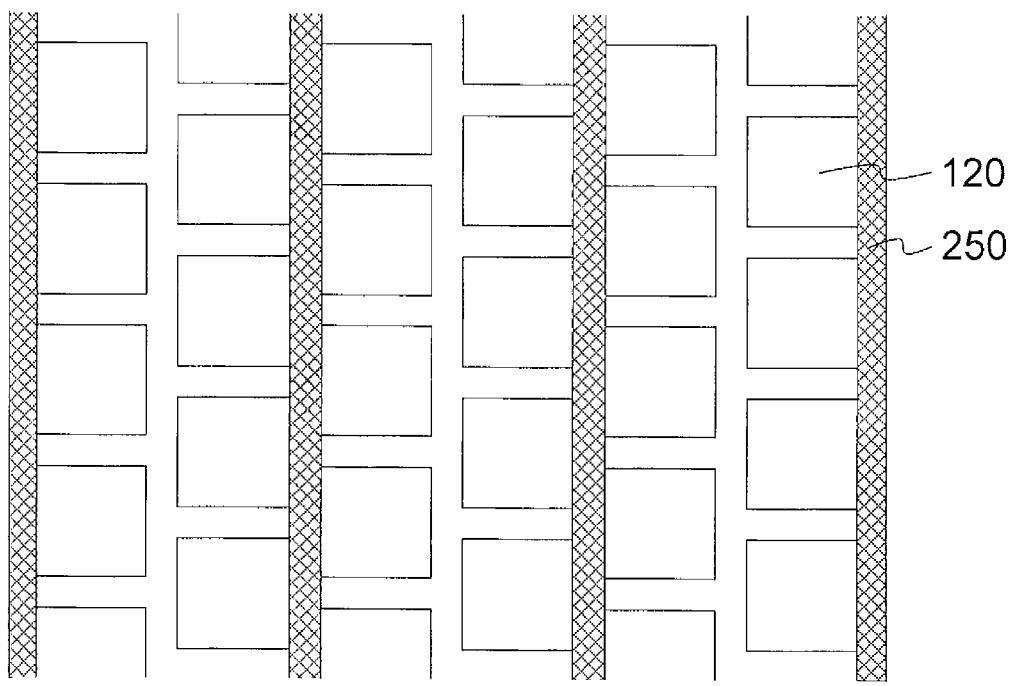
Figure 10A:
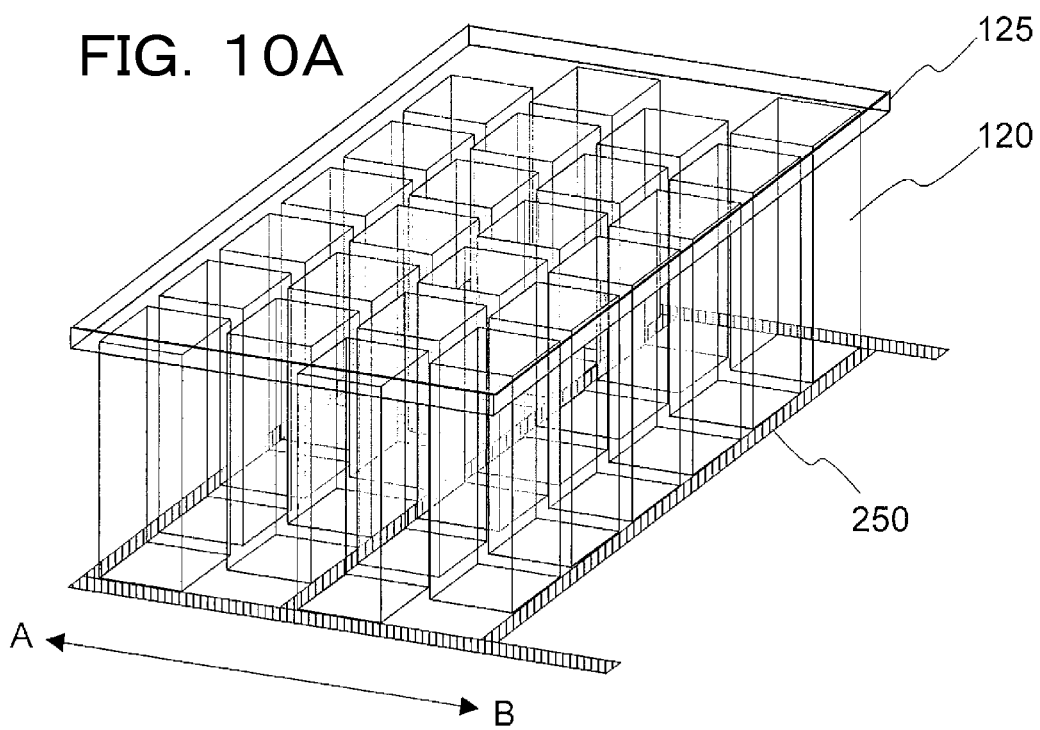

FIG. 9A and FIG. 10A show an example where the linear conductive patterns 250 are disposed in the same direction as that of the direction along which the light transmission regions 120 whose top and bottom faces 122 and 121 are in a square form are lined in a straight-line form. FIG. 9A shows the layout of the light transmission regions 120 and the conductive patterns 250 two-dimensionally when viewed from the normal direction of the top face of the light transmission regions 120. Further, FIG. 10A shows the state of the light transmission regions 120 and the conductive patterns 250 three-dimensionally when viewed obliquely from the above of the front side of the top face of the light transmission regions 120. The layout of the light transmission regions 120 is in a staggered layout as a whole as clearly shown in FIG. 9A. In this example, the conductive pattern 250 is formed in every other vertically long partial region constituted with the space formed lengthy in the longitudinal direction by being sandwiched between the light transmission regions 120 out of the regions sandwiched by a plurality of the light transmission regions 120 which are disposed by being isolated from each other in the longitudinal direction and the lateral direction as shown in FIG. 9A while no conductive pattern 250 is formed at all in the laterally lengthy partial region constituted with the space formed lengthy in the lateral direction by being sandwiched by the light transmission regions 120. Thus, the proportion of the area of the conductive patterns 250 with respect to the entire regions sandwiched between the light transmission regions 120 is roughly ¼. That is, compared to a conventional structure where both the transparent conductive film 125 in the transparent substrate 115 side and the transparent conductive film 123 on the transparent substrate 110 side are disposed in a planar manner over the entire element regions, the area of the part covered by the electrophoretic particles 141 in the wide viewing field mode can be decreased to about ¼ out of the regions sandwiched between the neighboring light transmission regions 120.

Figure 9B:
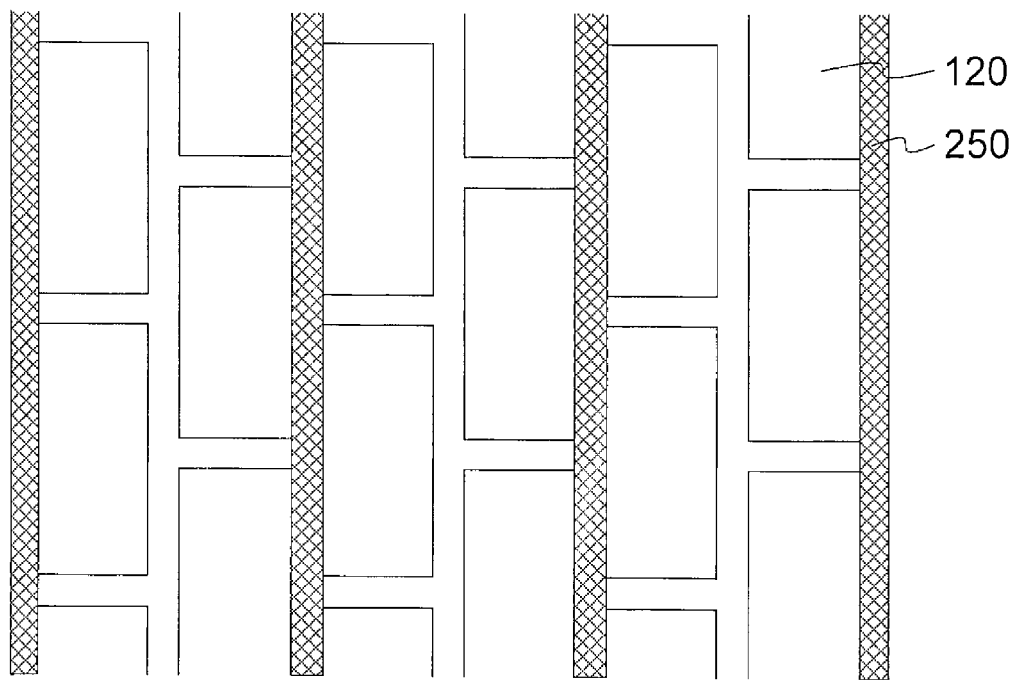
Figure 10B:
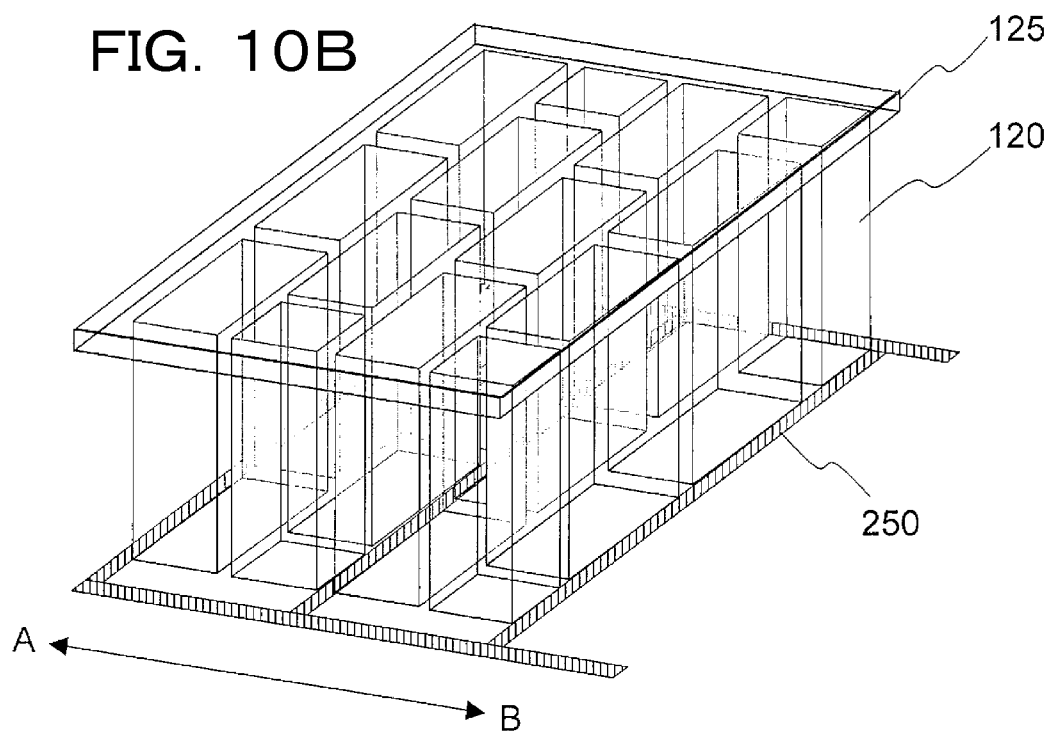

FIG. 9B and FIG. 10B show an example where the linear conductive patterns 250 are disposed in the same direction as that of the direction along which the light transmission regions 120 whose top and bottom faces 122 and 121 are in a rectangular form of about roughly 1:2 in the length and width ratio are lined in a straight-line form. FIG. 9B shows the layout of the light transmission regions 120 and the conductive patterns 250 two-dimensionally when viewed from the normal direction of the top face of the light transmission regions 120. Further, FIG. 10B shows the state of the light transmission regions 120 and the conductive patterns 250 three-dimensionally when viewed obliquely from the above of the front side of the top face of the light transmission regions 120. The layout of the light transmission regions 120 is in a staggered layout as a whole as clearly shown in FIG. 9B. In this example, the conductive pattern 250 is formed in every other vertically long partial region constituted with the space formed lengthy in the longitudinal direction by being sandwiched between the light transmission regions 120 out of the regions sandwiched by a plurality of the light transmission regions 120 which are disposed by being isolated from each other in the longitudinal direction and the lateral direction as shown in FIG. 9B while no conductive pattern 250 is formed at all in the laterally lengthy partial region constituted with the space formed lengthy in the lateral direction by being sandwiched by the light transmission regions 120. Thus, the proportion of the area of the conductive patterns 250 with respect to the entire regions sandwiched between the light transmission regions 120 is roughly ⅓. That is, compared to a conventional structure where both the transparent conductive film 125 in the transparent substrate 115 side and the transparent conductive film 123 on the transparent substrate 110 side are disposed in a planar manner over the entire element regions, the area of the part covered by the electrophoretic particles 141 in the wide viewing field mode can be decreased to about ⅓ out of the regions sandwiched between the neighboring light transmission regions 120.

Figure 11A:
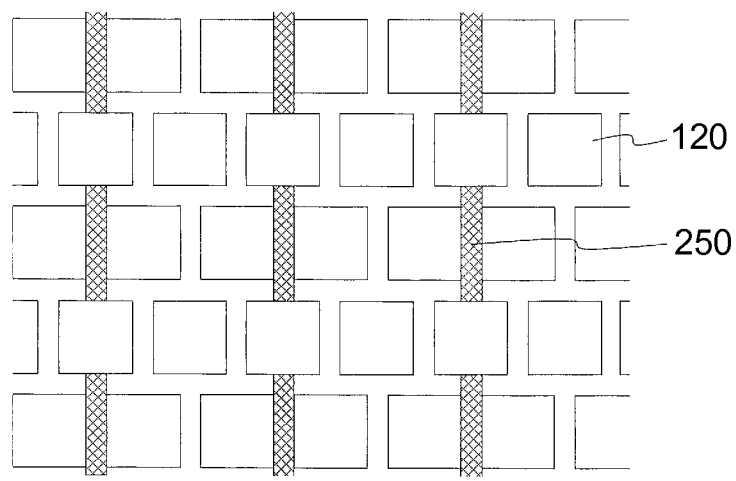
Figure 12A:
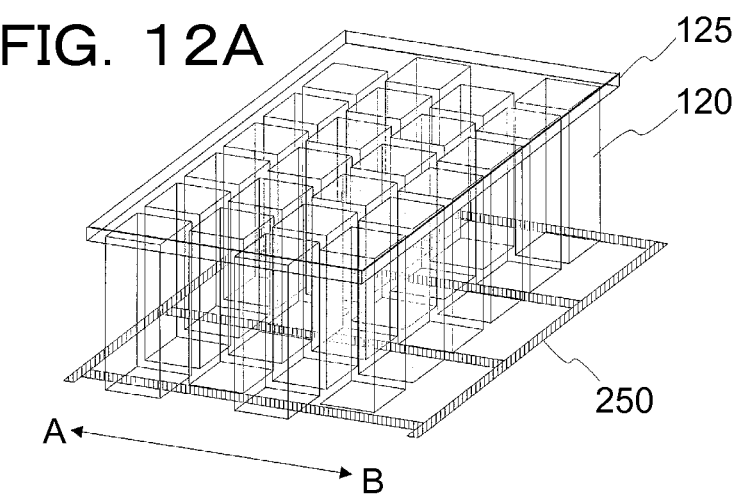

FIG. 11A and FIG. 12A show an example where the linear conductive patterns 250 are disposed in the direction that is rotated by 90 degrees from the direction along which the light transmission regions 120 whose top and bottom faces 122 and 121 are in a square form are lined in a straight-line form. FIG. 11A shows the layout of the light transmission regions 120 and the conductive patterns 250 two-dimensionally when viewed from the normal direction of the top face of the light transmission regions 120. Further, FIG. 12A shows the state of the light transmission regions 120 and the conductive patterns 250 three-dimensionally from the obliquely from the above of the front side of the top face of the light transmission regions 120. The layout of the light transmission regions 120 is in a staggered layout as a whole as clearly shown in FIG. 11A. As in the above-described case, compared to a conventional structure where both the transparent conductive film 125 in the transparent substrate 115 side and the transparent conductive film 123 on the transparent substrate 110 side are disposed in a planar manner over the entire element regions, it is evident that the area of the part covered by the electrophoretic particles 141 in the wide viewing field mode out of the regions sandwiched between the light transmission regions 120 can be decreased greatly.

In the example shown in FIG. 11A and FIG. 12A, the conductive patterns 250 which draw and cohere the electrophoretic particles 141 are the part shown by applying hatching in FIG. 11A, i.e., the part sandwiched by the neighboring light transmission regions 120. The part whose top and back faces are sandwiched by the transparent substrate 110 and the light transmission regions 120 simply functions as a means for electrically connecting the conductive pattern 250 sandwiched between the neighboring light transmission regions 120. Therefore, even with the structure in which the linear conductive patterns 250 are disposed in the direction that is rotated by 90 degrees from the direction along which the light transmission regions 120 whose top and bottom faces 122 and 121 are in a square form are lined in a straight-line form, the technical spirit of the present invention to exclude the electrophoretic particles 141 from the regions other than the vicinity of the surface of the conductive patterns 250 disposed only in a part of the regions sandwiched between the neighboring light transmission regions 120 can be followed by gathering the electrophoretic particles 141 in the vicinity of the surface of the conductive patterns 250.

Figure 11B:
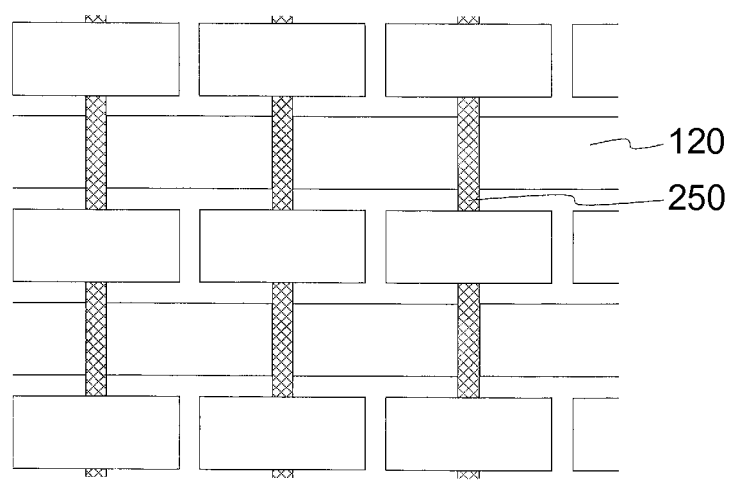
Figure 12B:
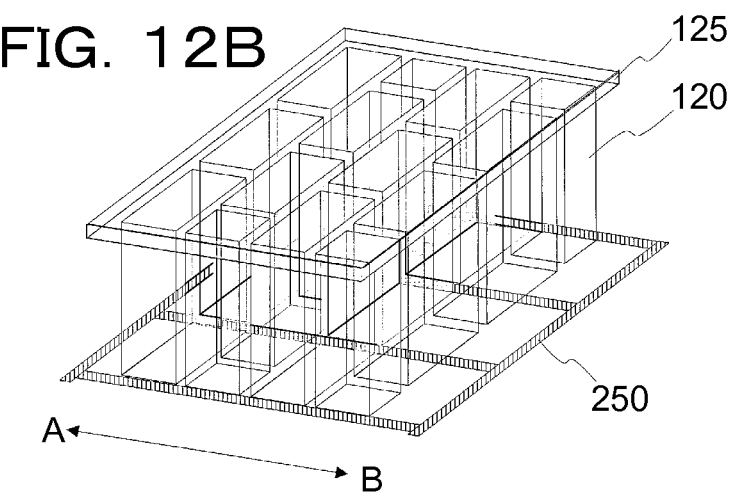

Further, FIG. 11B and FIG. 12B show an example where the linear conductive patterns 250 are disposed in the direction rotated by 90 degrees from the direction along which the light transmission regions 120 whose top and bottom faces 122 and 121 are in a rectangular form of about roughly 1:2 in the length and width ratio are lined in a straight-line form. FIG. 11B shows the layout of the light transmission regions 120 and the conductive patterns 250 two-dimensionally when viewed from the normal direction of the top face of the light transmission regions 120. Further, FIG. 12B shows the state of the light transmission regions 120 and the conductive patterns 250 three-dimensionally from the obliquely from the above of the front side of the top face of the light transmission regions 120. The layout of the light transmission regions 120 is in a staggered layout as a whole as clearly shown in FIG. 11B. As in the above-described case, compared to a conventional structure where both the transparent conductive film 125 in the transparent substrate 115 side and the transparent conductive film 123 on the transparent substrate 110 side are disposed in a planar form over the entire element regions, it is evident that the area of the part covered by the electrophoretic particles 141 in the wide viewing field mode out of the regions sandwiched between the light transmission regions 120 can be decreased greatly. In the example shown in FIG. 11B and FIG. 12B, the conductive patterns 250 which draw and cohere the electrophoretic particles 141 are the part shown by applying hatching in FIG. 11B, i.e., the part sandwiched by the neighboring light transmission regions 120. The part whose top and back faces are sandwiched by the transparent substrate 110 and the light transmission region regions 120 simply functions as a means for electrically connecting the conductive pattern 250 sandwiched between the neighboring light transmission regions 120. Therefore, even with the structure in which the linear conductive patterns 250 are disposed in the direction that is rotated by 90 degrees from the direction along which the light transmission regions 120 whose top and bottom faces 122 and 121 are in a rectangular form of about roughly 1:2 in the length and width ratio are lined in a straight line, the technical spirit of the present invention to exclude the electrophoretic particles 141 from the regions other than the vicinity of the surface of the conductive patterns 250 disposed only in a part of the regions sandwiched between the neighboring light transmission regions 120 can be followed by gathering the electrophoretic particles 141 in the vicinity of the surface of the conductive patterns 250.

Figure 11C:
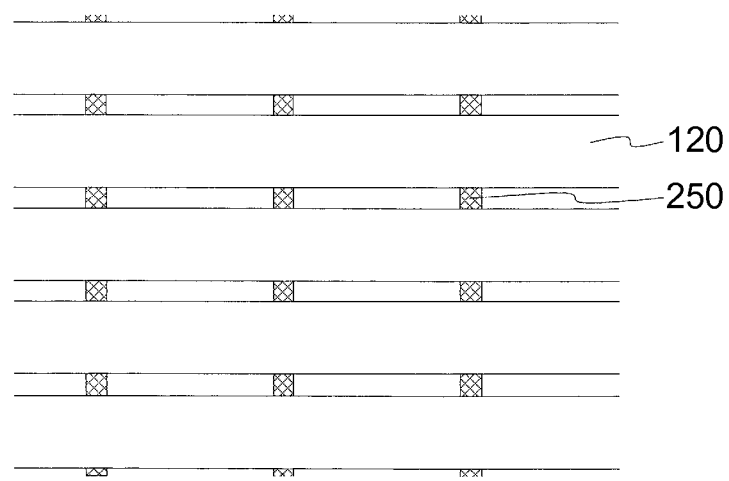
Figure 12C:
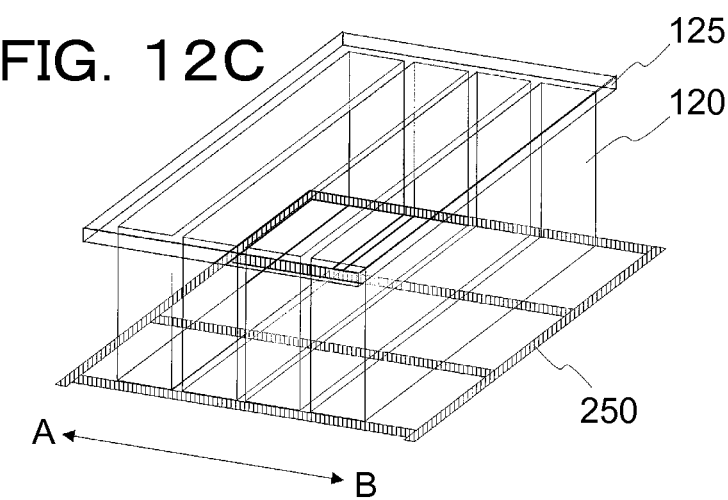

FIG. 11C and FIG. 12C show an example where the light transmission regions 120 whose top and bottom faces 122, 121 are in a lengthy rectangular form and disposed by being isolated from each other in a width direction, and the linear conductive patterns 250 are disposed in the linearly disposed direction of the light transmission regions 120, i.e., in the direction same as the width direction of the light transmission regions 120. FIG. 11C shows the layout of the light transmission regions 120 and the conductive patterns 250 two-dimensionally when viewed from the normal direction of the top face of the light transmission regions 120. Further, FIG. 12C shows the state of the light transmission regions 120 and the conductive patterns 250 three-dimensionally when viewed obliquely from the above of the front side of the top face of the light transmission regions 120. As in the above-described case, compared to a conventional structure where both the transparent conductive film 125 in the transparent substrate 115 side and the transparent conductive film 123 on the transparent substrate 110 side are disposed in a planar manner over the entire element regions, it is evident that the area of the part covered by the electrophoretic particles 141 in the wide viewing field mode out of the regions sandwiched between the light transmission regions 120 can be decreased greatly. In the example shown in FIG. 11C and FIG. 12C, the conductive patterns 250 which draw and cohere the electrophoretic particles 141 are the part shown by applying hatching in FIG. 11C, i.e., the part sandwiched by the neighboring light transmission regions 120. The part whose top and back faces are sandwiched by the transparent substrate 110 and the light transmission region regions 120 simply functions as a means for electrically connecting the conductive pattern 250 sandwiched between the neighboring light transmission regions 120. Therefore, even with the structure in which the light transmission regions 120 whose top and bottom faces 122, 121 are in a lengthy rectangular form and the linear conductive patterns 250 are disposed in the linearly disposed direction of the light transmission regions 120, i.e., in the direction rotated by 90 degrees from the longitudinal direction of the space formed between the neighboring light transmission regions 120, the technical spirit of the present invention to exclude the electrophoretic particles 141 from the regions other than the vicinity of the surface of the conductive patterns 250 disposed only in a part of the regions sandwiched between the neighboring light transmission regions 120 can be followed by gathering the electrophoretic particles 141 in the vicinity of the surface of the conductive patterns 250.

The visible angles in the narrow viewing field mode in the A-A direction shown in each of the drawings FIG. 10 and FIG. 12 are limited to about ±30 degrees.

Figure 31A:
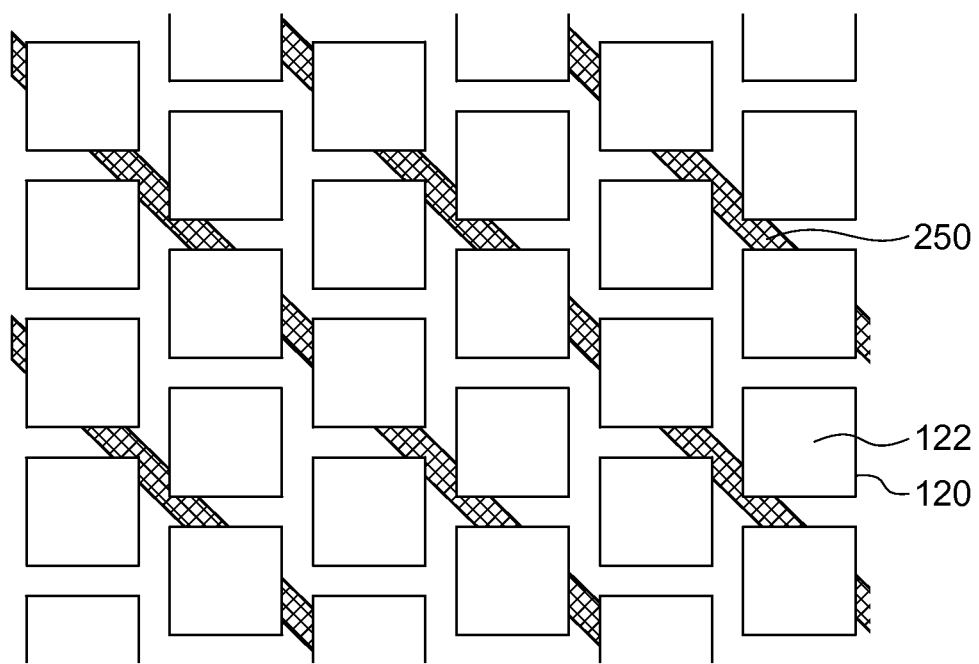
Figure 32A:
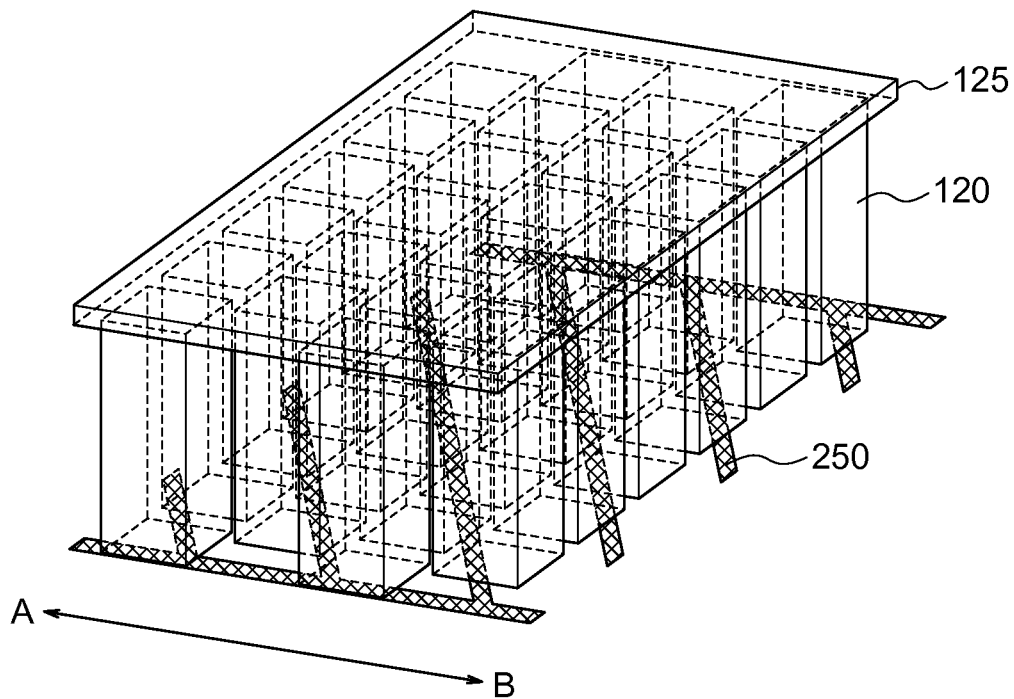

FIG. 31A and FIG. 32A show an example where the linear conductive patterns 250 are disposed in the direction that is rotated by 45 degrees from the direction along which the light transmission regions 120 whose top and bottom faces 122 and 121 are in a square form are lined in a straight-line form. FIG. 31A shows the layout of the light transmission regions 120 and the conductive patterns 250 two-dimensionally when viewed from the normal direction of the top face 122 of the light transmission regions 120. Further, FIG. 32A shows the state of the light transmission regions 120 and the conductive patterns 250 three-dimensionally when viewed obliquely from the above of the front side of the top face 122 of the light transmission regions 120. The layout of the light transmission regions 120 is in a staggered layout as a whole as clearly shown in FIG. 31A. As in the above-described case, compared to a conventional structure where both the transparent conductive film 125 in the transparent substrate 115 side and the transparent conductive film 123 on the transparent substrate 110 side are disposed in a planar manner over the entire element regions, it is evident that the area of the part covered by the electrophoretic particles 141 in the wide viewing field mode out of the regions sandwiched between the light transmission regions 120 can be decreased greatly. In the example shown in FIG. 31A and FIG. 32A, the conductive patterns 250 which draw and cohere the electrophoretic particles 141 are the part shown by applying hatching in FIG. 31A, i.e., the part sandwiched by the neighboring light transmission regions 120. The part of the conductive patterns 250 whose top and back faces are sandwiched by the transparent substrate 110 and the light transmission region regions 120 simply functions as a means for electrically connecting the conductive pattern 250 sandwiched between the neighboring light transmission regions 120. Therefore, even with the structure in which the linear conductive patterns 250 are disposed in the direction that is rotated by 45 degrees from the direction along which the light transmission regions 120 whose top and bottom faces 122 and 121 are in a square form are lined in a straight-line form, the technical spirit of the present invention to exclude the electrophoretic particles 141 from the regions other than the vicinity of the surface of the conductive patterns 250 disposed only in a part of the regions sandwiched between the neighboring light transmission regions 120 can be followed by gathering the electrophoretic particles 141 in the vicinity of the surface of the conductive patterns 250.

Figure 31B:
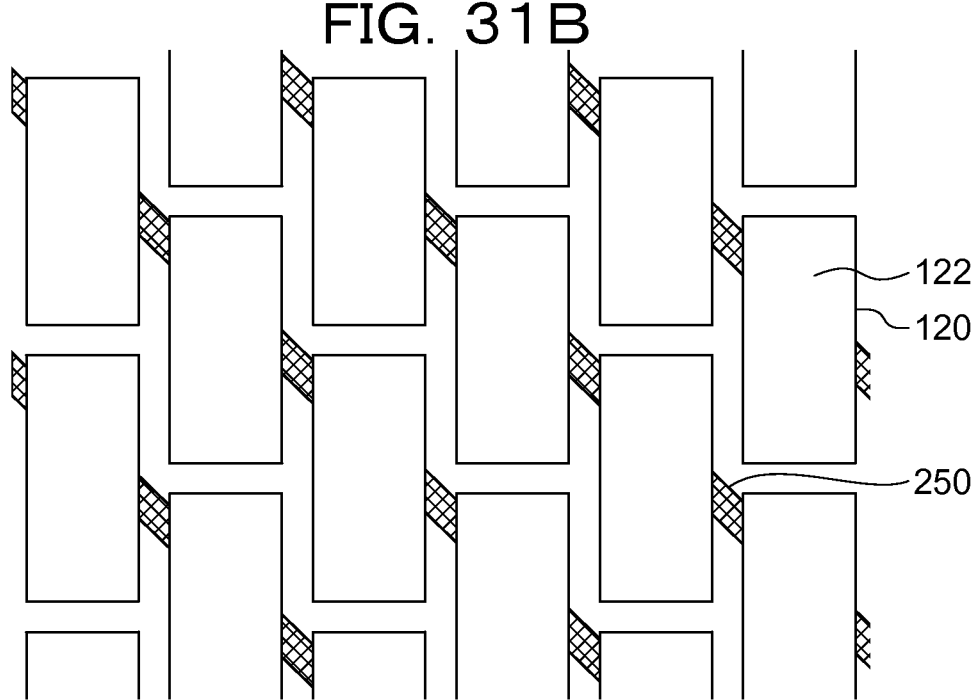
Figure 32B:
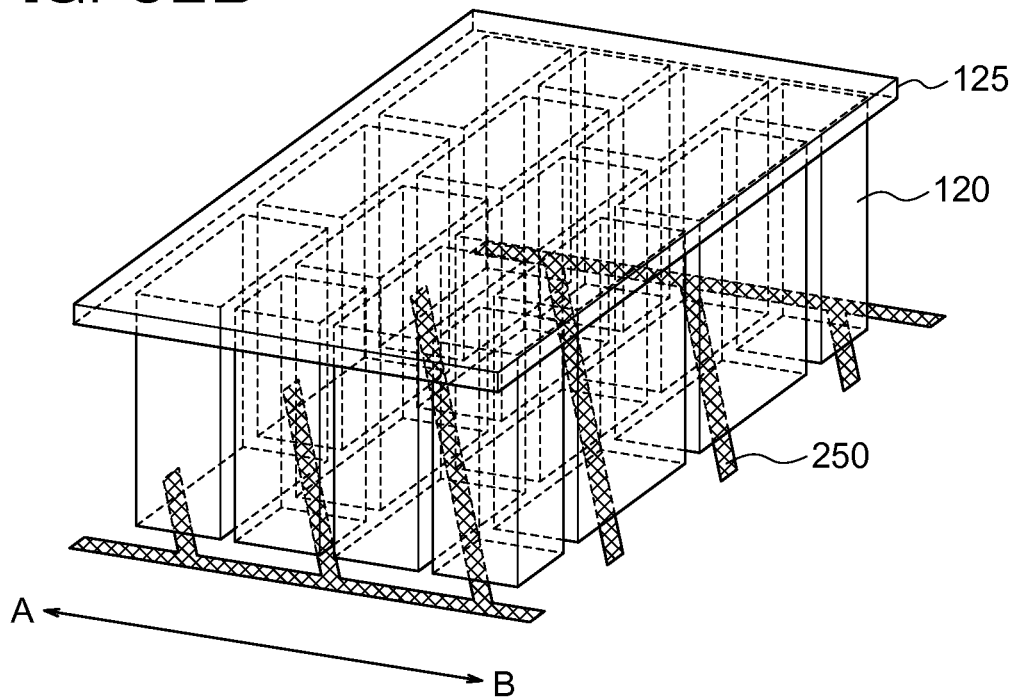

FIG. 31B and FIG. 32B show an example where the linear conductive patterns 250 are disposed in the direction rotated by 45 degrees from the direction along which the light transmission regions 120 whose top and bottom faces 122 and 121 are in a rectangular form of about roughly 1:2 in the length and width ratio are lined in a straight-line form. FIG. 31B shows the layout of the light transmission regions 120 and the conductive patterns 250 two-dimensionally when viewed from the normal direction of the top face 122 of the light transmission regions 120. Further, FIG. 32B shows the state of the light transmission regions 120 and the conductive patterns 250 three-dimensionally when viewed obliquely from the above of the front side of the top face 122 of the light transmission regions 120. The layout of the light transmission regions 120 is in a staggered layout as a whole as clearly shown in FIG. 31B. As in the above-described case, compared to a conventional structure where both the transparent conductive film 125 in the transparent substrate 115 side and the transparent conductive film 123 on the transparent substrate 110 side are disposed in a planar manner over the entire element regions, it is evident that the area of the part covered by the electrophoretic particles 141 in the wide viewing field mode out of the regions sandwiched between the light transmission regions 120 can be decreased greatly. In the example shown in FIG. 31B and FIG. 32B, the conductive patterns 250 which draw and cohere the electrophoretic particles 141 are the part shown by applying hatching in FIG. 31B, i.e., the part sandwiched by the neighboring light transmission regions 120. The part of the conductive pattern 250 whose top and back faces are sandwiched by the transparent substrate 110 and the light transmission region regions 120 simply functions as a means for electrically connecting the conductive pattern 250 sandwiched between the neighboring light transmission regions 120. Therefore, even with the structure in which the linear conductive patterns 250 are disposed in the direction that is rotated by 45 degrees from the direction along which the light transmission regions 120 whose top and bottom faces 122 and 121 are in a rectangular form of about roughly 1:2 in the length and width ratio are lined in a straight-line form, the technical spirit of the present invention to exclude the electrophoretic particles 141 from the regions other than the vicinity of the surface of the conductive patterns 250 disposed only in a part of the regions sandwiched between the neighboring light transmission regions 120 can be followed by gathering the electrophoretic particles 141 in the vicinity of the surface of the conductive patterns 250.

Figure 34A:
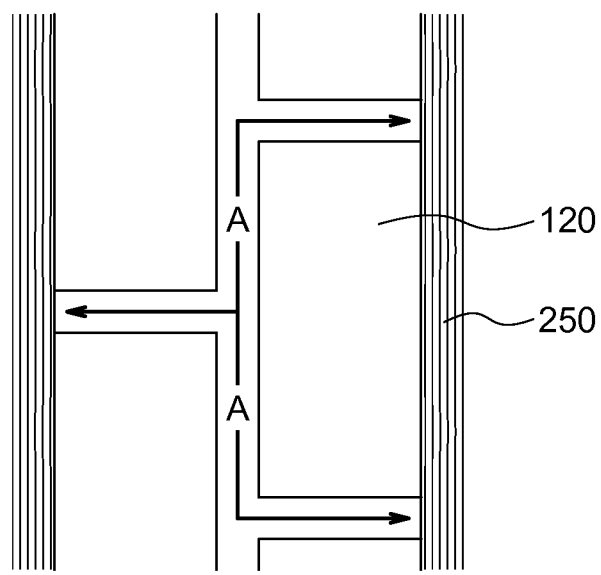

As shown in FIG. 34A, in the case where the linear conductive patterns 250 are disposed in the direction same as the direction along which the light transmission regions 120 are lined in a straight-line form, as shown by the positions A in FIG. 34A, the electrophoretic particles 141 existing within the regions sectioned along the linearly lined direction of the light transmission regions 120 by being sandwiched between the neighboring light transmission regions 120 migrate along the linearly lined direction of the light transmission regions 120 in the region where the particles 141 exist to the position at which the region closest to the position of the particles 141 and the region where the particles 141 exist meet with each other out of the regions sectioned when the light transmission regions 120 intersect with the linearly lined direction of the light transmission regions 120 when the drawn and cohered electrophoretic particles 141 migrate towards the conductive patterns 250. Further, the electrophoretic particles 141 are required to reach the closest conductive pattern 250 by migrating in the region sandwiched between the neighboring light transmission regions 120 and sectioned when the light transmission region 120 intersect with the linearly lined direction of the light transmission regions 120 through changing the traveling direction by 90 degrees at the above-described mixing position.

Figure 34B:
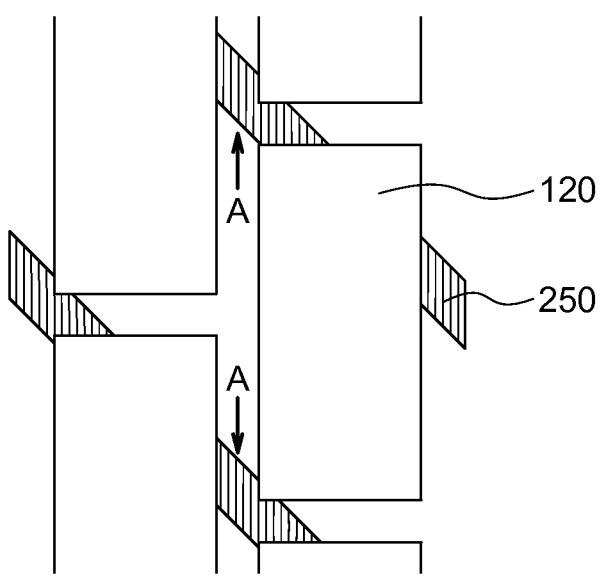

In the meantime, as shown in FIG. 34B, through disposing the linear conductive patterns 250 in the direction rotated by 45 degrees from the linearly lined direction of the light transmission regions 120, the electrophoretic particles 141 existing in the positions A of FIG. 34B simply need to migrate in the region where the particles 141 exist linearly along the linearly lined direction of the light transmission regions 120 when the drawn and cohered electrophoretic particles 141 migrate towards the conductive patterns 250. Therefore, the time required for gathering the electrophoretic particles 141 in the vicinity of the surface of the conductive patterns 250 can be shortened, so that it is possible to perform a visible range control with a fine responsiveness. While FIG. 31 and FIG. 32 show the case where the linear conductive patterns 250 are disposed in the direction rotated by 45 degrees from the linearly lined direction of the light transmission regions 120, it is possible to improve the responsiveness of the visible range control due to the same reasons described above by setting the rotating angle of the linear conductive patterns 250 with respect to the linearly lined direction of the light transmission regions 120 to be larger than 0 degree and equal to or less than 90 degrees. Further, the visible angles in the narrow viewing field mode in the A-A direction shown in each of the drawings FIGS. 32A and 32B are limited to about ±30 degrees.

Next, steps of manufacturing the optical element according to the first exemplary embodiment will be described in more details by referring to FIG. 3.

First, the conductive patterns 250 are formed on the surface of the transparent substrate 110 that is constituted with glass, PET, PC, or PEN (see FIG. 3A), and the transparent photosensitive resin layer 150 is formed thereon (see FIG. 3B). The conductive patterns 250 can be formed by using a conductive material such as aluminum, chrome, copper, chrome oxide, or carbon nanotube, or by using a transparent conductive material such as ITO, ZnO, IGZO, or conductive nanowire. In the first exemplary embodiment, aluminum is used.

As a method for forming the transparent photosensitive layer 150, it is possible to use any of depositing methods such as slit die coater, wire coater, applicator, dry film transcription, spray application, and screen printing, for example. The thickness of the transparent photosensitive resin layer 150 is preferable to be within a range of 30 μm to 300 μm, and it is 60 μm in the first exemplary embodiment. A transparent photosensitive resin used for the transparent photosensitive resin layer 150 is a chemical amplification type photoresist (product name "SU-8") of Microchem, for example.

Features of the transparent photosensitive resin are as follows.

It is a negative resist of epoxy (specifically bisphenol A novolac glycidyl ether derivative) which polymerize a curing monomer by using proton acid as a catalyst which is generated by photoinitiator when ultraviolet ray is irradiated.

It exhibits an extremely high transparent characteristic in a visible light region.

The molecule amount of the curing monomer contained in the transparent photosensitive resin before being cured is relatively small, so that it is dissolved extremely easily in a solvent such as cyclopentanon, propylene glycol methyl ether acetate (PEGMEA), gamma butyrolactone (GBL), or methyl isobutyl ketone (MIBK). Thus, it is easy to be formed in a thick film.

The light transmission property thereof is extremely good even for the wavelength of the near ultraviolet region, so that ultraviolet rays can be transmitted even when formed in a thick film.

It is possible to form patterns with a high aspect ratio of 3 or more due to the above-described features.

There are many functional groups in the curing monomer, so that the curing monomer after being cured becomes an extremely high density cross-linkage, which is extremely stable thermally and chemically. As a result, processing after forming the patterns can be done easily.

Needless to mention that the transparent photosensitive resin layer 150 is not limited only to the transparent photosensitive resin (product name "SU-8") but any photocurable materials may be used as long as the materials exhibit the similar characteristics.

Subsequently, the transparent photosensitive resin layer 150 is patterned by using the mask pattern 161 of the photomask 160 (see FIG. 3C). Light 165 used for exposure is parallel light. A UV light source is used for the light source, and UV light with wavelength of 365 nm is irradiated as the exposure light 165. The exposure amount at this time is appropriate to be within a range of 50 mJ/cm$^2$ to 1000 mJ/cm$^2$, and it is 200 mJ/cm$^2$ in the first exemplary embodiment.

Development is performed after the exposure. Then, thermal annealing is performed at 120 degrees for thirty minutes to form the light transmission regions 120 (see FIG. 3D). The refractive index of the light transmission regions 120 formed with SU-8 is 1.5 to 1.6. As described, formed is a structure in which the conductive patterns 250 are disposed on the surface of the transparent substrate 110 in a part of the regions sandwiched between the neighboring light transmission regions 120.

Subsequently, another transparent substrate 115 including the transparent conductive film 125 is formed on the light transmission regions 120 (see FIG. 3E). The transparent substrate 115 is fixed by gluing the top face of the light transmission regions 120 and the transparent conductive film 125 and by further sealing the outer circumference part of the transparent substrate 110 by a resin, not shown. The adhesive used at this time may be of a thermal setting type or a UV curable type.

At last, the electrophoretic elements 140 are filled in the space between the transparent substrate 110 and the other transparent substrate 115 (see FIG. 3F). The electrophoretic elements 140 are the mixture of the electrophoretic particles 141 and the dispersion material 142.

As described above, the orders of performing disposition of the other transparent substrate 115 including the other transparent conductive film 125 shown in FIG. 3E and filling of the electrophoretic elements 140 in the space between each of the light transmission regions 120 shown in FIG. 3F may be inverted (see FIG. 4).

FIG. 5 is a sectional view showing still other manufacturing steps of the optical element according to the first exemplary embodiment. Hereinafter, the still other manufacturing steps of the optical element will be described in details.

First, the transparent conductive film 125 is formed on the surface of the other transparent substrate 115 that is made of glass, PET, PC, or PEN (see FIG. 5A). The transparent photosensitive resin layer 150 is formed thereon (see FIG. 5B).

Subsequently, the transparent photosensitive resin layer 150 is patterned by using the mask pattern 161 of the photomask 160 (see FIG. 5C). Development is performed after the exposure. Then, thermal annealing is performed at 120 degrees for thirty minutes to form the light transmission regions 120 (see FIG. 5D).

Subsequently, the transparent substrate 110 including the conductive patterns 250 is formed on the light transmission regions 120 (see FIG. 5E). At last, the electrophoretic elements 140 are filled in the space between the transparent substrate 110 and the other transparent substrate 115 (see FIG. 5F). At this time, the position of the transparent substrate 110 is controlled so that at least a part of the conductive patterns 250 is exposed towards the space between the light transmission regions 120 from the light transmission regions 120.

The orders of performing disposition of the transparent substrate 110 including the conductive patterns 250 shown in FIG. 5E and filling of the electrophoretic elements 140 in the space between each of the light transmission regions 120 shown in FIG. 5F may be inverted.

Second Exemplary Embodiment

Figure 6B:
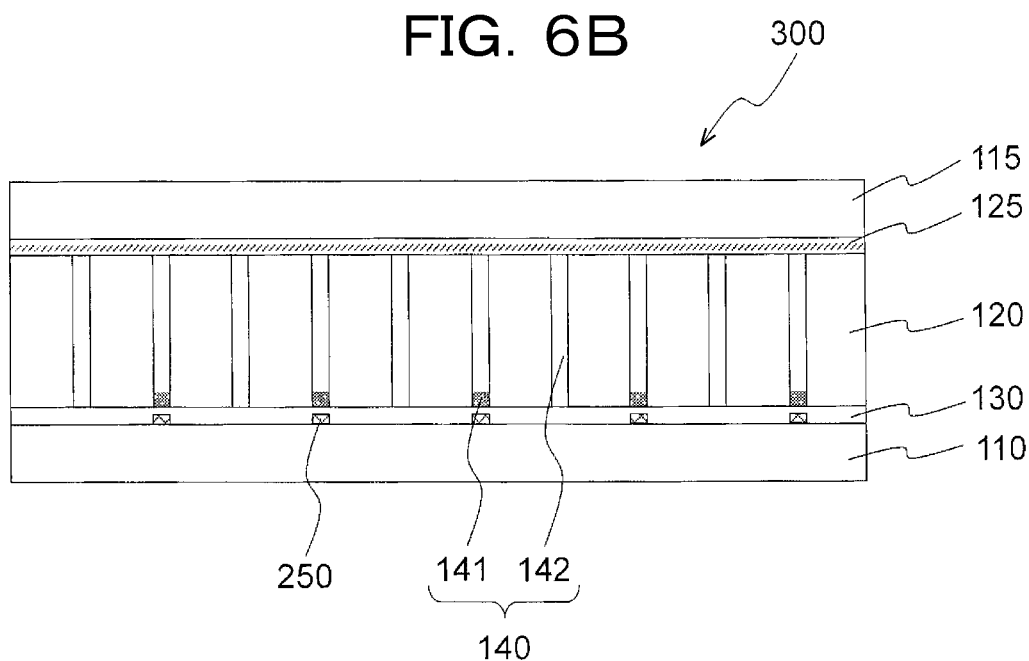

FIGS. 6A and 6B show longitudinal sectional views of an optical element 300 according to a second exemplary embodiment, in which FIG. 6A shows the state of the optical element 300 in a narrow viewing field mode and FIG. 6B shows a state of the optical element 300 in a wide viewing field mode. In FIGS. 6A and 6B, same reference numerals are applied to the elements same as those of FIGS. 1A and 1B. Hereinafter, details of the optical element 300 according to the second exemplary embodiment will be described.

As shown in FIG. 6A, in the second exemplary embodiment, a protection cover film 130 for covering the conductive patterns 250 is disposed between the transparent substrate 110 where the conductive patterns 250 are disposed and the light transmission regions 120.

The film thickness of the protection cover film 130 is appropriate to fall within a range of 10 nm to 1000 nm, and it is 300 nm in the second exemplary embodiment. As the structural material used for the protection cover film 130 may be a silicon oxide film, a silicon nitride film, a silicon oxynitride film, or the like, and used in the second exemplary embodiment is a silicon oxide film. Further, while the protection cover film 130 is formed on the entire surface of the transparent substrate 110 where the conductive patterns 250 are formed in FIGS. 6A and 6B, it is not essential to cover the entire surface. It is simply required to cover the surface of the conductive patterns 250.

With the above-described structure, contact between the conductive patterns 250 and the electrophoretic elements 140 can be prevented by covering the conductive patterns 250 with the protection cover film 130. Thus, operation deterioration and the like that may be caused when the electrophoretic elements 140 attach to the conductive patterns 250 do not occur, so that a visible range control with a fine operation stability can be achieved. Further, as the environment for keeping the electrophoretic elements 140, the air-tightness can be improved by adding the protection cover film 130 to the conventional structure. This makes it possible to achieve the optical element with fine reliability.

Other structures, operations, and effect of the second exemplary embodiment are the same as those described in the first exemplary embodiment.

Third Exemplary Embodiment

Figure 7A:
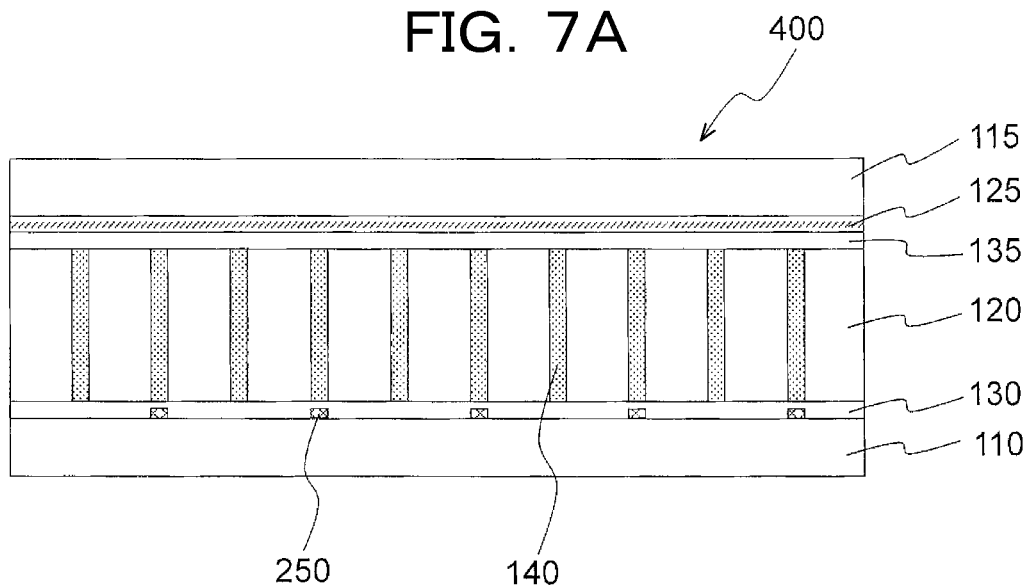
Figure 7B:
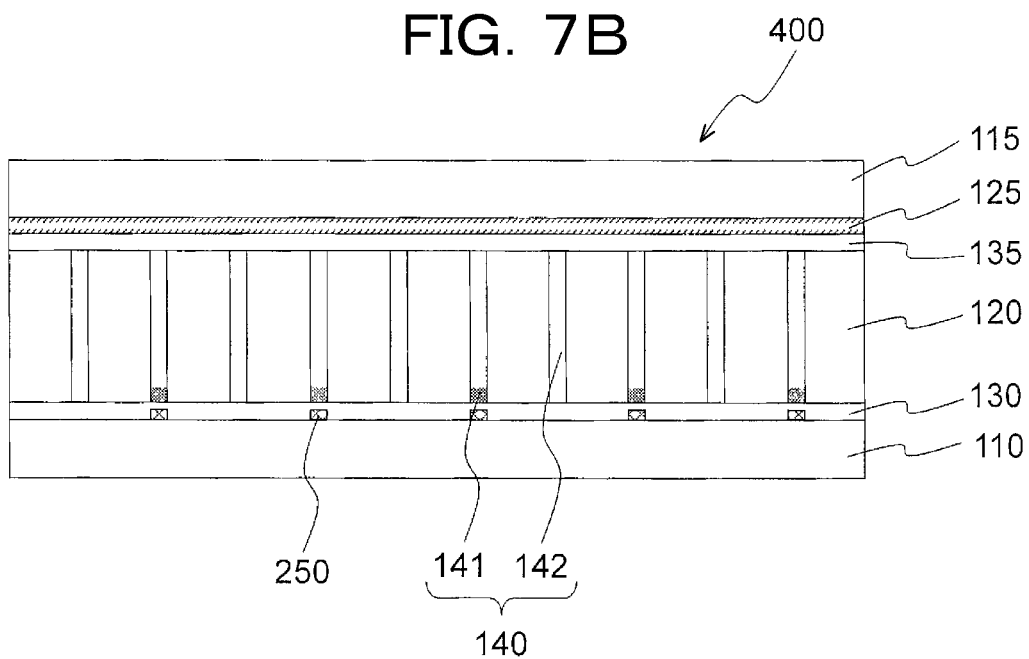

FIGS. 7A and 7B show longitudinal sectional views of an optical element 400 according to a third exemplary embodiment, in which FIG. 7A shows the state of the optical element 400 in a narrow viewing field mode and FIG. 7B shows a state of the optical element 400 in a wide viewing field mode. In FIGS. 7A and 7B, same reference numerals are applied to the elements same as those of FIGS. 1A and 1B.

Hereinafter, details of the optical element 400 according to the third exemplary embodiment will be described.

As shown in FIGS. 7A and 7B, in the third exemplary embodiment, the conductive patterns 250, the protection cover film 130, and the light transmission regions 120 are formed on the transparent substrate 110 as in the case of the second exemplary embodiment. On the top face of the light transmission regions 120, another transparent substrate 115 including a second protection cover film 135 for covering the transparent conductive film 125 stacked on the surface thereof is disposed.

The film thickness of the transparent conductive film 125 and the second protection cover film 135 is appropriate to fall within a range of 10 nm to 1000 nm, and it is 300 nm in the third exemplary embodiment. As the structural material used for the protection cover film 130 may be a silicon oxide film, a silicon nitride film, a silicon oxynitride film, or the like, and used in the third exemplary embodiment is a silicon oxide film which is same as the structural material of the protection cover film 130. Further, while the second protection cover film 135 is formed also between the transparent conductive film 125 and the light transmission regions 120 in FIG. 7, it is not essential. It is simply required to cover the region of the transparent conductive film 125 other than the region that is in contact with the light transmission regions 120, i.e., the region to be in contact with the electrophoretic elements 140, with the second protection film 135.

With the above-described structure, contact between the transparent conductive film 125 and the electrophoretic elements 140 can be prevented. Thus, attachment and the like the electrophoretic elements 140 to the transparent conductive film 125 do not occur, so that a visible range control with a fine operation stability can be achieved. Further, as the environment for keeping the electrophoretic elements, the air-tightness can be improved further by adding the second protection cover film to the structure of the third exemplary embodiment. This makes it possible to achieve the optical element with fine reliability.

Other structures, operations, and effect of the third exemplary embodiment are the same as those described in the first and second exemplary embodiments.

Fourth Exemplary Embodiment

Figure 13A:
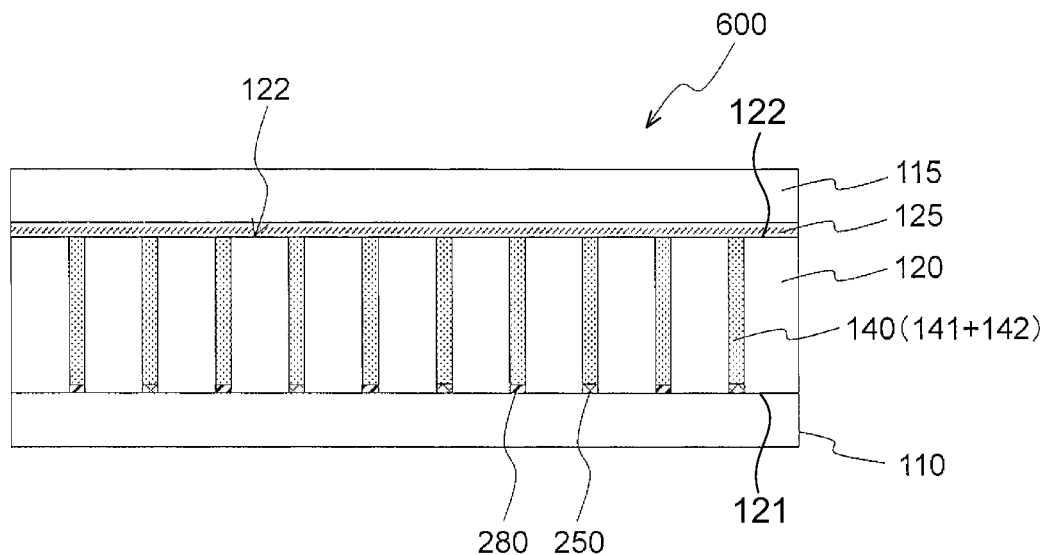
Figure 13B:
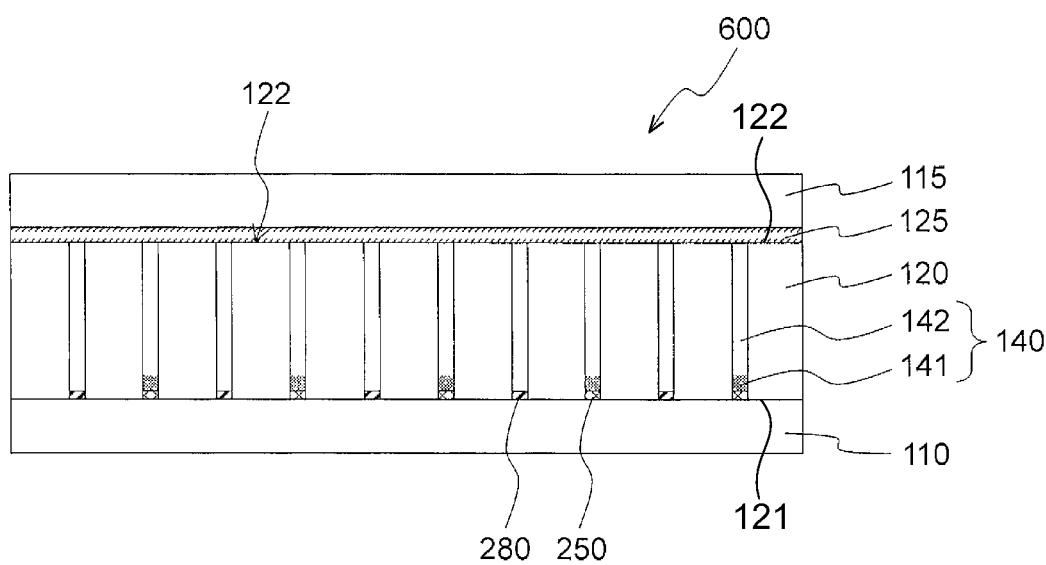
Figure 14A:
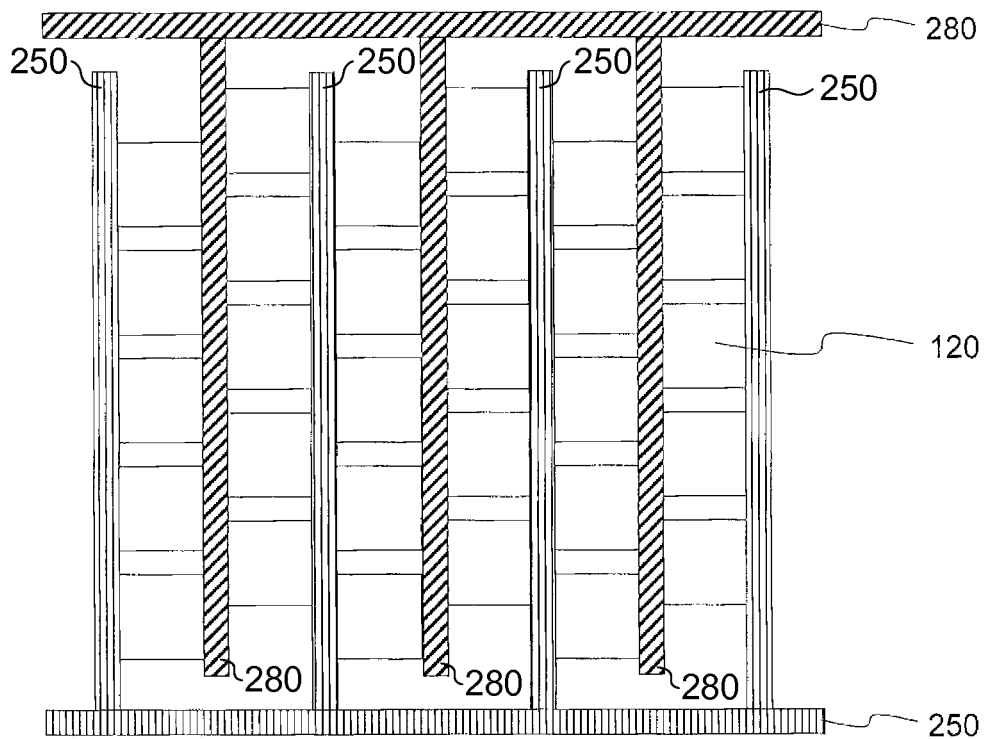
Figure 14B:
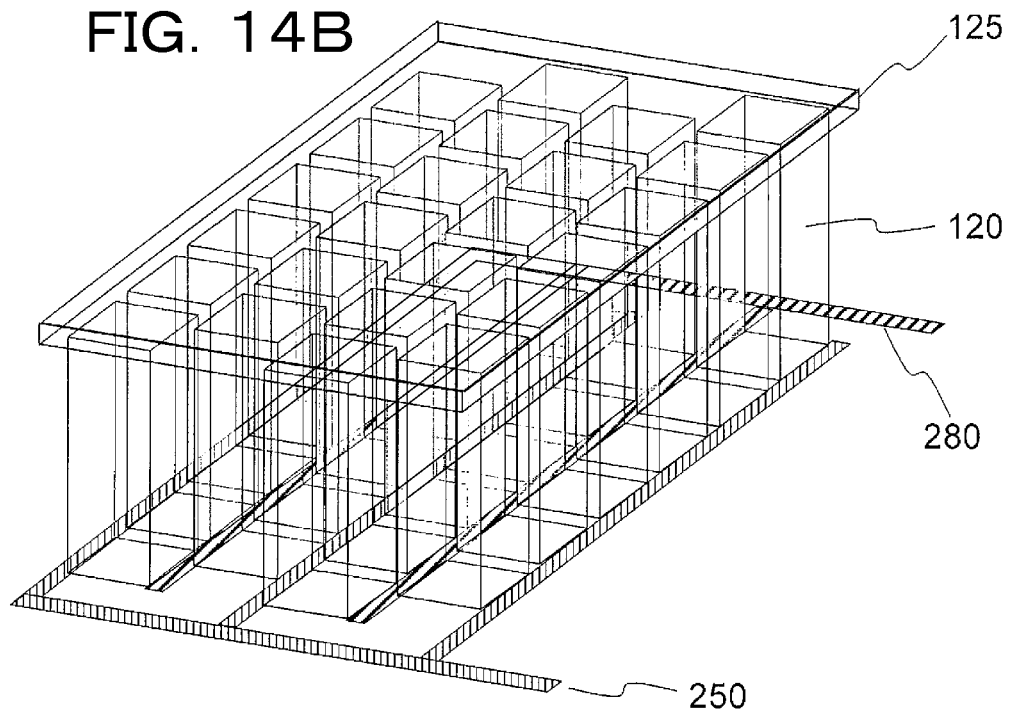

FIGS. 13A and 13B show longitudinal sectional views of an optical element 600 according to a fourth exemplary embodiment, in which FIG. 13A shows the state of the optical element 600 in a narrow viewing field mode and FIG. 13B shows a state of the optical element 600 in a wide viewing field mode. Further, FIG. 14A is a plan view showing the state of layout of the light transmission regions 120, the conductive patterns 250, and transparent conductive patterns 280 according to the fourth exemplary embodiment, and FIG. 14B is a perspective view thereof. In FIGS. 13A, 13B and FIGS. 14A, 14B, same reference numerals as those of the first exemplary embodiment are applied to the elements same as those of FIGS. 1A and 1B. Hereinafter, details of the optical element according to the fourth exemplary embodiment will be described.

As shown in FIG. 13A, in the fourth exemplary embodiment, the conductive patterns 250 and the transparent conductive patterns 280 are disposed on the first transparent substrate 110, and the light transmission regions 120 are disposed between the conductive pattern 250 and the transparent conductive pattern 280. As shown in FIG. 14A, the conductive pattern 250 and the transparent conductive pattern 280 are disposed alternately in the region of the longitudinally lengthy part that is constituted by a space formed lengthy in the longitudinal direction by being sandwiched between the light transmission regions 120.

That is, the optical element 600 according to the fourth exemplary embodiment includes: the first transparent substrate 110; the second transparent substrate 115 provided by opposing to the first transparent substrate 110; a plurality of the light transmission regions 120 disposed by being isolated from each other to reach the surface of the second transparent substrate 115 from the surface of the first transparent substrate 110; the conductive patterns 250 disposed on the surface of the first transparent substrate 110 in a part of regions sandwiched between the neighboring light transmission regions 120; the transparent conductive patterns 280 disposed in a part of the region on the surface of the first transparent substrate 110 where the conductive patterns 250 are not disposed; the transparent conductive film 125 disposed on the face of the second transparent substrate 115 opposing to the first transparent substrate 110; and the electrophoretic elements 140 disposed between the neighboring light transmission regions 120.

The electrophoretic element 140 is a mixture of light-shielding electrophoretic particles 141 of a specific electric charge and a transmissive dispersion material 142.

More specifically, the optical element 600 of the fourth exemplary embodiment includes: the first transparent substrate 110; the second transparent substrate 115 provided by opposing to the first transparent substrate 110 with a space provided therebetween; the transparent conductive film 125 disposed on the surface of the second transparent substrate 115 opposing to the first transparent substrate 110; a plurality of the light transmission regions 120 which are disposed in the space between the first transparent substrate 110 and the transparent conductive film 125 in parallel to the display face of the optical element 600 by being isolated from each other in two mutually orthogonal directions, i.e., in the longitudinal and lateral directions of FIG. 14A, in such a manner that the bottom face 121 thereof abuts against the first transparent substrate 110 and the top face 122 thereof reaches the second transparent substrate 115; the conductive patterns 250 disposed on the surface of the first transparent substrate 110 in a part of regions sandwiched between the neighboring light transmission regions 120; the transparent conductive patterns 280 disposed in a part of the regions on the surface of the first transparent substrate 110 where the conductive patterns 250 are not disposed, more strictly, in a part of the remaining region when excluding the region where the conductive pattern 250 is disposed from the regions sandwiched between the neighboring light transmission regions 120; and the electrophoretic elements 140 which are disposed to fill the spaces between the neighboring light transmission regions 120 disposed by being isolated from each other regardless of existence of the conductive patterns 250 and the transparent conductive patterns 280.

The film thickness of both the conductive patterns 250 and the transparent conductive patterns 280 is appropriate to fall within a range of 10 nm to 1000 nm, and it is 300 nm for the both in the fourth exemplary embodiment. The structural material used for the transparent conductive patterns 280 may be ITO, ZnO, IGZO, conductive nanowire or the like. In the fourth exemplary embodiment, ITO is used.

Figure 29A:
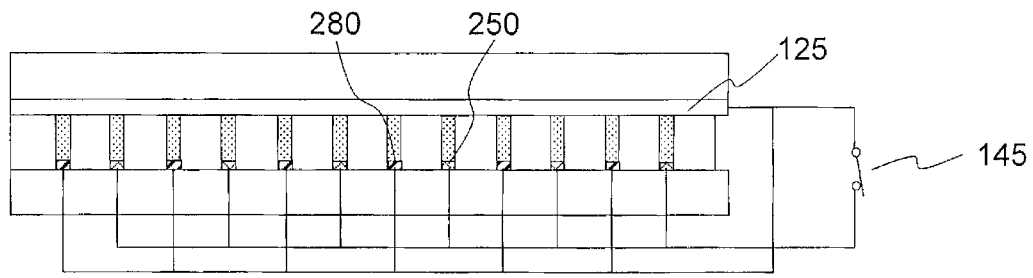

The narrow viewing field mode shown in FIG. 13A is achieved by dispersing electrophoretic particles 141 in the electrophoretic elements 140 disposed in the spaces between each of the light transmission regions 120 within the dispersion material 142 by setting the conductive patterns 250, the transparent conductive patterns 280, and the transparent conductive film 125 to be in a same potential (see FIG. 29A). In the meantime, the wide viewing field mode shown in FIG. 13B is achieved by setting the transparent conductive patterns 280 and the transparent conductive film 125 to be in a same potential and setting the conductive patterns 250 to be in a higher potential than that of the transparent conductive patterns 280 and the transparent conductive film 125 (see FIG. 29 in a case where the surface charge of the electrophoretic particles 141 is (−)). Further, in a case where the surface charge of the electrophoretic particles 141 is (+), the wide viewing field mode of FIG. 13B is achieved by setting the potentials to be in the relation shown in FIG. 29C, i.e., by inverting the polarities of the electrodes. In other words, in both cases, through gathering the electrophoretic particles 141 in the vicinity of the surface of the conductive patterns 250 by setting the relative potential of the transparent conductive patterns 280 with respect to the conductive patterns 250 to be in the same polarity as the surface charge of the electrophoretic particles 141 and setting the relative potential of the transparent conductive film 125 with respect to the transparent conductive patterns 280 to be in a same polarity as that of the surface charge of the electrophoretic particles 141, the electrophoretic particles 141 do not exist in the regions on the surface of the transparent substrate 110 where the conductive patterns 250 are not disposed.

As described through generating an electric field also between the conductive pattern 250 and the transparent conductive pattern 280 in addition to the electric filed between the transparent conductive film 125 and the conductive patterns 250, the time required when gathering the electrophoretic particles 141 in the vicinity of the surface of the conductive patterns 250 as shown in FIG. 13B can be shortened. Thus, it is possible to perform a visible range control with a fine responsiveness.

Figure 29B:
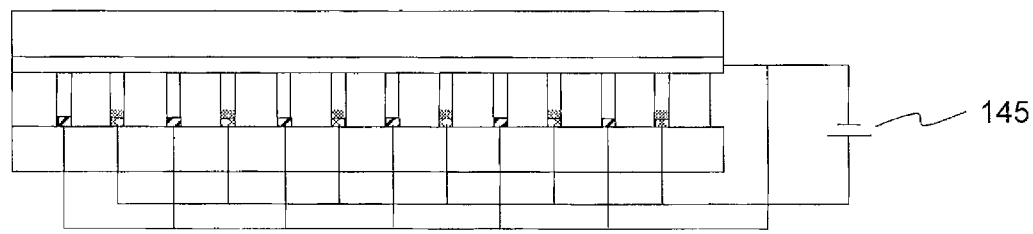
Figure 29C:
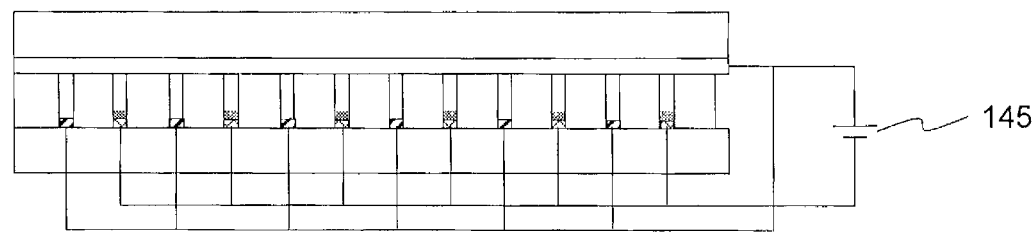

As described above, displays of the narrow viewing field mode and the wide viewing field mode can be achieved through controlling the potentials of the conductive patterns 250, the transparent conductive pattern 280, and the transparent conductive film 125 by a voltage apply control module 145 as shown in FIGS. 29A, 29B, and 29C. The voltage apply control module 145 is a module for changing each of the polarities of the conductive patterns 250, the transparent conductive pattern 280, and the transparent conductive film 125 by adjusting the voltages to be applied to the conductive pattern 250, the transparent conductive pattern 280, and the transparent conductive film 125 according to the signals from outside.

Figure 33A:
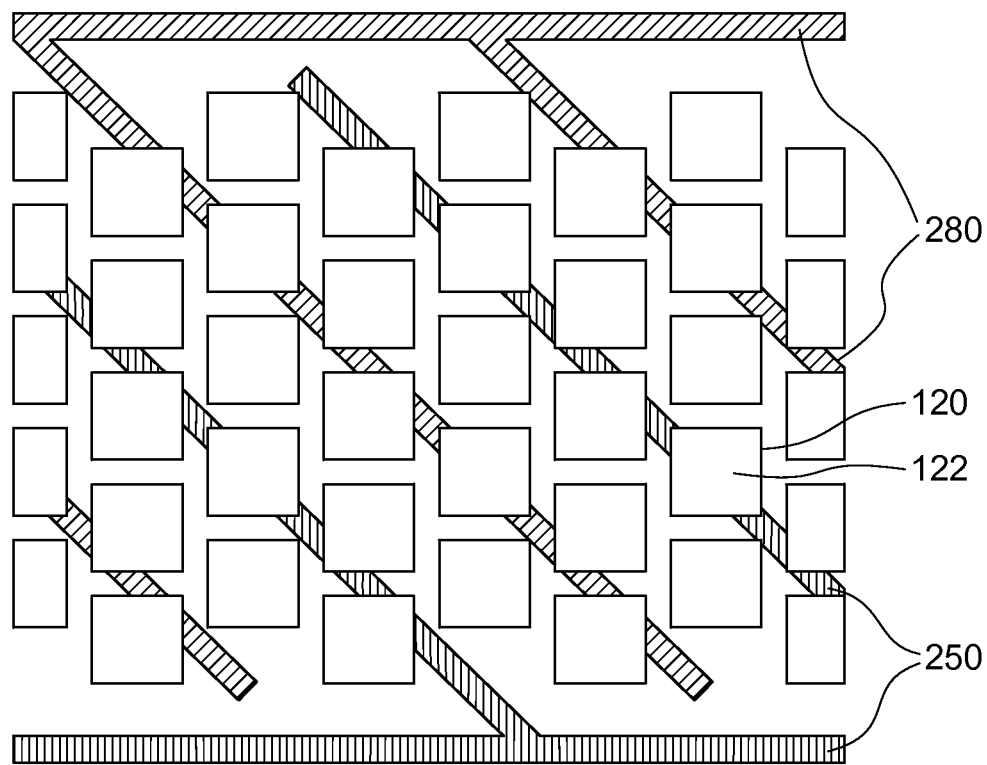
Figure 33B:
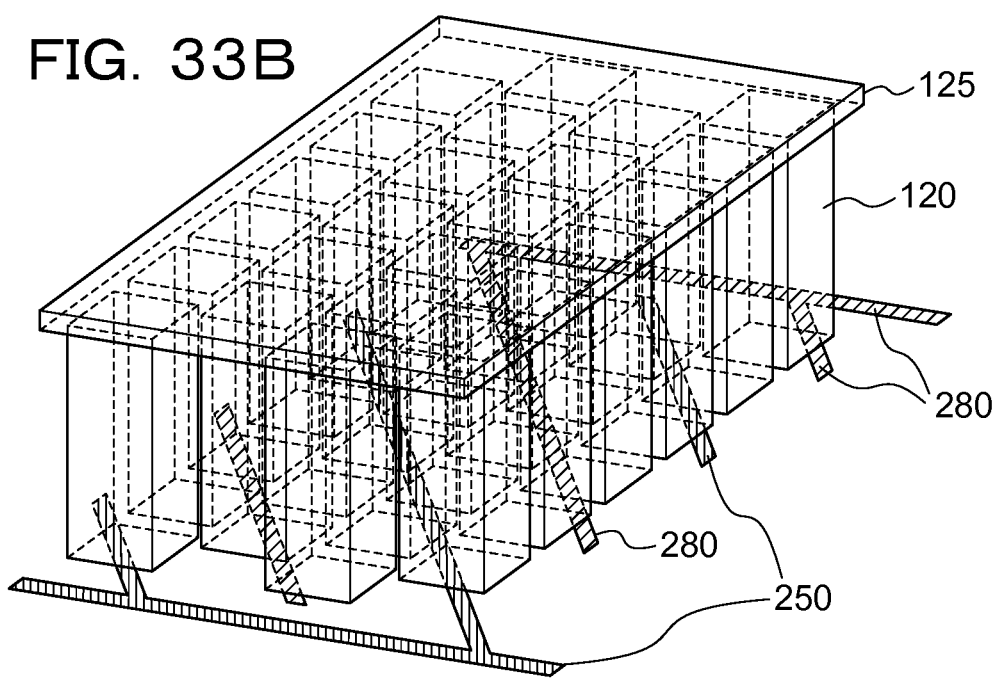

FIGS. 33A and 33B show an example where the linear conductive patterns 250 and the transparent conductive patterns 280 are disposed in the direction that is rotated by 45 degrees from the direction along which the light transmission regions 120 are lined in a straight-line form. FIG. 33A shows the layout of the light transmission regions 120, the conductive patterns 250, and the transparent conductive patterns 280 two-dimensionally when viewed from the normal direction of the top face 122 of the light transmission regions 120. Further, FIG. 33B shows the state of the light transmission regions 120, the conductive patterns 250, and the transparent conductive patterns 280 three-dimensionally obliquely from the above of the front side of the top face 122 of the light transmission regions 120. The layout of the light transmission regions 120 is in a staggered layout as a whole as clearly shown in FIG. 33A. In the example shown in FIG. 33A, the conductive patterns 250 which draw and cohere the electrophoretic particles 141 are the part shown by applying hatching in FIG. 33A, i.e., the part sandwiched by the neighboring light transmission regions 120. The part of the conductive patterns 250 whose top and back faces are sandwiched by the transparent substrate 110 and the light transmission region regions 120 simply functions as a means for electrically connecting the conductive pattern 250 sandwiched between the neighboring light transmission regions 120. Therefore, even with the structure in which the linear conductive patterns 250 and the transparent conductive patterns 280 are disposed in the direction that is rotated by 45 degrees from the direction along which the light transmission regions 120 are lined in a straight-line form, the technical spirit of the present invention to exclude the electrophoretic particles 141 from the regions other than the vicinity of the surface of the conductive patterns 250 disposed only in a part of the regions sandwiched between the neighboring light transmission regions 120 can be followed by gathering the electrophoretic particles 141 in the vicinity of the surface of the conductive patterns 250.

Figure 35A:
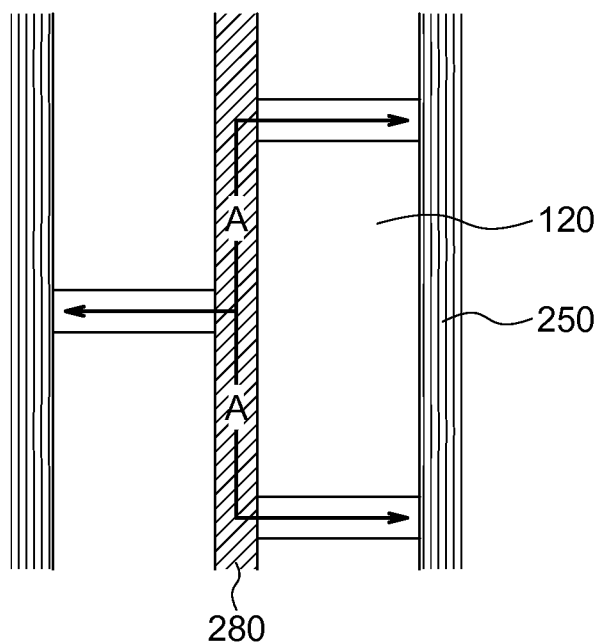

As shown in FIG. 35A, in the case where the linear conductive patterns 250 and the transparent conductive patterns 280 are disposed in the direction same as the linearly lined direction of the light transmission regions 120, as shown by the positions A in FIG. 35A, the electrophoretic particles 141 existing within the regions sectioned along the linearly lined direction of the light transmission regions 120 by being sandwiched between the neighboring light transmission regions 120 migrate along the linearly lined direction of the light transmission regions 120 in the region where the particles 141 exist to the position at which the region closest to the position of the particles 141 and the region where the particles 141 exist meet with each other out of the regions sectioned when the light transmission regions 120 intersect with the linearly lined direction of the light transmission regions 120 by being sandwiched between the neighboring light transmission regions 120 when the drawn and cohered electrophoretic particles 141 migrate towards the conductive patterns 250. Further, the electrophoretic particles 141 are required to reach the closest conductive pattern 250 by migrating in the region sandwiched between the neighboring light transmission regions 120 and sectioned when the light transmission region 120 intersect with the linearly lined direction of the light transmission regions 120 through changing the travelling direction by 90 degrees at the above-described mixing position.

Figure 35B:
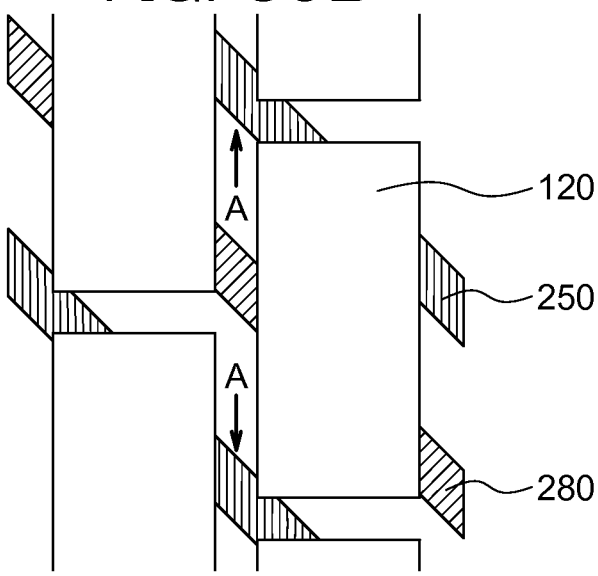

In the meantime, as shown in FIG. 35B, through disposing the linear conductive patterns 250 and the transparent conductive patterns 280 in the direction rotated by 45 degrees from the linearly lined direction of the light transmission regions 120, the electrophoretic particles 141 existing in the positions A of FIG. 35B simply need to migrate in the region where the particles 141 exist linearly along the linearly lined direction of the light transmission regions 120 when the drawn and cohered electrophoretic particles 141 migrate towards the conductive patterns 250. Therefore, the time required for gathering the electrophoretic particles 141 in the vicinity of the surface of the conductive patterns 250 can be shortened, so that it is possible to perform a visible range control with a fine responsiveness.

While FIG. 33 shows the case where the linear conductive patterns 250 and the transparent conductive patterns 280 are disposed in the direction rotated by 45 degrees from the linearly lined direction of the light transmission regions 120, it is possible to improve the responsiveness of the visible range control due to the same reasons as described above by setting the rotating angle of the linear conductive patterns 250 and the transparent conductive patterns 280 with respect to the linearly lined direction of the light transmission regions 120 to be larger than 0 degree and equal to or smaller than 90 degrees. Further, while FIG. 33 shows the example of the case where the conductive patterns 250 and the transparent conductive patterns 280 are disposed in parallel to each other, the conductive patterns 250 and the transparent conductive patterns 280 may not be disposed in parallel as long as those patterns are isolated from each other.

Other structures, operations, and effects of the fourth exemplary embodiment are the same as those described in the first exemplary embodiment.

Figure 16A:
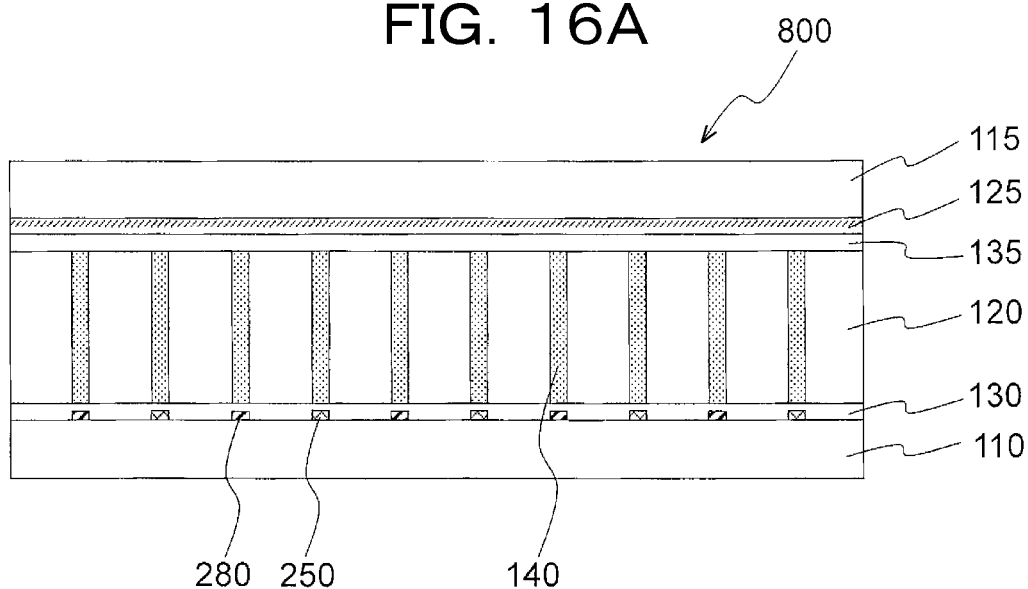
Figure 16B:
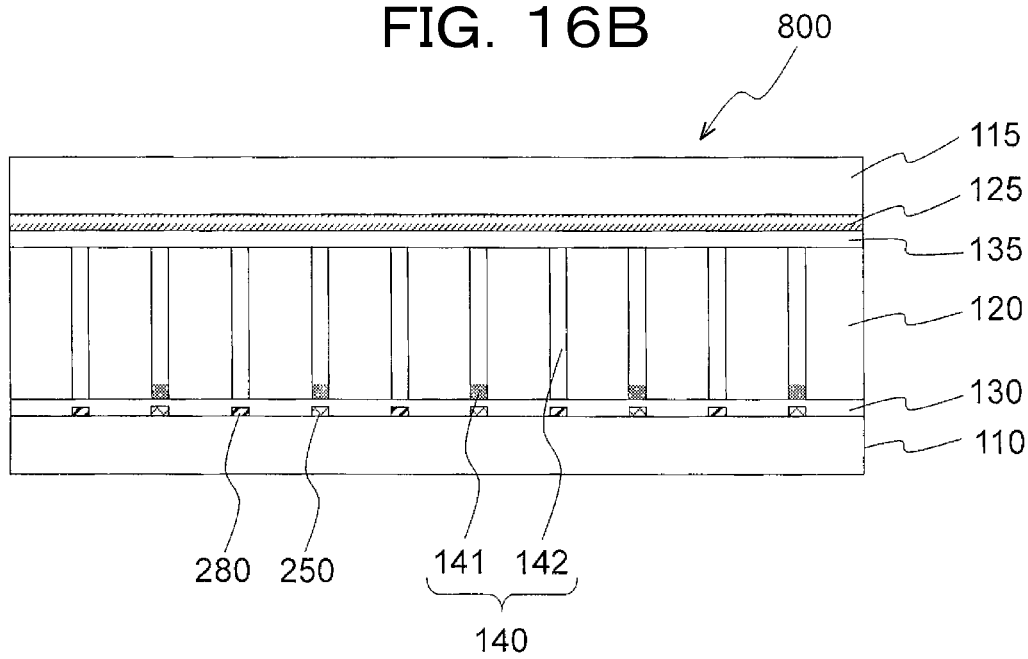
Figure 17A:
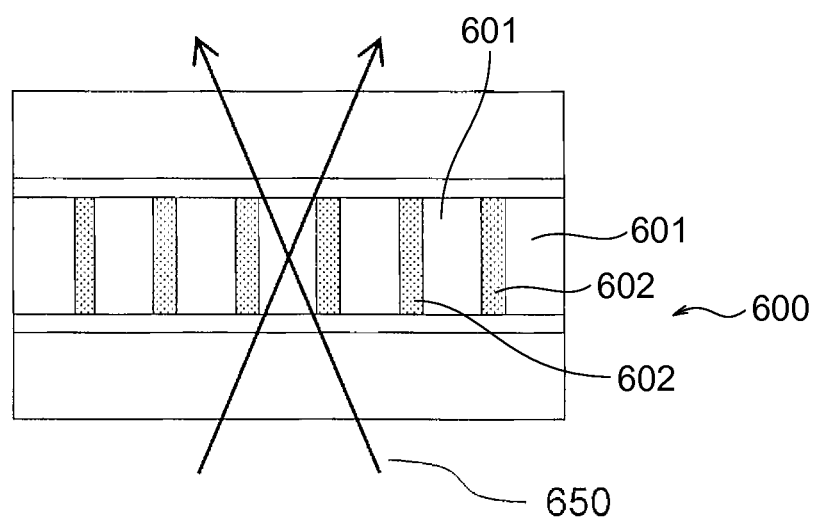
Figure 17B:
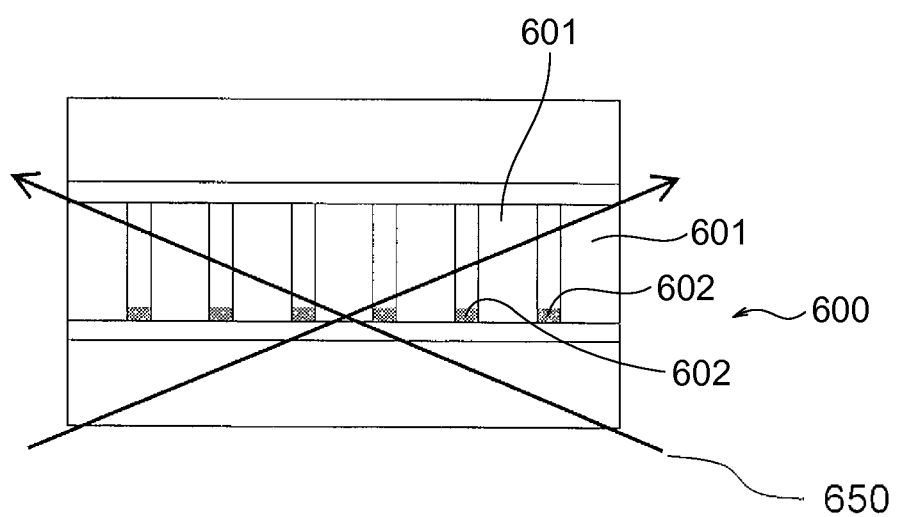
Figure 18:
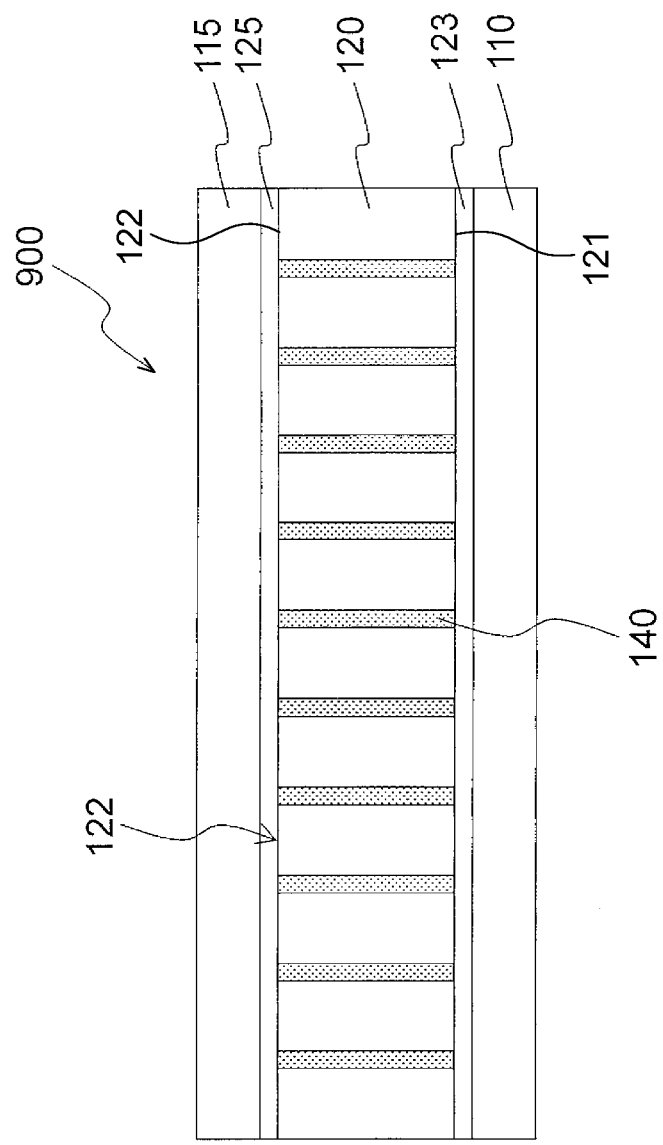
FIG. 18 is a longitudinal sectional view showing the structure of the optical element of the related technique.

Further, operations and effects of an optical element 700 in which the protection cover film 130 is formed on the conductive patterns 250 and the transparent conductive patterns 280 as shown in FIGS. 15A, 15B and an optical element 800 in which the second protection cover film 135 is formed further on the surface of the transparent conductive film 125 in addition to the protection cover film 130 as shown in FIGS. 16A, 16B are the same as those of the second and third exemplary embodiments, respectively.

In the first exemplary embodiment, it is described that operations can be done even with the structure in which a part of the conductive pattern 250 is disposed to overlap with a part of the light transmission region 120 on a plan view. As shown in FIG. 30, it is also possible with the fourth exemplary embodiment to perform operations even when the conductive pattern 250 and the transparent conductive pattern 280 are disposed to be exposed at least partially from the light transmission region 120, i.e., disposed in such a manner that a part of the conductive pattern 250 and a part of the transparent conductive pattern 280 overlap with a part of the light transmission region 120 on a plan view, i.e., when viewed from the normal direction of the display face of the optical element.

Other Exemplary Embodiments

The optical elements of the present invention described above can be applied not only to a liquid crystal display device but also to other display devices including a display face (display panel) for displaying videos, e.g., display devices including a display such as an organic EL display, an inorganic EL display, an LED display, a plasma display, a field emission display (FED), a cathode-ray tube, a fluorescent display tube, or the like.

Further, as the modes for using the optical elements of the present invention, there may be various modes such as a mode in which it is used by being directly pasted on the surface of a display panel, a mode in which it is loaded inside a display device, and the like. Hereinafter, structural examples of each of the use modes will be described in a specific manner. Note that explanations will be provided by referring to a case of using the optical element of the first exemplary embodiment as the optical element.

First, a display device including the optical element of the present invention loaded inside thereof will be described.

Figure 21:
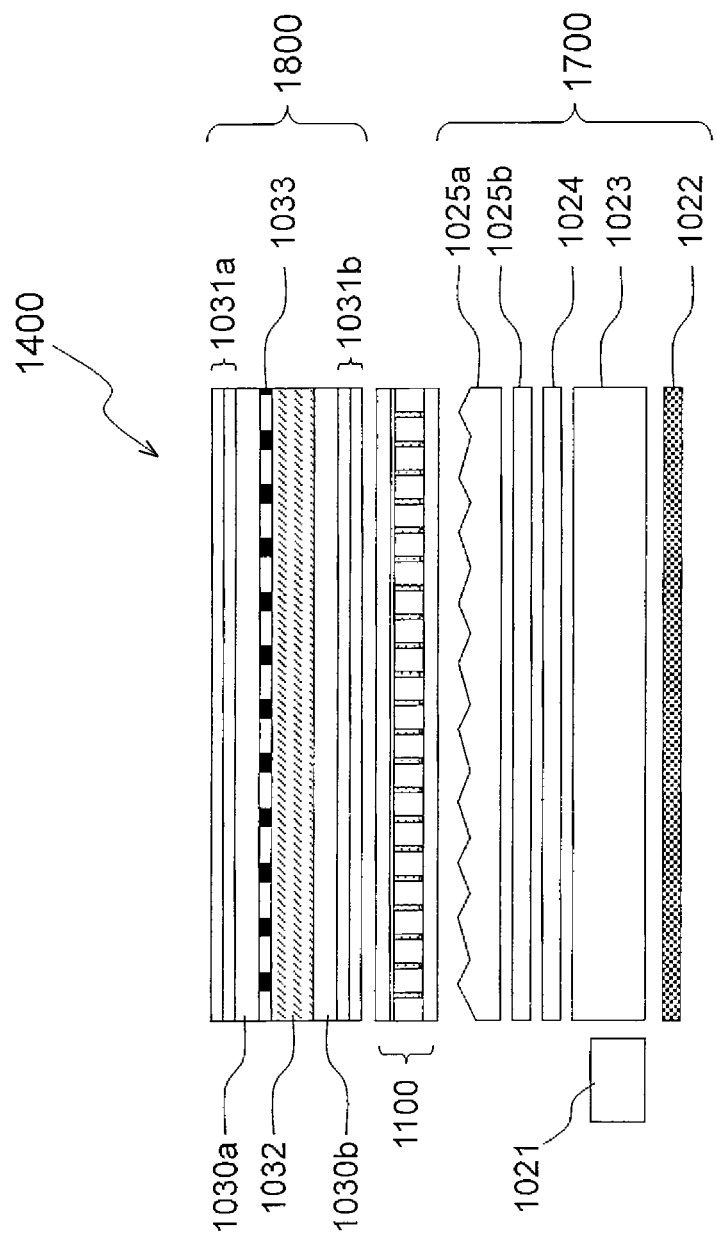
FIG. 21 is a sectional view showing the structure of a display device which includes the optical element according to the another exemplary embodiment loaded inside thereof.

FIG. 21 shows a structural example of a display device 1400 which includes the optical element of the present invention loaded inside thereof. The display device 1400 is constituted with: an optical control element 1800; a lighting optical device 1700 which is a backlight for lighting the optical control element 1800 by being disposed on the back face side of the display device 1400; and an optical element 1100 provided between the optical control element 1800 and the lighting optical device 1700.

As described in the first exemplary embodiment, the optical element 1100 is a microlouver which can achieve the narrow viewing field mode and the wide viewing field mode and exhibits high luminance in the wide viewing field mode. The lighting optical device 1700 is constituted with: a light source 1021 typically a cold cathode-ray tube shown in FIG. 21; a reflection sheet 1022; a light guiding plate 1023; a diffusing plate 1024; a prism sheet 1025a; and a prism sheet 1025b. The light transmitted through the prism sheets 1025a and 1025b is irradiated to the optical control element 1800 via the optical element 1100.

The light guiding plate 1023 is formed with an acryl resin or the like, and it is structured in such a manner that light from the light source 1021 makes incident to one end face and the incident light propagates within the light guiding plate and exits uniformly from the surface (a prescribed side face) side. On the back face side of the light guiding plate 1023, the reflection sheet 1022 which reflects the light emitted from the back face towards the surface direction is provided. Although not shown, a reflection module is also provided to the other end face and the side face of the light guiding plate 1023.

The light emitted from the surface of the light guiding plate 1023 makes incident on the optical control element 1800 via the diffusing plate 1024 and the prism sheets 1025*a*, 1025*b*. The diffusing plate 1024 is for diffusing the light that makes incident from the light guiding plate 1023. The luminance of the emitted light varies between the left and right ends of the light guiding plate 1023 because of its structure. Therefore, the light from the light guiding plate 1023 is diffused by the diffusing plate 1024.

The prism sheets 1025*a* and 1025*b* improve the luminance of the light that makes incident from the light guiding plate 1023 via the diffusing plate 1024. The prism sheet 1025*a* is constituted with a plurality of prisms that are disposed in a prescribed direction at a prescribed period. The prism sheet 1025*b* is in a same structure. However, the orderly layout direction of the prisms thereof is designed to cross with the orderly layout direction of the prisms of the prism sheet 1025*a*. By the prism sheets 1025*a* and 1025*b*, the directivity of the light diffused by the diffusing plate 1024 can be increased.

While the cold cathode-ray tube is used as the light source for describing the exemplary embodiment, the light source is not limited only to that. A white LED, a tricolor LED, or the like may also be used as the light source. Further, while a side-light type light source is used for describing the exemplary embodiment, the light source is not limited only to that. A direct type light source may be used as well.

The optical control element 1800 has a structure in which a liquid crystal layer 1032 is clamped by two substrates 1030*a* and 1030*b*. The substrate 1030*a* includes a color filter 1033 formed on one of the faces (the face on the liquid crystal layer 1032 side), and includes a polarization plate/ phase difference plate 1031*a* provided on the other face. A polarization plate/phase difference plate 1031*b* is provided on the face opposite from the liquid crystal layer 1032 side of the substrate 1030*b*. In the color filter 1033, filters of R (red), G (green), and B (blue) are disposed in matrix in the regions sectioned by a black matrix constituted with a layer that absorbs light. Each color filter corresponds to a pixel and the pitch thereof is constant. The liquid crystal layer 1032 is capable of switching a transparent state and a light-shielding state by a unit of pixel according to control signals form a control device, not shown. By switching the states, the incident light is modulated spatially.

In the display device shown in FIG. 21, the light transmitted through the prism sheets 1025*a* and 1025*b* makes incident on the polarization plate/phase difference plate 1031*b*. The light transmitted through the polarization plate/ phase difference plate 1031*b* makes incident on the liquid crystal layer 1032 via the substrate 1030*b*, and spatial modulation is performed therein by a pixel unit. The light (modulated light) transmitted through the liquid crystal layer 1032 transmits through the color filter 1033 and the substrate 1030*a* in order and makes incident on the polarization plate/phase difference plate 1031*a*. The light transmitted through the polarization plate/phase difference plate 1031*a* is emitted via the optical element 1100. While the polarization plate/phase difference plates 1031*a* and 1031*b* are used as the optical control element in FIG. 21, the optical control element is not limited only to those. It is also possible to employ a structure which includes only the polarization plate.

With the above-described display device, it is possible to converge or not converge the light for lighting the optical control element 1800 to the screen front face direction by the optical element 1100 to which the present invention is applied. Thus, the state of narrow viewing angle and the state of wide viewing angle can be selected as appropriate depending on the preference of the observer. The angle of the optical element 1100 with respect to the optical control element 1800 is adjusted as appropriate so that there is no moiré generated between the optical control element 1800 and the optical element 1100. Further, as in a display device 1500 shown in FIG. 22, the optical element 1100 may be pasted to the polarization plate/phase difference plate 1031*b* of the optical control element 1800 by using a transparent adhesive layer 1060. Generation of scattering light between the both can be suppressed through pasting the optical element 1100 to the optical control element 1800, so that the transmittance can be improved. Therefore, it is possible to achieve a display device with a still higher luminance.

Next, an exemplary embodiment in which the optical element of the present invention is used by disposing it on the surface of a display panel will be described.

Figure 19:
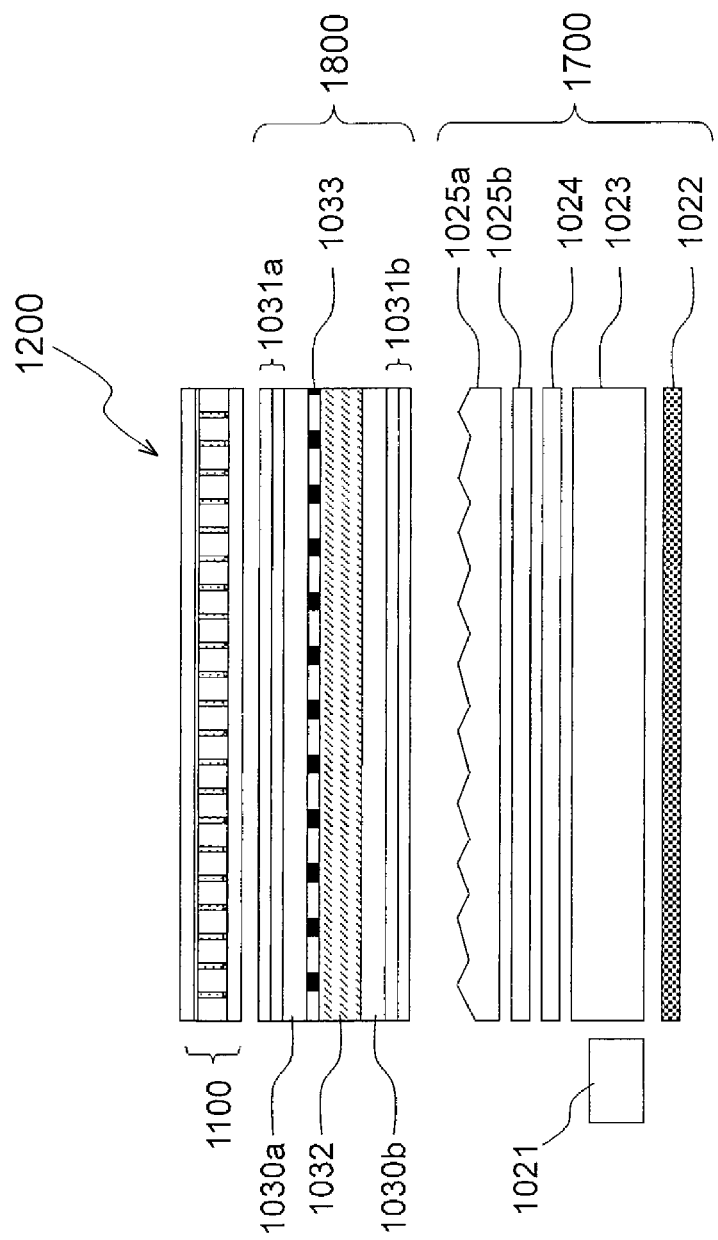
FIG. 19 is a sectional view showing the structure of a display device which includes an optical element according to another exemplary embodiment being provided to a display face.

FIG. 19 shows a structural example of a display device 1200 in which the optical element of the present invention is provided to the display screen. Referring to FIG. 19, the display device 1200 is constituted with the optical control element 1800, the lighting optical device 1700, and the optical element 1100.

As described in the first exemplary embodiment, the optical element 1100 is a microlouver which can control the narrow viewing field mode and the wide viewing field mode.

The lighting optical device 1700 is constituted with: the light source 1021; the reflection sheet 1022; the light guiding plate 1023; the diffusing plate 1024; and the prism sheets 1025*a* and 1025*b*. The light transmitted through the prism sheets 1025*a* and 1025*b* is lighted to the optical control element. Note here that a hard coat layer for preventing scratches and a reflection preventing layer for preventing glare may also be formed on the surface of the optical element 1100.

With the above-described display device 1200, at the forefront face of the display device 1200, it is possible to converge or not converge the light emitted from the optical control element 1800 to the screen front face direction by the optical element 1100 to which the present invention is applied. Thus, the light transmitted through the optical element 1100 can directly reach the observer. Therefore, scattering, refraction, reflection, and the like of the light emitted from the optical element can be suppressed compared to the case of the display device that includes the optical element loaded inside thereof, so that clear images with a still higher resolution can be achieved. In this case, the angle of the optical element 1100 with respect to the optical control element 1800 is adjusted as appropriate so that there is no moiré generated between the optical control element 1800 and the optical element 1100.

Figure 20:
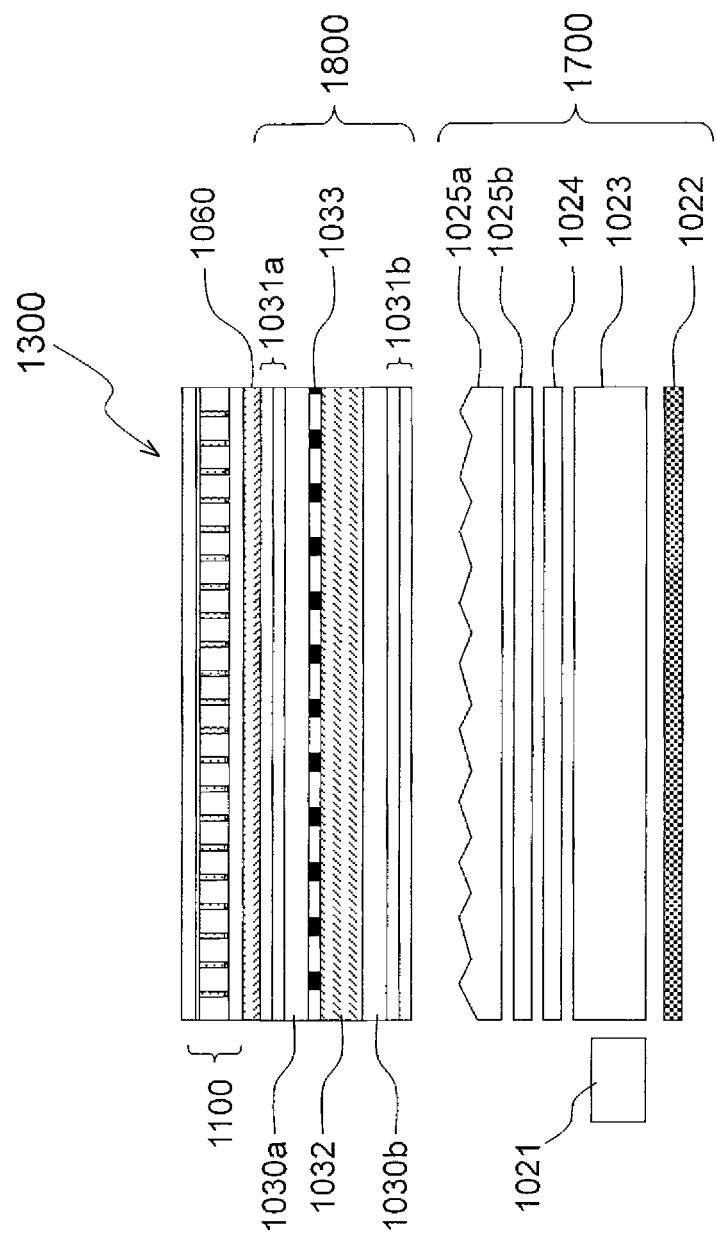
FIG. 20 is a sectional view showing the structure of a display device which includes the optical element according to the another exemplary embodiment being fixed to the display face.

Further, as in the display device 1300 shown in FIG. 20, the optical element 1100 may be pasted to the polarization plate/phase difference plate 1031*a* of the optical control element 1800 by using the transparent adhesive layer 1060. With such structure, surface reflection loss at the interface between the optical element 1100 and the polarization plate/phase difference plate 1031*a* can be decreased. Therefore, it is possible to achieve a display device with a still higher luminance.

Figure 27A:
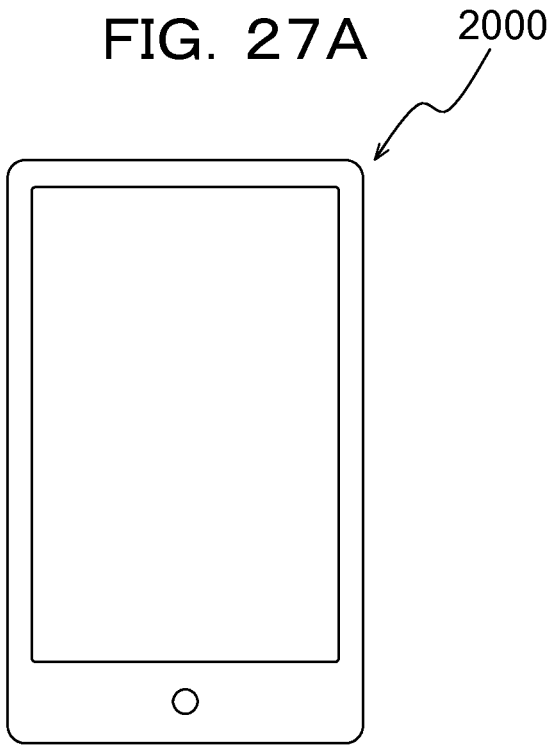
Figure 27B:
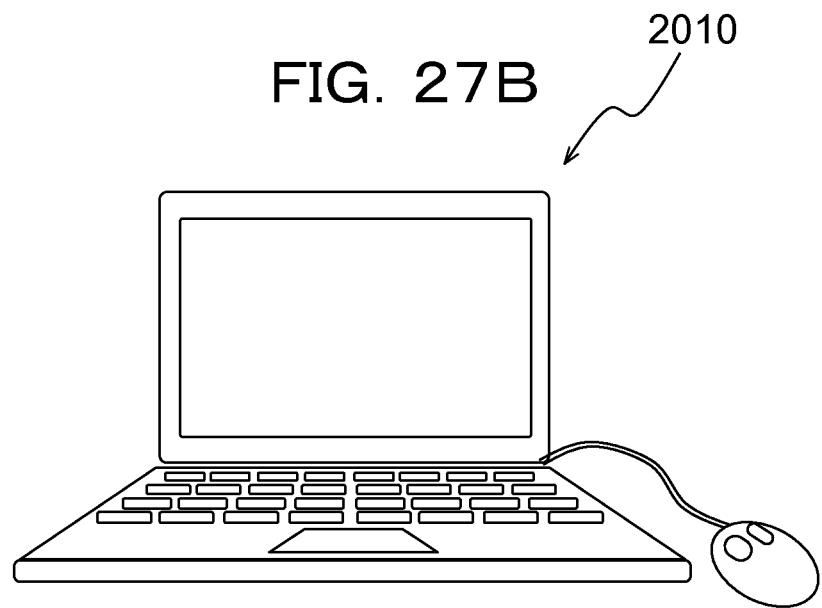

As examples of the case where the present invention is applied to mobile information processing terminals as other electric apparatuses such as a mobile phone, a notebook personal computer, a feature phone, a smartphone, a tablet device, or PDA, there are devices which include one of the above-described display devices 1200, 1300, 1400, an 1500 loaded as a display module in a main body of the electronic apparatus as in an electronic apparatus 2000 shown in FIG. 27A or an electronic apparatus 2010 shown in FIG. 27B, for example. Further, the optical element of the present invention may be applied to various kinds of plasma type display devices.

In that case, on the information processing terminals side, the control device thereof receives input from an input device such as a mouse, a keyboard, or a touch panel and performs a control for displaying necessary information on the display device loaded as the display module.

Figure 23:
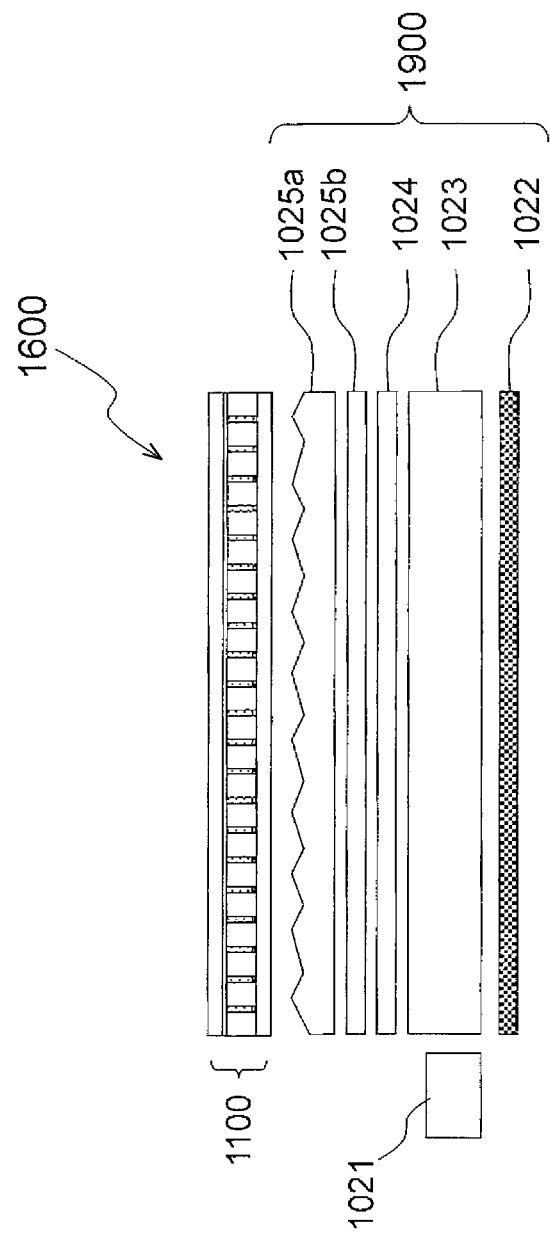
FIG. 23 is a sectional view showing the structure of a lighting device to which an optical element according to the another exemplary embodiment is loaded.
Figure 24A:
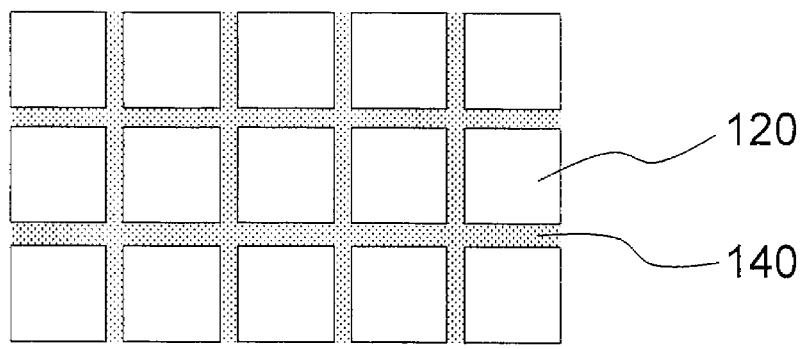
Figure 24B:
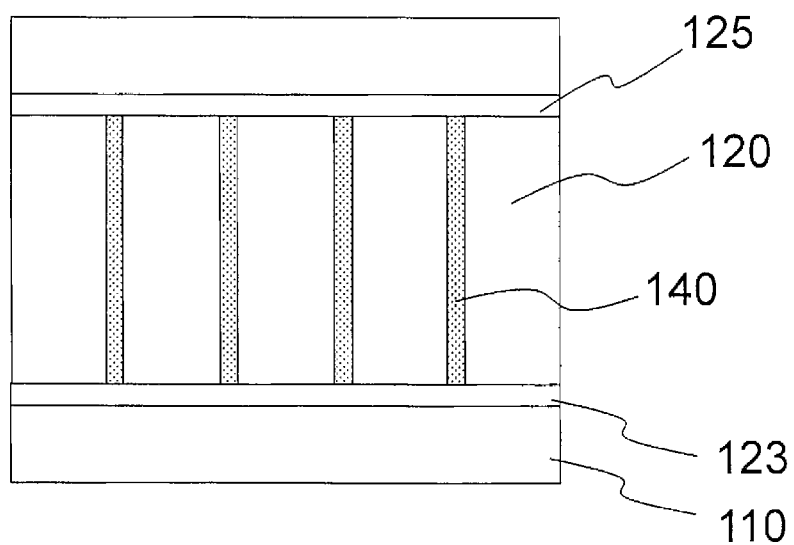

Next, FIG. 23 shows a structural example of a lighting device 1600 to which the optical element of the present invention is loaded. Referring to FIG. 23, the lighting device 1600 is constituted with a surface light source 1900 and the optical element 1100. The surface light source is constituted with: the light source 1021 typically a cold cathode tube; the reflection sheet 1022; the light guiding plate 1023; the diffusing plate 1024; the prism sheet 1025a; and the prism sheet 1025b.

The optical element 1100 is constituted with one of the microlouvers according to the first to third exemplary embodiments.

The light guiding plate 1023 is formed with an acryl resin or the like, and it is structured in such a manner that light from the light source 1021 makes incident on one end face and the incident light propagates within the light guiding plate and exits uniformly from the surface (a prescribed side face) side. On the back face side of the light guiding plate 1023, the reflection sheet 1022 which reflects the light emitted from the back face towards the surface direction is provided. Although not shown, a reflection module is also provided to the other end face and the side face of the light guiding plate 1023.

The light emitted from the surface of the light guiding plate 1023 makes incident on the optical element 1100 via the diffusing plate 1024 and the prism sheets 1025a, 1025b. The diffusing plate 1024 is for diffusing the light that makes incident from the light guiding plate 1023. The luminance of the emitted light varies between the left and right ends of the light guiding plate 1023 because of its structure. Therefore, the light from the light guiding plate 1023 is diffused by the light guiding plate 1023.

The prism sheets 1025a and 1025b improve the luminance of the light that makes incident from the light guiding plate 1023 via the diffusing plate 1024.

In the lighting device 1600, the light emitted from the surface side of the light guiding plate 1023 makes incident on the optical element 1100 via the prism sheets 1025a and 1025b after being diffused by the diffusing plate 1024.

With the above-described lighting device 1600, it is possible to converge or not converge the light of the surface light source 1900 to the screen front face direction by the optical element 1100 to which the present invention is applied. Thus, it becomes possible to select a state with wide light emission angles where light can be irradiated in a wide range and a state with narrow light emission angles where the light can be irradiated only in the vicinity of directly under the lighting device 1600 depending on the preference of the observer.

Particularly with the lighting device 1600 that uses the optical element 200 of the first exemplary embodiment, the optical element 300 of the second exemplary embodiment, the optical element 400 of the third exemplary embodiment as the optical element 1100, the range of exit directions of the light transmitting through the light transmission regions 120 and the dispersion materials 142 is changed by changing the dispersion state of the electrophoretic particles 141 by a potential difference between the conducive patterns 250 and the transparent conductive film 125. With the lighting device 1600 that uses the optical element 600 of the fourth exemplary embodiment as the optical element 1100, the range of exit directions of the light transmitting through the light transmission regions 120 and the dispersion materials 142 is changed by changing the dispersion state of the electrophoretic particles 141 by a potential difference between the conducive patterns 250 or the transparent conductive patterns 280 and the transparent conductive film 125.

While the cold cathode-ray tube is used as the light source for describing the exemplary embodiment, the light source is not limited only to that. A white LED, a tricolor LED, or the like may also be used as the light source. Further, while a side-light type light source is used for describing the exemplary embodiment, the light source is not limited only to that. A direct type light source may be used as well. Furthermore, the surface light source 1900 is not limited only to the content described in the exemplary embodiment. Any types may be used as long as such as the light source for emitting light such as an LED light, an organic EL light, an inorganic EL light, a fluorescent light, a lightbulb, and the like are arranged in a planar form.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

A part of or a whole part of the exemplary embodiments disclosed above can be expressed properly by following Supplementary Notes. However, the modes for embodying the present invention and the technical spirit thereof are not limited only to those.

(Supplementary Note 1)

An optical element which includes:

a first transparent substrate (110) and a second transparent substrate (115) provided by opposing to the first transparent substrate (110);

a plurality of light transmission regions (120) disposed by being isolated from each other to reach a surface of the second transparent substrate (115) from a surface of the first transparent substrate (110);

a conductive pattern (250) disposed on the surface of the first transparent substrate (110) in a part of a region sandwiched between the light transmission regions (120) neighboring to each other;

a transparent conductive film (125) disposed on a face of the second transparent substrate (115) opposing to the first transparent substrate (110); and an electrophoretic element (140) disposed between the neighboring light transmission regions (120), which is constituted with light-shielding electrophoretic particles (141) of a specific electric charge and a transmissive dispersion material (142) (see FIG. 1).

(Supplementary Note 2)

An optical element which includes:

a first transparent substrate (110) and a second transparent substrate (115) provided by opposing to and being isolated from the first transparent substrate (110);

a transparent conductive film (125) disposed on a surface of the second transparent substrate (115) opposing to the first substrate (110);

a plurality of light transmission regions (120) which are disposed in a space between the first transparent substrate (110) and the transparent conductive film (125) in parallel to the display face of the optical element (200) by being isolated from each other in two mutually orthogonal directions in such a manner that the bottom face (121) thereof abuts against the first transparent substrate (110) and the top face (122) thereof reaches the second transparent substrate (115);

a conductive pattern (250) disposed on the surface of the first transparent substrate (110) in a part of a region sandwiched between the light transmission regions (120) neighboring to each other; and regardless of the existence of the conductive pattern (250), an electrophoretic element (140) disposed to fill the space between the neighboring light transmission regions (120) that are disposed by being isolated from each other, which is constituted with light-shielding electrophoretic particles (141) of a specific electric charge and a transmissive dispersion material (142) (see FIG. 9A and FIG. 10A, FIG. 9B and FIG. 10B).

(Supplementary Note 3)

The optical element as depicted in Supplementary Note 2, wherein:

the plurality of light transmission regions (120) are disposed in a staggered manner; and the conductive patterns (250) are disposed in a same direction as the direction along which the light transmission regions (120) are lined in a straight-line form (see FIG. 9A and FIG. 10A, FIG. 9B and FIG. 10B).

(Supplementary Note 4)

The optical element as depicted in Supplementary Note 2, wherein:

the plurality of light transmission regions (120) are disposed in a staggered manner; and the conductive patterns (250) are disposed in a direction rotated by 90 degrees from the direction along which the light transmission regions (120) are lined in a straight-line form (see FIG. 11A, FIG. 12A, FIG. 11B, and FIG. 12B).

(Supplementary Note 5)

The optical element as depicted in Supplementary Note 2, wherein:

the plurality of light transmission regions (120) are disposed vertically and laterally on the first transparent substrate (110) to be arranged in a straight-line form along a row direction or a column direction; the conductive pattern (250) is in a linear shape; and an angle of the linear conductive pattern (250) with respect to the direction along which the light transmission regions (120) are disposed in a straight-line form is larger than 0 degree and equal to or less than 90 degrees (see FIG. 31A and FIG. 32A, FIG. 31B and FIG. 32B).

(Supplementary Note 6)

An optical element which includes:

a first transparent substrate (110) and a second transparent substrate (115) provided by opposing to and being isolated from the first transparent substrate (110);

a transparent conductive film (125) disposed on a face of the second transparent substrate (115) opposing to the first substrate (110);

a plurality of light transmission regions (120) which are disposed in a space between the first transparent substrate (110) and the transparent conductive film (125) in parallel to the display face of the optical element (200) by being isolated from each other in the width direction of the top and bottom faces (122, 121) in a lengthy rectangular shape in such a manner that the bottom face (121) abuts against the first transparent substrate (110) and the top face (122) reaches the second transparent substrate (115);

a conductive pattern (250) disposed on the surface of the first transparent substrate (110) in a part of a region sandwiched between the light transmission regions (120) neighboring to each other; and regardless of the existence of the conductive pattern (250), an electrophoretic element (140) disposed to fill the space between the neighboring light transmission regions (120) that are disposed by being isolated from each other, which is constituted with light-shielding electrophoretic particles (141) of a specific electric charge and a transmissive dispersion material (142) (see FIG. 11C and FIG. 12C).

(Supplementary Note 7)

The optical element as depicted in Supplementary Note 6, wherein the conductive pattern (250) is disposed in a direction rotated by 90 degrees from the direction along which the light transmission regions (120) are arranged (see FIG. 11C and FIG. 12C).

(Supplementary Note 8)

The optical element as depicted in Supplementary Note 6, wherein:

the plurality of light transmission regions (120) are disposed vertically and laterally on the first transparent substrate (110) to be arranged in a straight-line form along a row direction or a column direction; the conductive pattern (250) is in a linear shape; and an angle of the linear conductive pattern (250) with respect to the direction along which the light transmission regions are disposed in a straight-line form is large than 0 degree and equal to or less than 90 degrees (see FIG. 31A and FIG. 32A, FIG. 31B and FIG. 32B).

(Supplementary Note 9)

The optical element as depicted in any one of Supplementary Notes 1 to 8, wherein a part of the conductive pattern (250) is disposed to overlap with a part of the light transmission region (120) on a plan view (see FIG. 28, FIG. 31 to FIG. 33, FIG. 34B, and FIG. 35B).

(Supplementary Note 10)

The optical element as depicted in any one of Supplementary Notes 1 to 9, wherein a protection cover film (130) is formed to cover the conductive pattern (250) (see FIG. 6).

(Supplementary Note 11)

The optical element as depicted in any one of Supplementary Notes 1 to 10, wherein a second protection cover film (135) is formed to cover the transparent conductive film (125) (see FIG. 7).

(Supplementary Note 12)

The optical element as depicted in any one of Supplementary Notes 1 to 11, which includes a voltage apply control module (145) which adjusts voltages applied to the conductive pattern (250) and the transparent conductive film (125) according to a signal from outside to change polarities of the conductive pattern (250) and the transparent conductive film (125), respectively (see FIG. 26).

(Supplementary Note 13)

The optical element as depicted in Supplementary Note 12, wherein a relative potential of the transparent conductive film (125) with respect to the conductive pattern (250) is set to be in a same polarity as that of the surface charge of the electrophoretic particles (141) to gather the electrophoretic particles (141) in the vicinity of the surface of the conductive pattern (250) to acquire a state where the electrophoretic particles (141) do not exist in a region where the conductive pattern (250) is not disposed on the surface of the first transparent substrate (110) (see FIGS. 26B and 26C).

(Supplementary Note 14)

An optical element which includes:

a first transparent substrate (110) and a second transparent substrate (115) provided by opposing to the first transparent substrate (110);

a plurality of light transmission regions (120) disposed by being isolated from each other to reach a surface of the second transparent substrate (115) from a surface of the first transparent substrate (110);

a conductive pattern (250) disposed on the surface of the first transparent substrate (110) in a part of a region sandwiched between the light transmission regions (120) neighboring to each other;

a transparent conductive pattern (280) disposed further in a part of the surface of the first transparent substrate (110) where the conductive pattern (250) is not disposed;

a transparent conductive film (125) disposed on a face of the second transparent substrate (115) opposing to the first transparent substrate (110); and an electrophoretic element (140) disposed between the neighboring light transmission regions (120), which is constituted with light-shielding electrophoretic particles (141) of a specific electric charge and a transmissive dispersion material (142) (see FIG. 13).

(Supplementary Note 15)

An optical element which includes:

a first transparent substrate (110) and a second transparent substrate (115) provided by opposing to and being isolated from the first transparent substrate (110);

a transparent conductive film (125) disposed on a surface of the second transparent substrate (115) opposing to the first substrate (110);

a plurality of light transmission regions (120) which are disposed in a space between the first transparent substrate (110) and the transparent conductive film (125) in parallel to the display face of an optical element (600) by being isolated from each other in two mutually orthogonal directions in such a manner that the bottom face (121) thereof abuts against the first transparent substrate (110) and the top face (122) thereof reaches the second transparent substrate (115);

a conductive pattern (250) disposed on the surface of the first transparent substrate (110) in a part of a region sandwiched between the light transmission regions (120) neighboring to each other;

a conductive pattern (280) disposed further in a part of the remaining region when excluding the region where the conductive pattern (250) is disposed from the region sandwiched between the neighboring light transmission regions (120) on the surface of the first transparent substrate (110);

regardless of the existence of the conductive pattern (250) and the transparent conductive pattern (280), an electrophoretic element (140) disposed to fill the space between the neighboring light transmission regions (120) that are disposed by being isolated from each other, which is constituted with light-shielding electrophoretic particles (141) of a specific electric charge and a transmissive dispersion material (142) (see FIG. 13).

(Supplementary Note 16)

The optical element as depicted in Supplementary Note 15, wherein:

the plurality of light transmission regions (120) are disposed in a staggered manner; and the conductive pattern (250) and the transparent conductive pattern (280) are disposed alternately in a same direction as the direction along which the light transmission regions (120) are lined in a straight-line form (see FIG. 14).

(Supplementary Note 17)

The optical element as depicted in Supplementary Note 15, wherein:

the plurality of light transmission regions (120) are disposed vertically and laterally on the first transparent substrate (110) to be arranged in a straight-line form along a row direction or a column direction; the conductive pattern (250) and the transparent conductive pattern (280) are in a linear shape; and an angle of the conductive pattern (250) and the transparent conductive pattern (280) with respect to the direction along which the light transmission regions (120) are disposed in a straight-line form is large than 0 degree and equal to or less than 90 degrees (see FIG. 31A and FIG. 32A, FIG. 31B and FIG. 32B).

(Supplementary Note 18)

The optical element as depicted in any one of Supplementary Notes 14 to 17, wherein a part of the conductive pattern (250) and a part of the transparent conductive pattern (280) are disposed to overlap with a part of the light transmission region (120) on a plan view (see FIG. 30).

(Supplementary Note 19)

The optical element as depicted in any one of Supplementary Notes 14 to 18, wherein a protection cover film (130) is formed to cover the conductive pattern (250) and the transparent conductive pattern (280) (see FIG. 15).

(Supplementary Note 20)

The optical element as depicted in any one of Supplementary Notes 14 to 19, wherein a second protection cover film (135) is formed to cover the transparent conductive film (125) (see FIG. 16).

(Supplementary Note 21)

The optical element as depicted in any one of Supplementary Notes 14 to 20, which includes a voltage apply control module (145) which adjusts voltages applied to the conductive pattern (250), the transparent conductive pattern (280), and the transparent conductive film (125) according to a signal from outside to change polarities of the conductive pattern (250), the transparent conductive pattern (280), and the transparent conductive film (125), respectively (see FIG. 29).

(Supplementary Note 22)

The optical element as depicted in Supplementary Note 21, wherein a relative potential of the transparent conductive pattern (280) with respect to the conductive pattern (250) is set to be in a same polarity as that of the surface charge of the electrophoretic particles (141) and a relative potential of the transparent conductive film (125) with respect to the transparent conductive pattern (250) is set to be in a same polarity as that of the surface charge of the electrophoretic particles (141) to gather the electrophoretic particles (141) in the vicinity of the surface of the conductive pattern (250) (see FIGS. 29B and 29C).

(Supplementary Note 23)

The optical element as depicted in Supplementary Note 21 or 22, wherein the conductive pattern (250), the transparent conductive pattern (280), and the transparent conductive film (125) are set to be in a same potential to dispose the electrophoretic particles (141) in the entire dispersion material (142) (see FIG. 29A).

(Supplementary Note 24)

A display device which includes:

a display (1800) which includes a display face for displaying videos; and the optical element (1100) as depicted in any one of Supplementary Notes 1 to 23 disposed on the display face of the display (1800) (see FIG. 20).

(Supplementary Note 25)

The display device as depicted in Supplementary Note 24, wherein the display and the optical element are fixed via a transparent adhesive layer (1060) (see FIG. 20).

(Supplementary Note 26)

The display device as depicted in Supplementary Note 24 or 25, wherein the display (1800) is a liquid crystal display, a plasma display, an organic EL display, an inorganic EL display, an LED display, a field emission display, a cathode-ray tube, or a fluorescent display tube (see line 6 of page 46 to line 10 of page 46 of the specification).

(Supplementary Note 27)

A display device which includes:

a liquid crystal display (1800) which includes a display face for displaying videos;

a backlight (1700) which irradiates light to the liquid crystal display (1800) by being disposed on a back face side of the liquid crystal display (1800); and the optical element (1100) as depicted in any one of Supplementary Notes 1 to 23 disposed between the liquid crystal display (1800) and the backlight (1700) (see FIG. 21).

(Supplementary Note 28)

Figure 22:
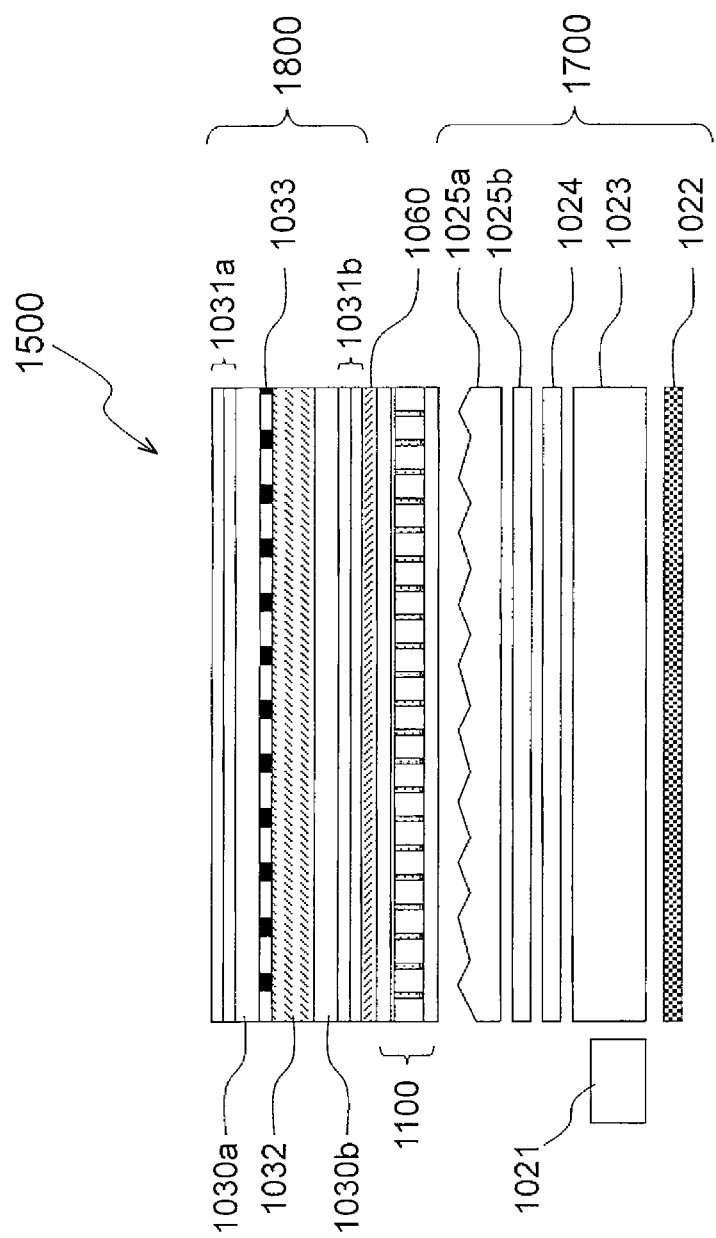
FIG. 22 is a sectional view showing the structure of a display device which includes the optical element according to the another exemplary embodiment being fixed to the inside thereof.

The display device as depicted in Supplementary Note 27, wherein the liquid crystal display (1800) and the optical element (1100) are fixed via a transparent adhesive layer (1060) (see FIG. 22).

(Supplementary Note 29)

An electronic apparatus which includes the display device as depicted in any one of Supplementary Notes 24 to 28 loaded as a display module of a main body of the electronic apparatus (see FIG. 27).

(Supplementary Note 30)

A lighting device which includes:

the optical element (1100) as depicted in in any one of supplementary Notes 1 to 23; and a light source (1700) provided on a back face of the first transparent substrate (110) of the optical element (1100) (see FIG. 23).

(Supplementary Note 31)

The lighting device as depicted in Supplementary Note 30, wherein in the optical element (1100), a dispersion state of the electrophoretic particles (141) is changed by a potential difference between the conductive pattern (250) or the transparent conductive pattern (280) and the transparent conductive film (125) to change a range of exit directions of light which transmits through the light transmission region (120) and the dispersion material (142).

INDUSTRIAL APPLICABILITY

The present invention can be utilized for any types of optical elements which control the range of exit directions of transmission light. Examples of such optical element are the optical elements used in a liquid crystal display device, an EL display, a plasma display, FED, a lighting device, and the like.

What is claimed is:

1. An optical element, comprising:
 a first transparent substrate and a second transparent substrate provided by opposing to the first transparent substrate;
 a plurality of light transmission regions disposed by being isolated from each other to reach a surface of the second transparent substrate from a surface of the first transparent substrate;
 a conductive pattern disposed on the surface of the first transparent substrate in a part of a region sandwiched between the light transmission regions neighboring to each other;
 a transparent conductive film disposed on a face of the second transparent substrate opposing to the first transparent substrate; and
 an electrophoretic element disposed between the neighboring light transmission regions, which is constituted with light-shielding electrophoretic particles of a specific electric charge and a transmissive dispersion material, wherein
 the region sandwiched between the light transmission regions neighboring to each other includes a first region where the conductive pattern is disposed on the surface of the first transparent substrate, and a second region where the conductive pattern is not disposed.

2. The optical element as claimed in claim 1, wherein a part of the conductive pattern is disposed to overlap with a part of the light transmission region on a plan view.

3. The optical element as claimed in claim 1, wherein:
 the light transmission regions are disposed vertically and laterally on the first transparent substrate to be arranged in a straight-line form along a row direction or a column direction; the conductive pattern is in a linear shape; and an angle of the linear conductive pattern with respect to a direction along which the light transmission regions are disposed in a straight-line form is larger than 0 degree and equal to or less than 90 degrees.

4. The optical element as claimed in claim 1, wherein a protection cover film is formed to cover the conductive pattern or formed to cover the conductive pattern and the first transparent substrate.

5. The optical element as claimed in claim 1, wherein a second protection cover film is formed to cover the transparent conductive film.

6. The optical element as claimed in claim 1, comprising a voltage apply control module which adjusts voltages applied to the conductive pattern and the transparent conductive film according to a signal from outside to change polarities of the conductive pattern and the transparent conductive film, respectively.

7. The optical element as claimed in claim 6, wherein a relative potential of the transparent conductive film with respect to the conductive pattern is set to be in a same polarity as that of a surface charge of the electrophoretic particles to gather the electrophoretic particles in vicinity of the surface of the conductive pattern to acquire a state where the electrophoretic particles do not exist in a region where the conductive pattern is not disposed on the surface of the first transparent substrate.

8. The optical element as claimed in claim 6, wherein the conductive pattern and the transparent conductive film are set to be in a same potential to dispose the electrophoretic particles in the entire transmissive dispersion material.

9. An optical element, comprising:
a first transparent substrate and a second transparent substrate provided by opposing to the first transparent substrate;
a plurality of light transmission regions disposed by being isolated from each other to reach a surface of the second transparent substrate from a surface of the first transparent substrate;
a conductive pattern disposed on the surface of the first transparent substrate in a part of a region sandwiched between the light transmission regions neighboring to each other;
a transparent conductive pattern disposed further in a part of the surface of the first transparent substrate where the conductive pattern is not disposed;
a transparent conductive film disposed on a face of the second transparent substrate opposing to the first transparent substrate; and
an electrophoretic element disposed between the neighboring light transmission regions, which is constituted with light-shielding electrophoretic particles of a specific electric charge and a transmissive dispersion material, wherein
the region sandwiched between the light transmission regions neighboring to each other includes a first region where the conductive pattern is disposed on the surface of the first transparent substrate, and a second region where the transparent conductive pattern is disposed on the surface of the first transparent substrate.

10. The optical element as claimed in claim 9, wherein a part of the conductive pattern and a part of the transparent conductive pattern are disposed to overlap with a part of the light transmission region on a plan view.

11. The optical element as claimed in claim 9, wherein:
the light transmission regions are disposed vertically and laterally on the first transparent substrate to be arranged in a straight-line form along a row direction or a column direction; the conductive pattern and the transparent conductive pattern are in a linear shape; and an angle of the conductive pattern and the transparent conductive pattern with respect to a direction along which the light transmission regions are disposed in a straight-line form is larger than 0 degree and equal to or less than 90 degrees.

12. The optical element as claimed in claim 11, wherein the conductive pattern and the transparent conductive pattern are disposed in parallel to each other.

13. The optical element as claimed in claim 9, wherein a protection cover film is formed to cover the conductive pattern and the transparent conductive pattern.

14. The optical element as claimed in claim 9, wherein a second protection cover film is formed to cover the transparent conductive film.

15. The optical element as claimed in claim 9, comprising a voltage apply control module which adjusts voltages applied to the conductive pattern, the transparent conductive pattern, and the transparent conductive film according to a signal from outside to change polarities of the conductive pattern, the transparent conductive pattern, and the transparent conductive film, respectively.

16. The optical element as claimed in claim 15, wherein a relative potential of the transparent conductive pattern with respect to the conductive pattern is set to be in a same polarity as that of a surface charge of the electrophoretic particles and a relative potential of the transparent conductive film with respect to the transparent conductive pattern is set to be in a same polarity as that of the surface charge of the electrophoretic particles to gather the electrophoretic particles in vicinity of the surface of the conductive pattern.

17. The optical element as claimed in claim 15, wherein the conductive pattern, the transparent conductive pattern, and the transparent conductive film are set to be in a same potential to dispose the electrophoretic particles in the entire transmissive dispersion material.

18. A display device, comprising:
a display which includes a display face for displaying videos; and
the optical element as claimed in claim 1 disposed on the display face of the display.

19. The display device as claimed in claim 18, wherein the display and the optical element are fixed via a transparent adhesive layer.

20. The display device as claimed in claim 18, wherein the display is a liquid crystal display, a plasma display, an organic EL display, an inorganic EL display, an LED display, a field emission display, a cathode-ray tube, or a fluorescent display tube.

21. A display device, comprising:
a liquid crystal display which includes a display face for displaying videos;
a backlight which irradiates light to the liquid crystal display by being disposed on a back face side of the liquid crystal display; and
the optical element as claimed in claim 1 disposed between the liquid crystal display and the backlight.

22. The display device as claimed in claim 21, wherein the liquid crystal display and the optical element are fixed via a transparent adhesive layer.

23. An electronic apparatus, comprising the display device as claimed in claim 18 loaded as a display module of a main body of the electronic apparatus.

24. A lighting device, comprising:
the optical element as claimed in claim 1; and a light source provided on a back face of the first transparent substrate of the optical element.

25. The lighting device as claimed in claim 24, wherein in the optical element, a dispersion state of the electrophoretic particles is changed by a potential difference between the conductive pattern and the transparent conductive film to change a range of exit directions of light which transmits through the light transmission region and the transmissive dispersion material.

26. The optical element as claimed in claim 1, wherein in the second region, the surface of the first transparent substrate is exposed since the conductive pattern is not disposed on the first transparent substrate.

* * * * *